(12) United States Patent
Miller et al.

(10) Patent No.: US 9,594,814 B2
(45) Date of Patent: Mar. 14, 2017

(54) ADVANCED FIELD EXTRACTOR WITH MODIFICATION OF AN EXTRACTED FIELD

(71) Applicant: Splunk Inc., San Francisco, CA (US)

(72) Inventors: Jesse Miller, San Francisco, CA (US); Micah James Delfino, San Francisco, CA (US); Marc Robichaud, San Francisco, CA (US); David Carasso

(*) Notice: Subject to any disclaimer, the term of this patent is extended or adjusted under 35 U.S.C. 154(b) by 222 days.

(21) Appl. No.: 14/611,089

(22) Filed: Jan. 30, 2015

(65) Prior Publication Data

US 2015/0154269 A1    Jun. 4, 2015

Related U.S. Application Data

(63) Continuation-in-part of application No. 14/266,839, filed on May 1, 2014, which is a continuation of application No. 13/748,391, filed on Jan. 23, 2013, now Pat. No. 8,751,963, application No. 14/611,089, which is a continuation-in-part of application No. 14/168,888, filed on Jan. 30, 2014, now Pat. No. 9,031,955, which is a continuation of application No. 13/747,153, filed on Jan. 22, 2013, now Pat. No. 8,751,499, application No. 14/611,089, which is a continuation-in-part of application No. 14/169,268, filed on Jan. 31, 2014, which is a continuation of
(Continued)

(51) Int. Cl.
| | |
|---|---|
| G06F 3/048 | (2013.01) |
| G06F 17/30 | (2006.01) |
| G06F 7/24 | (2006.01) |
| G06F 3/0484 | (2013.01) |

(52) U.S. Cl.
CPC .... *G06F 17/30554* (2013.01); *G06F 3/04842* (2013.01); *G06F 7/24* (2013.01); *G06F 17/30551* (2013.01)

(58) Field of Classification Search
CPC .. G06F 17/30554; G06F 7/24; G06F 3/04842; G06F 17/30551
USPC ........................................................ 715/823
See application file for complete search history.

(56) References Cited

U.S. PATENT DOCUMENTS 8,442,950 B2 * 5/2013 D'Souza ........... G06F 17/30312
 707/665
8,543,379 B1 * 9/2013 Michelsen .......... G06F 17/2705
 704/9

(Continued)

*Primary Examiner* — David Phantana Angkool
(74) *Attorney, Agent, or Firm* — Maynard Cooper & Gale, P.C.; Joshua V. Van Hoven

(57) ABSTRACT

The technology disclosed relates to formulating and refining field extraction rules that are used at query time on raw data with a late-binding schema. The field extraction rules identify portions of the raw data, as well as their data types and hierarchical relationships. These extraction rules are executed against very large data sets not organized into relational structures that have not been processed by standard extraction or transformation methods. By using sample events, a focus on primary and secondary example events help formulate either a single extraction rule spanning multiple data formats, or multiple rules directed to distinct formats. Selection tools mark up the example events to indicate positive examples for the extraction rules, and to identify negative examples to avoid mistaken value selection. The extraction rules can be saved for query-time use, and can be incorporated into a data model for sets and subsets of event data.

29 Claims, 44 Drawing Sheets

Related U.S. Application Data application No. 13/748,313, filed on Jan. 23, 2013, now Pat. No. 8,682,906, application No. 14/611,089, which is a continuation-in-part of application No. 13/747,177, filed on Jan. 22, 2013, and a continuation-in-part of application No. 14/067,203, filed on Oct. 30, 2013, now Pat. No. 8,983,994, which is a continuation of application No. 13/607,117, filed on Sep. 7, 2012, now Pat. No. 8,788,525.

(56) References Cited

U.S. PATENT DOCUMENTS

| | | | |
|---|---|---|---|
| 2007/0198565 A1* | 8/2007 | Ivanov | G06F 17/241 |
| 2007/0214134 A1* | 9/2007 | Haselden | G06F 17/30985 |
| 2010/0275128 A1* | 10/2010 | Ward | G06Q 10/06 |
| | | | 715/744 |
| 2011/0153646 A1* | 6/2011 | Hong | G06F 17/3089 |
| | | | 707/769 |
| 2011/0246528 A1* | 10/2011 | Hsieh | G06F 17/30516 |
| | | | 707/791 |
| 2013/0019019 A1* | 1/2013 | Lam | H04L 67/34 |
| | | | 709/226 |
| 2013/0080190 A1* | 3/2013 | Mansour | G06Q 10/10 |
| | | | 705/3 |
| 2015/0149879 A1* | 5/2015 | Miller | G06F 17/243 |
| | | | 715/226 |
| 2015/0154269 A1* | 6/2015 | Miller | G06F 17/30554 |
| | | | 715/780 |

* cited by examiner

500

Original Search: 501
search "error | stats count BY host

Sent to peers: 502
search "error | prestats count BY host (map)

Executed by search head: 503
Merge prestats results received from peers (reduce)

Preview

| Events | method | status | bytes |
|---|---|---|---|

✓ 1,000 events (before 12/15/14 2:57:04.000 PM) ∨    20 per page ∨    ⟨ Prev [1] 2 3 4 5 6 7 8 9 10 Next ⟩ filter    [go] [Apply]    Sample: First 1,000 events ∨    All events ∨

| Values ~1002 | Count ∨ ~1006 | % ~1008 |
|---|---|---|
| 327 | 7 | 0.700 |
| 206 | 5 | 0.500 |
| 848 | 5 | 0.500 |
| 787 | 4 | 0.400 |
| 225 | 4 | 0.400 |
| 244 | 4 | 0.400 |
| 384 | 4 | 0.400 |

Preview 901

| Events | method | status | bytes |

✓ 1,000 events (before 12/15/14 3:07:07.000 PM) 20 per page ∨ Sample: First 1,000 events ∨ All events ∨ < Prev [1] 2 3 4 5 6 7 8 9 10 Next > status=503 ꜛ Apply | All Events | Matches | Non-Matches

| _raw | method ◇ | status ◇ | bytes |
|---|---|---|---|
| ✓ 10.2.1.34 128.241.220.82 - - [15/Dec/2014 15:18:12:2209) "(GET) /category.screen?category_id=HEADSETS&JSESSIONID=SD65L8F- F8ADFF2 HTTP 1.1" (503) 872 "http://shop.splunktel.com/cart.do?ac- tion=changequantity&itemid=EST-27&product_id=CH-RIM-MICROUSB" "mozilla/5.0 (iPhone; U; CPU iPhone OS 4_3_3 like Mac OS X; en- US) AppleWebKit/533.17.9 (KHTML, like Gecko) Mobile/832" 2403 | GET | 503 | 899 |
| 10.2.1.34 94.229.0.20 - - [15/Dec/2014 15:18:03:089515] "(POST) /oldlink?itemid+EST-13&JSESSIONID=SD1SL9FF1A0FF7 HTTP 1.1" (503) (513) "http://shop.splunktel.com/cart.do?ac- tion=changequantity&itemid=EST-13&product_id=CH-APPLE-12W" "mo- zilla/5.0 (iPhone; U; CPU iPhone OS 5_0_1 likeMac OS X; ja_JP) AppleWebKit (KHTML, like Gecko) Mobile [FBAN/FBForiPhone;F- BAV/4.0.2;FBBV/4020.0;FBBV/iPhone4,1;FBMD/iPhone;FBSN;iPhone OS; FBSV/5.0.1;FBSS/2; FBCR;" 732 | POST | 503 | 513 |

Select Fields

Jul 24 00:03:05  172.22.98.4  %(STP-w-PORTSTATUS: (e4): STP status Forwarding

Jul 24 00:03:24  172.22.7.4  %LINK-I-Up:  e13

Jul 24 00:02:55  172.22.88.4  %LINK-I-Up:  e13

Jul 24 00:02:55  172.22.88.4  %LINK-I-Up:  e13

Jul 24 00:02:41  172.22.98.4  %LINK-W-Down:  e4

FIG. 13A

Jul 24 00:03:24  172.22.7.4  %LINK-I-Up:  e13

Field Name: Select a Field

| ip | |
|---|---|
| thing | |
| thing2 | |

Sample Value

Select Fields

Jul 24 00:03:05 (172.22.98.4) %(STP-w-PORTSTATUS:) (e4): STP status Forwarding —1315

⊗ Jul 24 00:03:24 (172.22.7.4) %LINK-I-Up: e13 —1325
⌞1324

Show Regular Expression >

Preview ⌐831

| Events | ip | thing | thing2 |
|---|---|---|---|

✓ 1,000 events (before 12/15/14 3:09:19.000 PM)

| filter | Apply | Sample: First 1,000 events ∨ | All events ∨ |
|---|---|---|---|

⌐1440

| _raw ◇ | | | | 1441 |
|---|---|---|---|---|
| ✓ Jul 24 00:03:24 | (172.22.7.4) | %(LINK-I-Up:) | (e13) | |
| ✓ Jul 24 00:03:05 | (172.22.98.4) | %(STP-w-PORTSTATUS:) | (e4): STP status Forwarding | 1443 |
| ✓ Jul 24 00:02:57 | (172.22.68.4) | %(STP-w-PORTSTATUS:) | (e3): STP status Forwarding | 1445 |
| ✓ Jul 24 00:02:55 | (172.22.88.9) | %(LINK-I-Up:) | (e13) | |
| ✓ Jul 24 00:02:54 | (172.22.76.4) | %(LINK-W-Down:) | (e3) | |
| ✓ Jul 24 00:02:51 | (172.22.70.4) | %(STP-w-PORTSTATUS:) | (e11): STP status Forwarding | 1446 |
| ✓ Jul 24 00:02:41 | (172.22.98.4) | %(LINK-W-Down:) | (e4): | 1447 |

1500

Jul 24 00:03:05  172.22.98.4  %(STP-W-PORTSTATUS:)  (e4): STP status Forwarding

Jul 24 00:03:24  172.22.7.4  %LINK-I-Up:  e13

⊗

Hide Regular Expression ⌄

Jul 24 00:03:05  172.22.98.4  %(STP-W-PORTSTATUS:)  (e4): STP status Forwarding

Jul 24 00:03:24  172.22.7.4  %LINK-I-Up:  e13

⊗

Hide Regular Expression ⌄

Show Regular Expression >
1931

| Events | b | a |

✓ 1,000 events (before 12/15/14 3:24:04.000 PM)   20 per page ∨   < Prev [1] 2 3 4 5 6 7 8 9 10 Next >

| filter | Apply | | Sample: First 1,000 events ∨ | All events ∨ | All Events | Matches | Non-Matches |

1800A

| | _raw ◇ | | | | | |
|---|---|---|---|---|---|---|
| ✗ | Jul 24 00:03:24 | 172.22.7.4 | %LINK-I-Up: | e13 | | |
| ✓ | Jul 24 00:03:05 | 172.22.98.4 | %STP-W-PORTSTATUS:⊗ | e4⊗: | (STP status Forwarding) | ←1842 |
| ✓ | Jul 24 00:02:57 | 172.22.68.4 | %STP-W-PORTSTATUS:⊗ | e3⊗: | (STP status Forwarding) | ←1843 |
| ✓ | Jul 24 00:02:55 | 172.22.88.4 | %LINK-I-Up: | e13 | | |
| ✓ | Jul 24 00:02:54 | 172.22.76.4 | %LINK-W-Down: | e3 | | |

Extract Fields
Specify your data source, then highlight the text you would like to extract.

Specify your data source
Sourcetype [ ▲▼ ]   syslog [ ▲▼ ]

Extraction Rule Preview
When you select text, we will give you a preview of the extraction rule you have created. Or you can manually enter and/or edit an extraction rule by clicking the button below.

[ Create extraction rule ]

☐ Dim fields that are already extracted.

Filter: [           ]   Show: All [ ▲▼ ]   Result type: Latest [ ▲▼ ]

| Timestamp | Event Records |
|---|---|
| 2012-12-17 10:35:38-0800 | Dec 17 10:35:38 ronnie nslcd[23629]: [40f750] passwd entry uid-colwilliams.cn=users.dc=osx.dc=splat.dc=coms contains too large uidNumber value |
| 2012-12-17 10:35:38-0800 | Dec 17 10:35:38 ronnie nslcd[23629]: [40f750] passwd entry uid-mpideon.cn=users.dc=osx.dc=splat.dc=coms contains too large uidNumber value |
| 2012-12-17 10:58:59-0800 | Dec 17 10:58:59 ronnie sshd[23362]: subsystem request for sftp |
| ... | |

Extracted values

*To begin, highlight an example value from the events to the left*

Extract Fields

Specify your data source, then highlight the text you would like to extract.

Specify your data source

Sourcetype: [ syslog ▼ ]

Field name

Extraction Rule Preview

3012 — [ p^|]\s+(?P<FIELDNAME>\w+) ]     FIELDNAME

☐ Dim fields that are already extracted.

Filter: [        ]    Show: [ All ▼ ]    Result type: [ Latest ▼ ]

| Timestamp | Event Records |
|---|---|
| 2012-12-17 10:35:38-0800 | Dec 17 10:35:38 ronnie nslcd[23629]: [40f750]: passwd entry uid-colwilliams,cn=users,dc=osx,dc=splat,dc=coms contains too large uidNumber value |
| 2012-12-17 10:35:38-0800 | Dec 17 10:35:38 ronnie nslcd[23629]: [40f750]: passwd entry uid-mpideon,cn=users,dc=osx,dc=splat,dc=coms contains too large uidNumber value |
| 2012-12-17 10:58:59-0800 | Dec 17 10:58:59 ronnie sshd[23362]: subsystem request for sftp |

3022   3024

Save this extraction

Extracted values  3016

*Passwd*  ▇▇▇▇  40%

*subsystem*  ▇▇  10%

*logfile*  ▏  2%

FIG. 30B

Extract Fields
Specify your data source, then highlight the text you would like to extract.

Specify your data source

Sourcetype: [syslog ▼]

Extraction Rule Preview

[^|\n^|:]\s+(?P<FIELDNAME>\w+)

Field name

[FIELDNAME]

☐ Dim fields that are already extracted.

Filter: [        ]   Show: [All ▼]   Result type: [Latest ▼]

Save this extraction

| Timestamp | Event Records |
|---|---|
| 2012-12-17 10:58:59-0800 | Dec 17 10:58:59 ronnie sshd[23362]: *subsystem* request for sftp |
| ... | ... |

3008

Extracted values ~ 3020

*Password* 40%
*subsystem* 10%
*logfile* 2%
...

| Timestamp | Event Records |
|---|---|
| 2012-12-17 10:35:38-0800 | Dec 17 10:35:38 ronnie nslcd[23629]: [40f750] passwd entry uid-colwilliams,cn=users,dc=osx,dc=splat,dc=coms contains too large uidNumber value |
| 2012-12-17 10:35:38-0800 | Dec 17 10:35:38 ronnie nslcd[23629]: [40f750] passwd entry uid-mpideon,cn=users,dc=osx,dc=splat,dc=coms contains too large uidNumber value |
| 2012-12-17 10:58:59-0800 | Dec 17 10:58:59 ronnie sshd[23362]: subsystem request for sftp |

Extracted values

*Roll over highlighted text to see previously saved extraction rules*

3204 — 3206

| Fieldname | Value |
|---|---|
| Server ID | 23629 |

| Timestamp | Event Records |
|---|---|
| 2012-12-17 10:35:38-0800 | Dec 17 10:35:38 ronnie nslcd[23629]: [40f750] passwd entry uid-colwilliams,cn=users,dc=osx,dc=splat,dc=coms contains too large uidNumber value |
| 2012-12-17 10:35:38-0800 | Dec 17 10:35:38 ronnie nslcd[23629]: [40f750] passwd entry uid-mpideon,cn=users,dc=osx,dc=splat,dc=coms contains too large uidNumber value |
| 2012-12-17 10:58:59-0800 | Dec 17 10:58:59 ronnie sshd[23362]: subsystem request for sftp |

Extracted values

*Roll over highlighted text to see extraction*

3210

| Fieldname | Value |
|---|---|
| Error | passwd entry uid-colwilliams,cn=users,dc=osx,dc=splat,dc=coms |
| Error type | passwd |
| User ID | colwilliams |

3212

3220

Extract Fields
Specify your data source, then highlight the text you would like to extract.

Specify your data source
Sourcetype: syslog

Extraction Rule Preview
When you select text, we will give you a preview of the extraction rule you have created. Or you can manually enter and/or edit an extraction rule by clicking the button below.

[Create extraction rule]

☐ Dim fields that are already extracted.
Filter: [ ]   Show: [All]   Result type: [Latest]

[Timestamp] — 3520

3512 — REC 1:
  Dec 12 2012
  10:35:38   — 3531A
  155.1.2.55
  18:35:38.265Z — 3533A
  ...

3513 — REC 2:
  Dec 12 2012
  10:35:38   — 3531B
  155.1.2.55

3521A — mmddyy
3522A
3508B — time/zulu
3521B — mmddyy

[Save this extraction]

Extract Fields
Specify your data source, then highlight the text you would like to extract.

Specify your data source
Sourcetype: syslog

Extraction Rule Preview
When you select text, we will give you a preview of the extraction rule you have created. Or you can manually enter and/or edit an extraction rule by clicking the button below.

[Create extraction rule]

☐ Dim fields that are already extracted.

Filter: [          ]   Show: All   Result type: Latest

| FIELD 1: | mmddyy | Timestamp | | |
|---|---|---|---|---|
| REC 1: | Dec 12 2012 10:35:38 | 155.1.2.55 | 18:35:38.265Z | be6dfe05.dl8  827ad1d8  ... |
| REC 2: | Dec 12 2012 10:35:38 | 155.1.2.55 | 18:35:38.266Z | be6dfe05.dl8  827ad1d8  ... |
| ... | | | | |
| FIELD 3: | Time/zulu | | | |
| REC 1: | 18:35:38.265Z | be6dfe05.dl8 | 827ad1d8 | ... |

[Save this extraction]

ADVANCED FIELD EXTRACTOR WITH MODIFICATION OF AN EXTRACTED FIELD

CROSS-REFERENCES TO RELATED APPLICATIONS

This application is a continuation-in-part of prior U.S. application Ser. No. 14/266,839, filed 1 May 2014, entitled "Real Time Indication Of Previously Extracted Data Fields For Regular Expressions," by R. David Carasso, Micah James Delfino and Johnvey Hwang, which application is a continuation of prior U.S. application Ser. No. 13/748,391, filed 23 Jan. 2013, entitled "REAL TIME INDICATION OF PREVIOUSLY EXTRACTED DATA FIELDS FOR REGULAR EXPRESSIONS," by R. David Carasso, Micah James Delfino and Johnvey Hwang, now U.S. Pat. No. 8,751,963, issued 10 Jun. 2014, both of which applications are incorporated herein by reference in their entirety.

This application is also continuation-in-part of prior U.S. application Ser. No. 14/168,888, filed 30 Jan. 2014, entitled "SAMPLING OF EVENTS TO USE FOR DEVELOPING A FIELD-EXTRACTION RULE FOR A FIELD TO USE IN EVENT SEARCHING," by R. David Carasso and Micah James Delfino, which application is a continuation of prior U.S. application Ser. No. 13/747,153, filed 22 Jan. 2013, entitled "VARIABLE REPRESENTATIVE SAMPLING UNDER RESOURCE CONSTRAINTS," by R. David Carasso and Micah James Delfino, now U.S. Pat. No. 8,751,499, issued 10 Jun. 2014, both of which applications are incorporated herein by reference in their entirety.

This application is also continuation-in-part of prior U.S. application Ser. No. 14/169,268, filed 31 Jan. 2014, entitled "PREVIEWING AN EXTRACTION RULE FOR A FIELD IN EXEMPLARY EVENTS AND MODIFYING THE RULE THROUGH COUNTER-EXAMPLE," by R. David Carasso, Micah James Delfino and Johnvey Hwang, which application is a continuation of prior U.S. application Ser. No. 13/748,313, filed 23 Jan. 2013, entitled "REAL TIME DISPLAY OF DATA FIELD VALUES BASED ON MANUAL EDITING OF REGULAR EXPRESSIONS," by R. David Carasso, Micah James Delfino and Johnvey Hwang, now U.S. Pat. No. 8,682,906, issued 25 Mar. 2014, both of which applications are incorporated herein by reference in their entirety.

This application is also continuation-in-part of prior U.S. application Ser. No. 13/747,177, filed 22 Jan. 2013, entitled "INTERFACE FOR MANAGING SPLITTABLE TIMESTAMPS ACROSS EVENT RECORDS," by R. David Carasso and Micah James Delfino, which application is incorporated herein by reference in its entirety.

This application is also continuation-in-part of prior U.S. application Ser. No. 14/067,203, filed 30 Oct. 2013, entitled "GENERATION OF A DATA MODEL FOR SEARCHING MACHINE DATA," by Alice Emily Neels, Archana Sulochana Ganapathi, Marc Vincent Robichaud, Stephen Phillip Sorkin and Steve Yu Zhang, which application is a continuation of prior U.S. application Ser. No. 13/607,117, filed 7 Sep. 2012, entitled "DATA MODEL FOR MACHINE DATA FOR SEMANTIC SEARCH," by Alice Emily Neels, Archana Sulochana Ganapathi, Marc Vincent Robichaud, Stephen Phillip Sorkin and Steve Yu Zhang, now U.S. Pat. No. 8,788,525, issued 22 Jul. 2014, both of which applications are incorporated herein by reference in their entirety.

TECHNICAL FIELD

The technology disclosed relates to formulating and refining field extraction rules. A primary use of these field extraction rules is at query time, as part of a late binding schema or in a data model.

BACKGROUND

An increasing amount of data is generated by machines, as the so-called Internet of Things gains momentum. Human-generated content was the focus of the original Internet. Now many types of machines are online and connected. These machines generate many types of data, most of which is never viewed by a human. A single machine can generate many distinct types of data.

It is challenging to make sense of machine generated data. One of the challenges is developing schemas and extraction rules. Often, the format of the data being collected has not been determined or formally described when data collection begins. Issues to be addressed may not be appreciated when the data is collected. This makes schema and extraction rule development a moving target.

SUMMARY

The technology disclosed relates to formulating and refining field extraction rules. A primary use of these field extraction rules is at query time, as part of a late binding schema or in a data model.

BRIEF DESCRIPTION OF THE DRAWINGS

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 10 illustrates a portion of a GUI that details extraction results for a particular field.

FIG. 11 illustrates a portion of a GUI with a key-value filter applied to events and sample events that satisfy the filter

FIG. 13A and FIG. 13B illustrate portions of a GUI that presents secondary examples of events to mark up during extraction rule generation.

FIG. 14 illustrates a portion of a GUI that previews results of applying an extraction rule formulated using multiple example events and positive examples of values to select.

FIG. 15A and FIG. 15B illustrate how one selected field can anchor selection of an additional field.

FIG. 18A illustrates a portion of a validation GUI.

FIGS. 30A, 30B, and 30C illustrate a non-exhaustive example of a use case of an embodiment of graphical user interface that may be employed to enable a user to create extraction rule and to obtain real time display of extracted values.

FIG. 31 illustrates a non-exhaustive example of a use case of an embodiment of graphical user interface that may be employed to display event records with an emphasis of fields defined by previously provided extraction rules.

FIGS. 32A and 32B illustrate non-exhaustive examples of a use case of embodiments of a graphical user interface to display extraction rules and/or fields associated with a selected portion of an event record.

FIGS. 35A, 35B, and 35C illustrate various non-limiting, non-exhaustive graphical user interfaces usable for identifying/selecting one or more locations within event records with splitable timestamp information.

DETAILED DESCRIPTION

Figure 1:
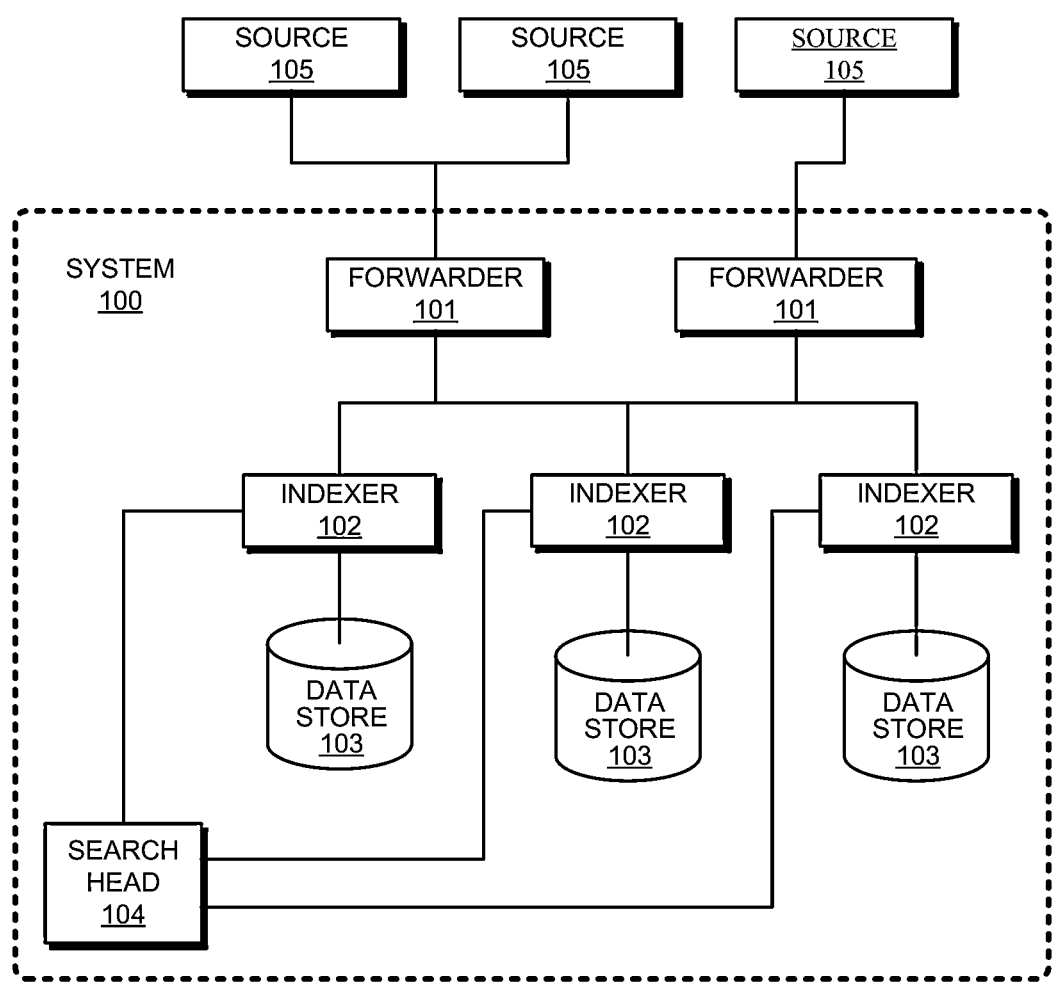
FIG. 1 presents a block diagram of an event-processing system in accordance with the disclosed embodiments.

This Detailed Description is organized into four sections: an Overview of the Technology Disclosed, a Common Disclosure Section, a Technology Disclosed section, and a section containing disclosure from Priority Applications.

The Overview of the Technology Disclosed briefly introduces some of the technology disclosed.

The Common Disclosure Section provides general disclosures of Splunk's database technology, which handle portions of raw data as events, especially large volumes of machine generated data.

The Technology Disclosed section explains the technology in FIGS. 8-19.

The Priority Applications section repeats selected disclosure from priority applications.

Overview of the Technology Disclosed

The technology disclosed relates to formulating and refining field extraction rules. A primary use of these field extraction rules is at query time, as part of a late binding schema. Use of a field extraction rule at query time instead of ingestion time is a major innovation, a paradigm shift from traditional relational data bases in which input data is transformed for storage in fields of a data object or of a table row. When a field extraction rule is applied to events, values can be extracted from portions of raw data in the events. The field extraction rule identifies a particular portion of the raw data from which the value is extracted. As part of a data model, the field extraction rule can also identify the data type of the extracted value.

In some environments, raw machine data can be collected from many sources before extraction rules or late binding schemas are formulated to extract values from the data. Extremely large data sets can result, because machines can be configured to generate very detailed logs. Unlike a traditional database environment organized into tables with rows and columns, this machine data can be collected in a raw format from data sets generated by machines and held for analysis if needed. The data held in the data store need not be extracted or transformed into fielded data objects. Analysis tools and a wizard can allow a user without extensive programming experience or training to create one or more extraction rules that deliver data values from events in machine data.

Tools improve formulation and refinement of extraction rules. In particular, series of analytical interfaces is described that can be combined into a wizard that guides a user through selecting a source type, selecting primary and additional example events, selecting fields to extract from the events, validating field extraction results and saving completed extraction rules for later use. The wizard can be particularly useful with complex data sets that can include many distinct formats of data.

Use of example events and multiple example events is described. Focus on a primary example event and secondary example events accommodates formulation of either a single rule that spans multiple distinct formats of data or multiple rules directed to distinct formats, in a divide and conquer approach. Sampling tools present selected event samples from which primary and secondary example events can be selected. Selection tools mark up the example events to indicate positive examples of what the extraction rules should extract. The tools also support naming fields into which extracted values are organized. A dialog window is one kind of tool used to name fields. Analysis tools reveal how extraction rules behave when applied to various samples of events, which can be re-specified and resampled. Specific values that should or should not be extracted by rule can be identified using the analysis tools. The extraction rules are generated taking into account both positive and negative examples. Validation tools allow identification of negative examples and refinement of extraction rules to avoid mistaken value selection. A wizard can combine these types of tools in a guided process that generates extraction rules.

Extraction rules are saved for query time use. Extraction rules can be incorporated into a data model for sets and subsets of event data. A late binding schema can be produced from one or more extraction rules. Extraction rules formulated by users can be combined with automatically generated extraction rules, such as rules that recognize key-value pairs in the machine data.

Common Disclosure Section

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1. Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

2. Data Ingestion

Figure 2:
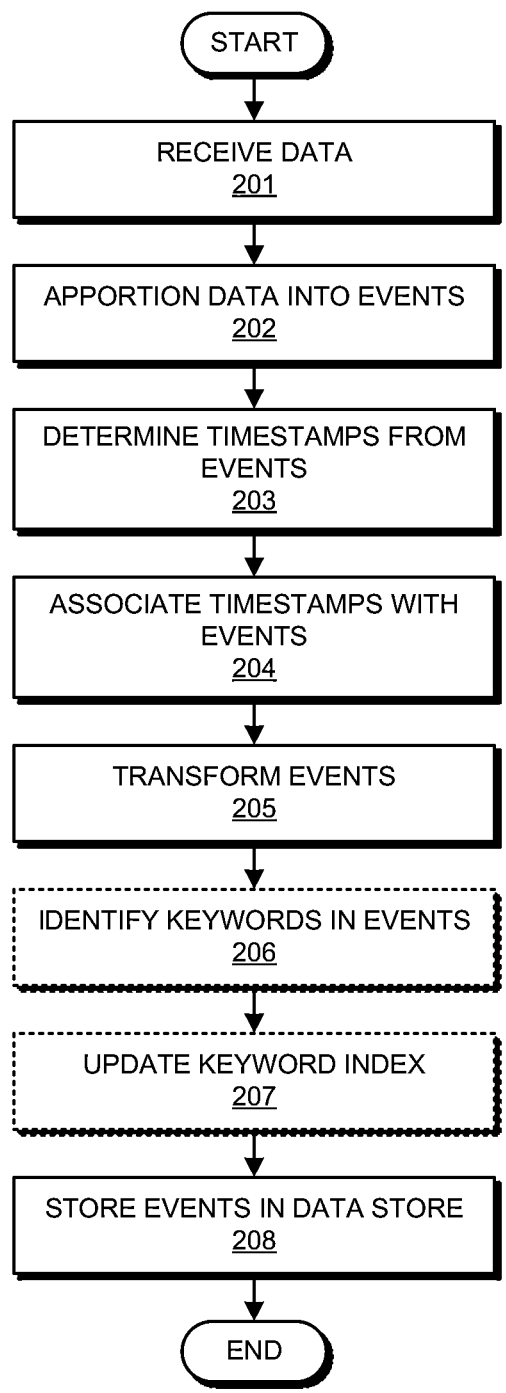
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

3. Data Modeling

A data model presents subsets of events in the data store and late-binding schema extraction rules applicable to the respective subsets. Objects that reference the subsets can be arranged in a hierarchical manner, so that child subsets of events are proper subsets of their parents. A user iteratively applies a model development tool to prepare a query that defines a subset of events and assigns an object name to that subset. A child subset is created by further limiting a query that generates a parent subset. A late-binding schema or sub-schema of field extraction rules is associated with each object or subset in the data model. Data definitions in associated schemas or sub-schemas can be taken from the common information model or can be devised for a particular sub-schema and optionally added to the CIM. Child objects inherit fields from parents and can include fields not present in parents. A model developer can expose a subset of the fields that are available with a data subset. Selecting a limited set of fields and extraction rules can simplify and focus the data model, while allowing a user flexibility to explore the data subset. Development of a data model is further explained in U.S. patent application Ser. No. 14/067,203 filed on 30 Oct. 2013. See, also, Knowledge Manager Manual, Build a Data Model, Splunk Enterprise 6.1.3 pp. 150-204 (Aug. 25, 2014).

A data model also can include reports. One or more report formats can be associated with a particular data model and be made available to run against the data model.

Data models feed into the PIVOT™ report generation interface. This report generator supports drag-and-drop organization of fields to be summarized in a report. When a model is selected, the fields with available extraction rules are made available for use in the report. A user selects some fields for organizing the report and others for providing detail according to the report organization. For instance, region and salesperson may be organizing fields and sales data can be summarized (subtotaled and totaled) within this organization. Building reports using the PIVOT™ report generation interface is further explained in Pivot Manual, Splunk Enterprise 6.1.3 (Aug. 4, 2014). Data visualizations also can be generated in a variety of formats, by reference to the data model. Reports and data visualizations can be saved and associated with the data model for future use.

4. Query Processing

Figure 3:
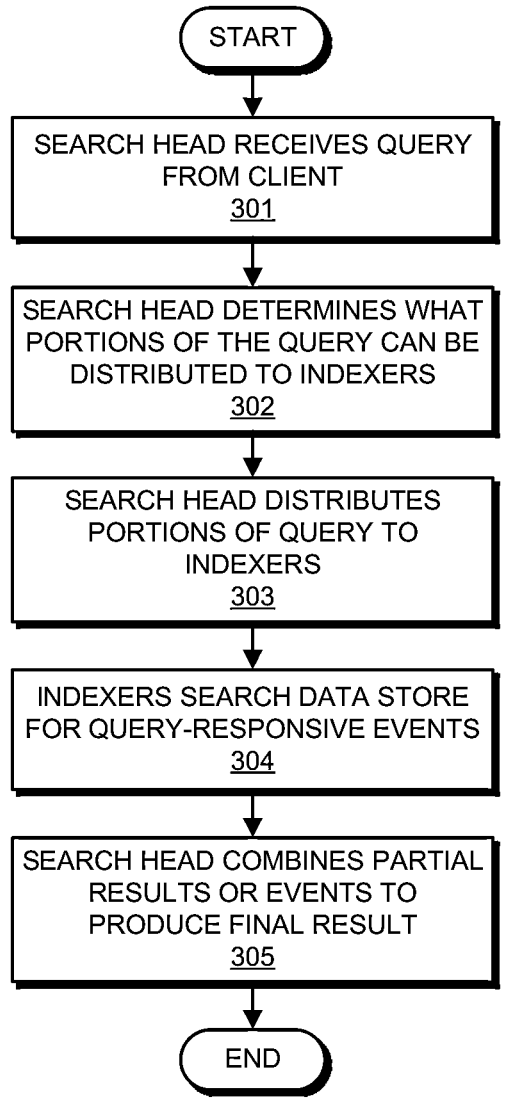
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. These criteria can include matching keywords or specific values for certain fields. In a query that uses a late-binding schema, the searching operations in block 304 may involve using the late-binding schema to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

5. Field Extraction

Figure 4:
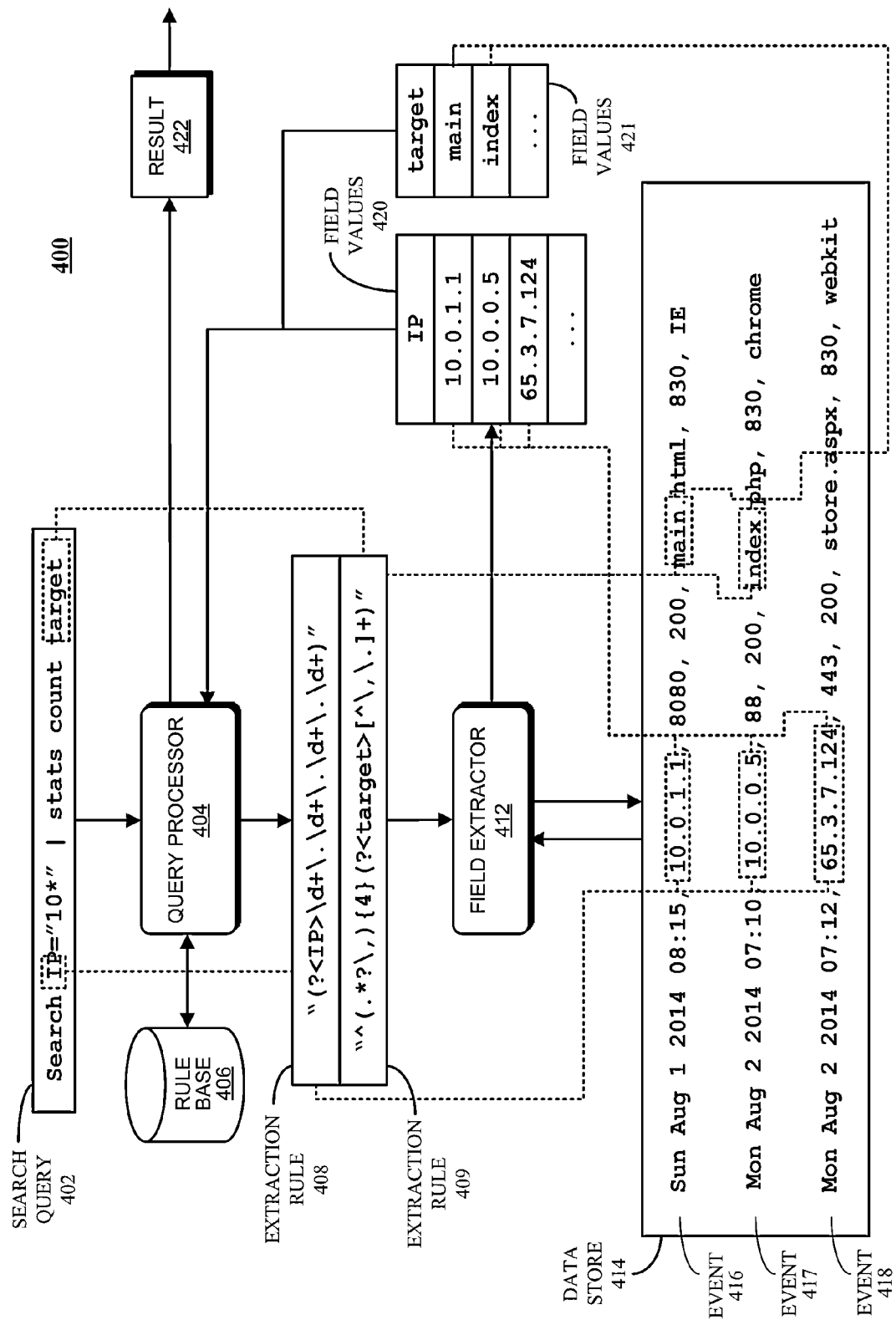
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

6. Exemplary Search Screen

Figure 6A:
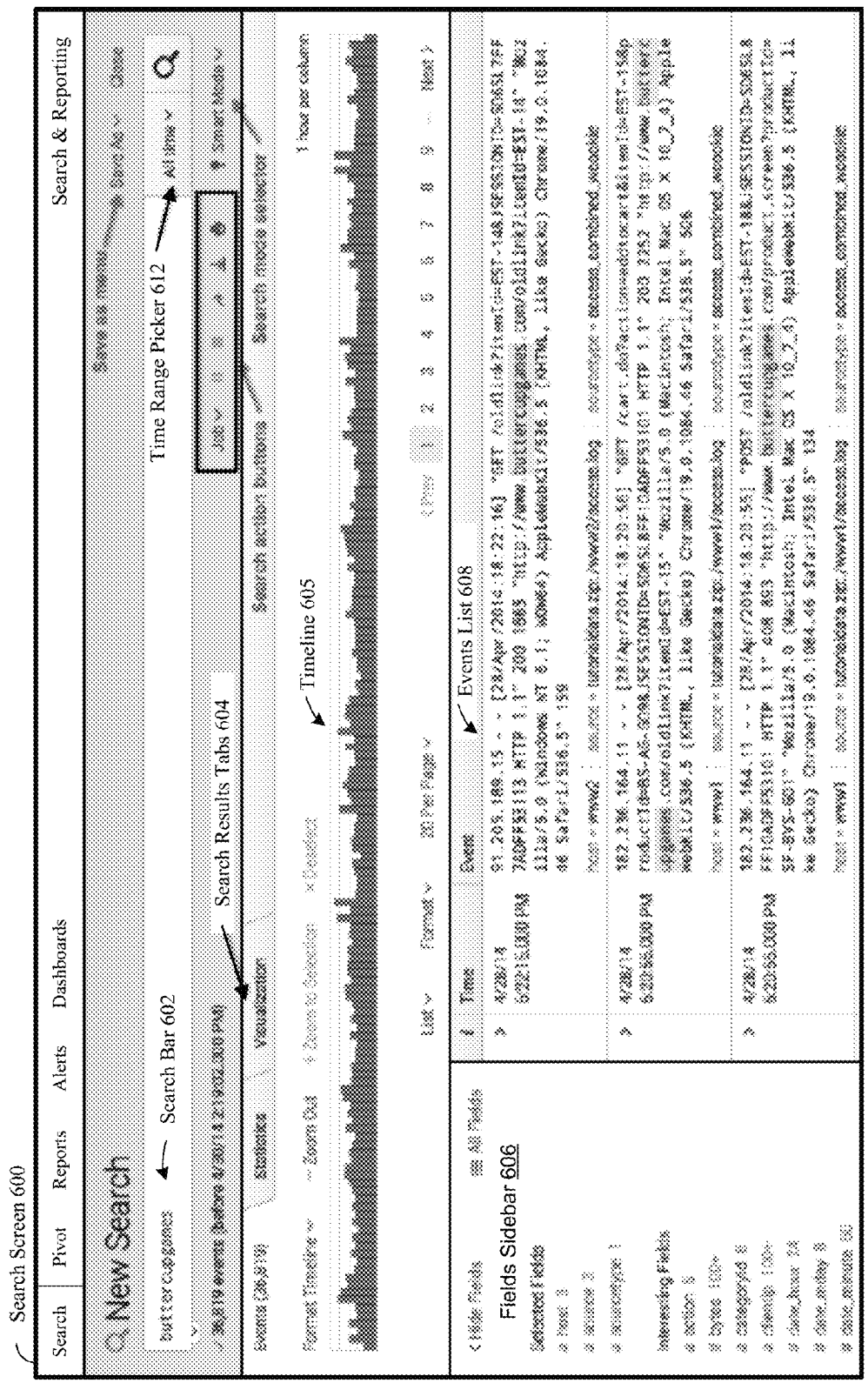
FIG. 6A illustrates a search screen in accordance with the disclosed embodiments.
Figure 6B:
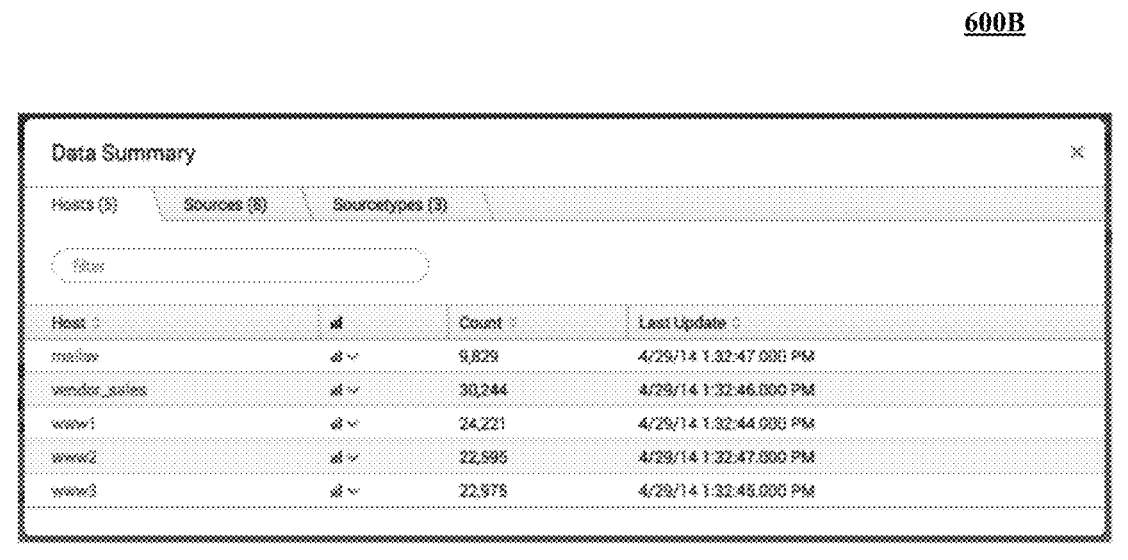

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

7. Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

7.2 Keyword Index

As described above with reference to the flow charts in FIG. 2 and FIG. 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, ISSUED ON Nov. 19, 2013, AND U.S. Pat. No. 8,412,696, ISSUED ON Apr. 2, 2011.

8. Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
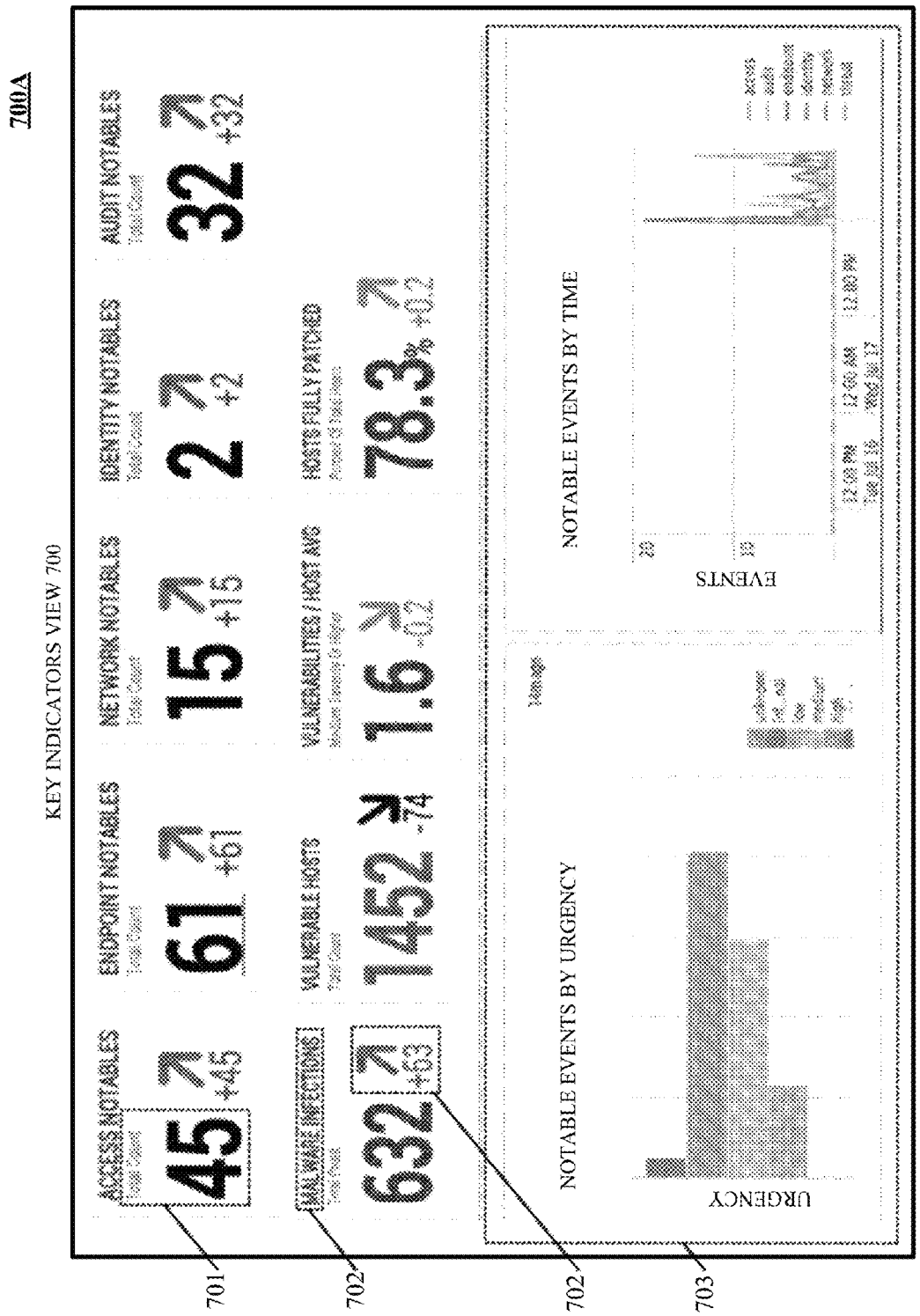
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
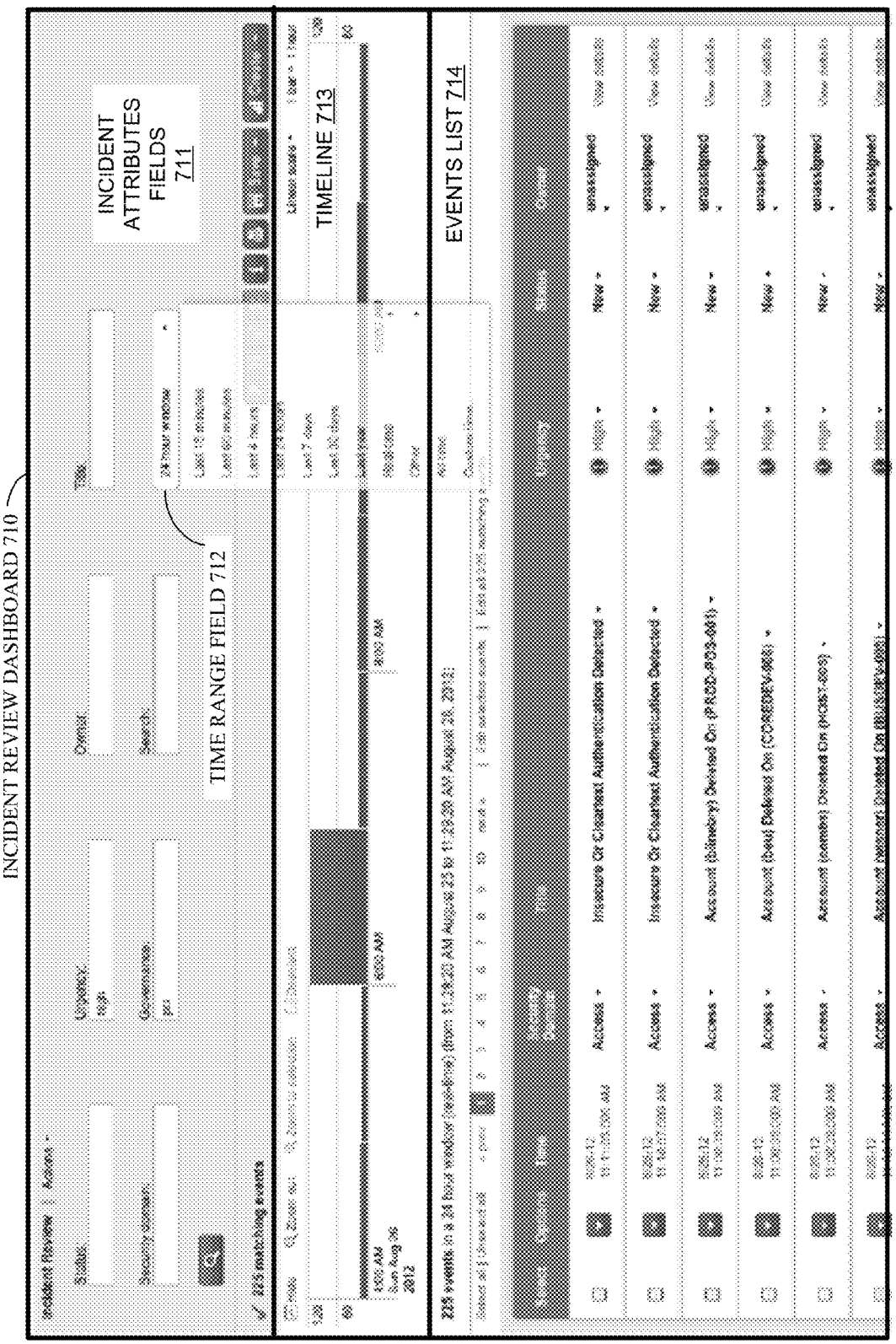
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

9. Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
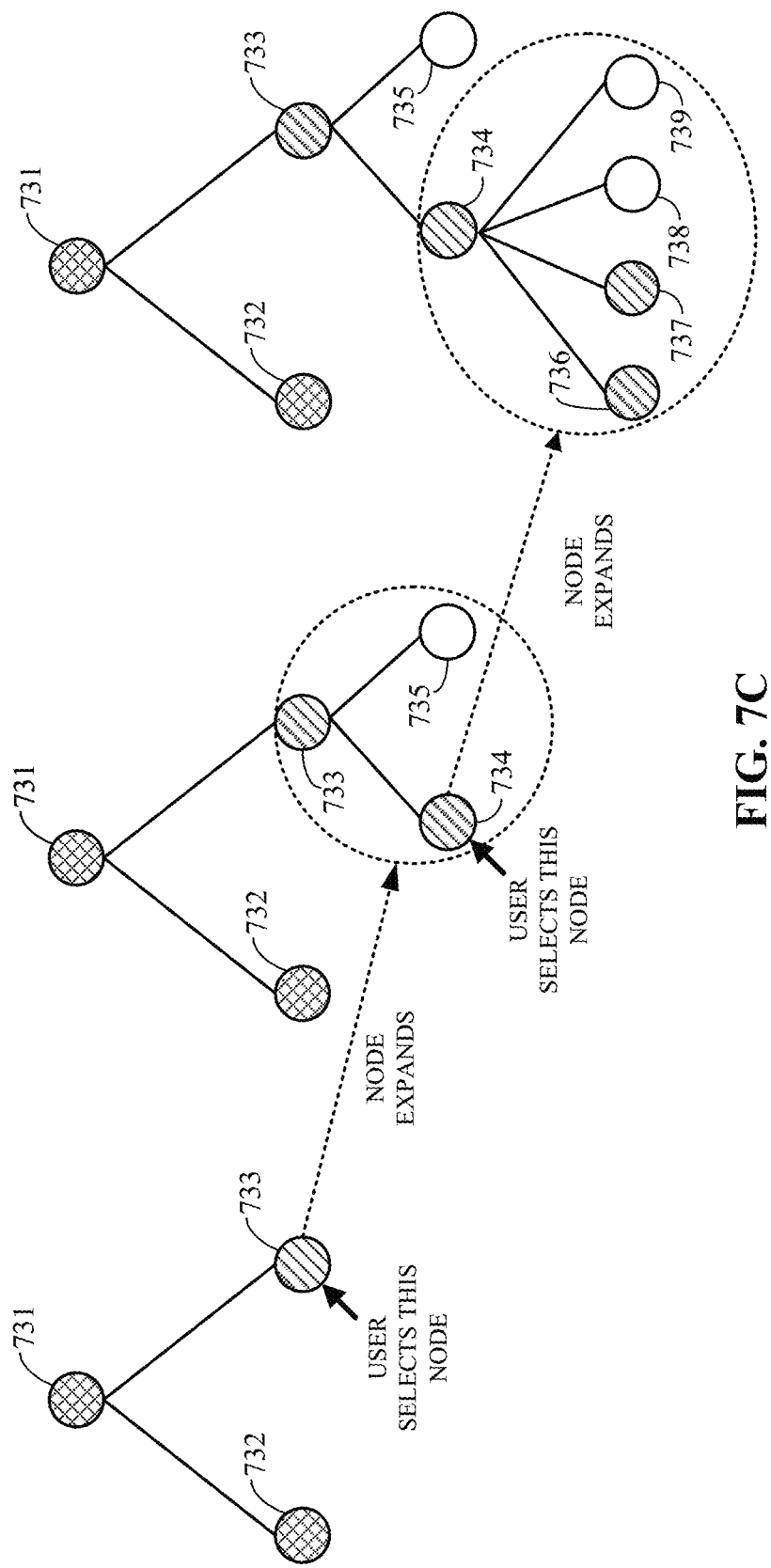
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
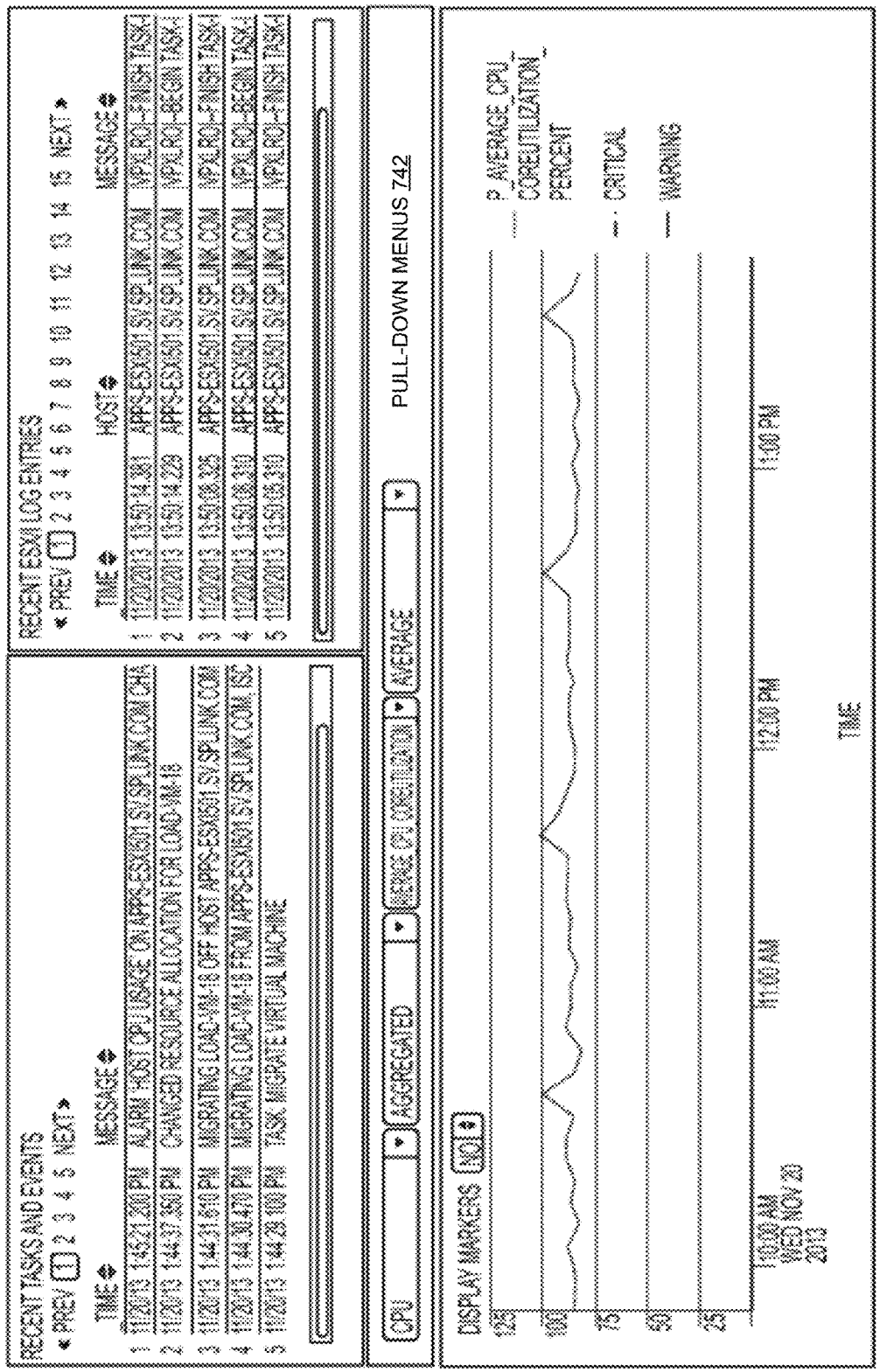
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Technology Disclosed

Figure 8:
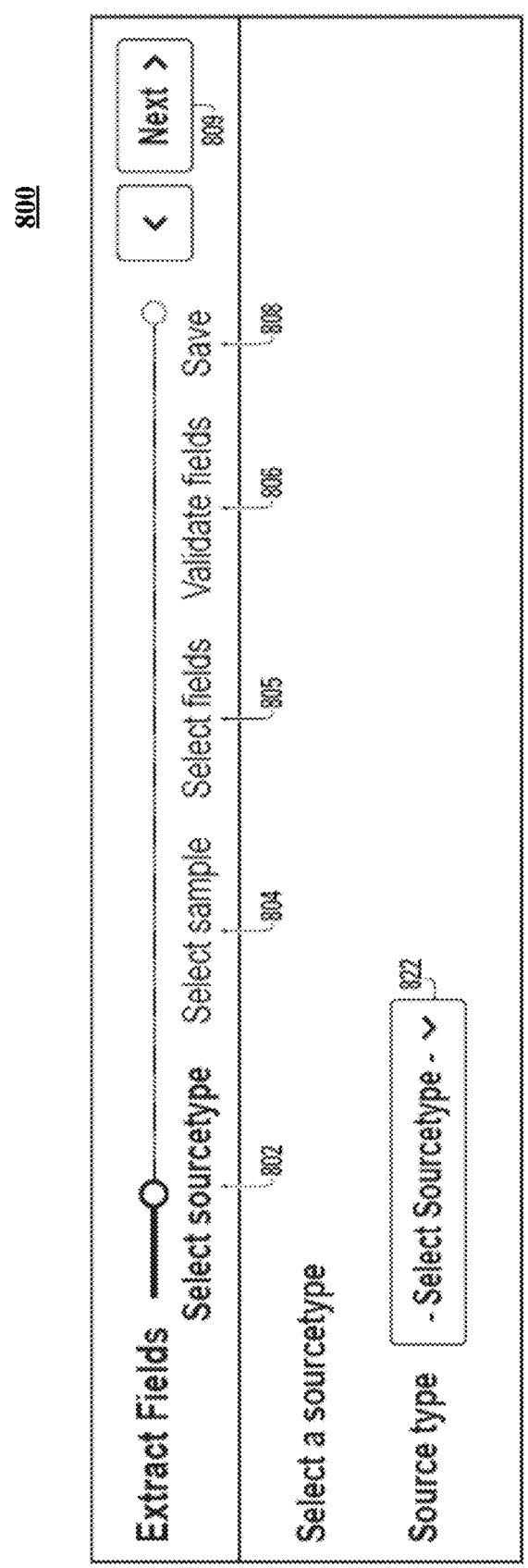
FIG. 8 illustrates a portion of a wizard that guides a user through a structured sequence of steps to produce extraction rules.

FIG. 8 illustrates a portion of a wizard that guides a user through a structured sequence of steps to produce extraction rules. The number of steps involved depends on the context from which extraction rule formulation begins. The number of steps also depends on designer preferences, so a system borrowing from the technology disclosed could separate features of a single step into multiple steps or could combine features of two steps into a single step. A computer-implemented method is, for convenience of understanding, described with reference to one or more modules running on hardware in a hardware environment as described above. However, the particular hardware mentioned is not necessary to this computer-implemented method. One GUI implementation of the computer-implemented method is illustrated, but the selection and arrangement of features for a particular GUI page will look different in alternative implementations. The appearance of the GUIs illustrated is not necessary to this computer-implemented method.

Five steps are illustrated in FIG. 8. Selecting a so-called sourcetype 802 is the first step. Generally, this involves identifying a data source or subset of a data source for which one or more extraction rules will be formulated. Examples of sourcetypes may be application servers, data servers, routers, load balancers or other machines of similar types. Sourcetypes can be further refined by type, region, usage or another sub type. When different machine brands or equipment generations produce distinct formats of machine data output, it can be convenient to sub type the sourcetype to make it easier to formulate extraction rules. Within a sourcetype, field names can be reused across sub types even when different extraction rules are required to extract field values from distinct formats of machine data.

FIG. 8 also shows a control for selecting a sourcetype 822. The illustrated control is a pull down menu. A variety of other controls could be used such as an auto-completion field or a scrollable list.

The progress line 802-808 indicates progress through the structured sequence from selecting a sourcetype 802, to selecting at least one example event 804, selecting fields from the example event 805, validating the selected fields 806, and concluding with saving 808 the extraction rule produced from this sequence of steps. A step selector 809 can move a user forwards or backwards through the structured sequence. When a user chooses to go back, the system can remember choices made and auto-complete them when the later step is revisited, if the prior choices remain valid.

The number of steps involved can be reduced by borrowing context from the system state that the user has reached when the extraction rule generator is invoked. The extraction rule generator is a module running on suitable hardware. When the user is already browsing data from a particular sourcetype using some other tool, a wizard can recognize that a sourcetype has been selected and either begin with the second step of selecting an example or can shorten the progress line from five steps to four.

Similarly, if browsing data has led the user to focus on a particular event, the wizard can recognize that a sourcetype and example event have been selected. Then, the process can begin with the third step or be simplified to just three steps. Recognizing context from other analysis tools allow a rule extraction module to begin at an appropriate step and minimize reentry of user selections. Progress through the structured sequence is illustrated in the following figures.

Not shown in any of these figures is a GUI implementation of selecting an event from a list in step 804, as this is straightforward.

Figure 9:
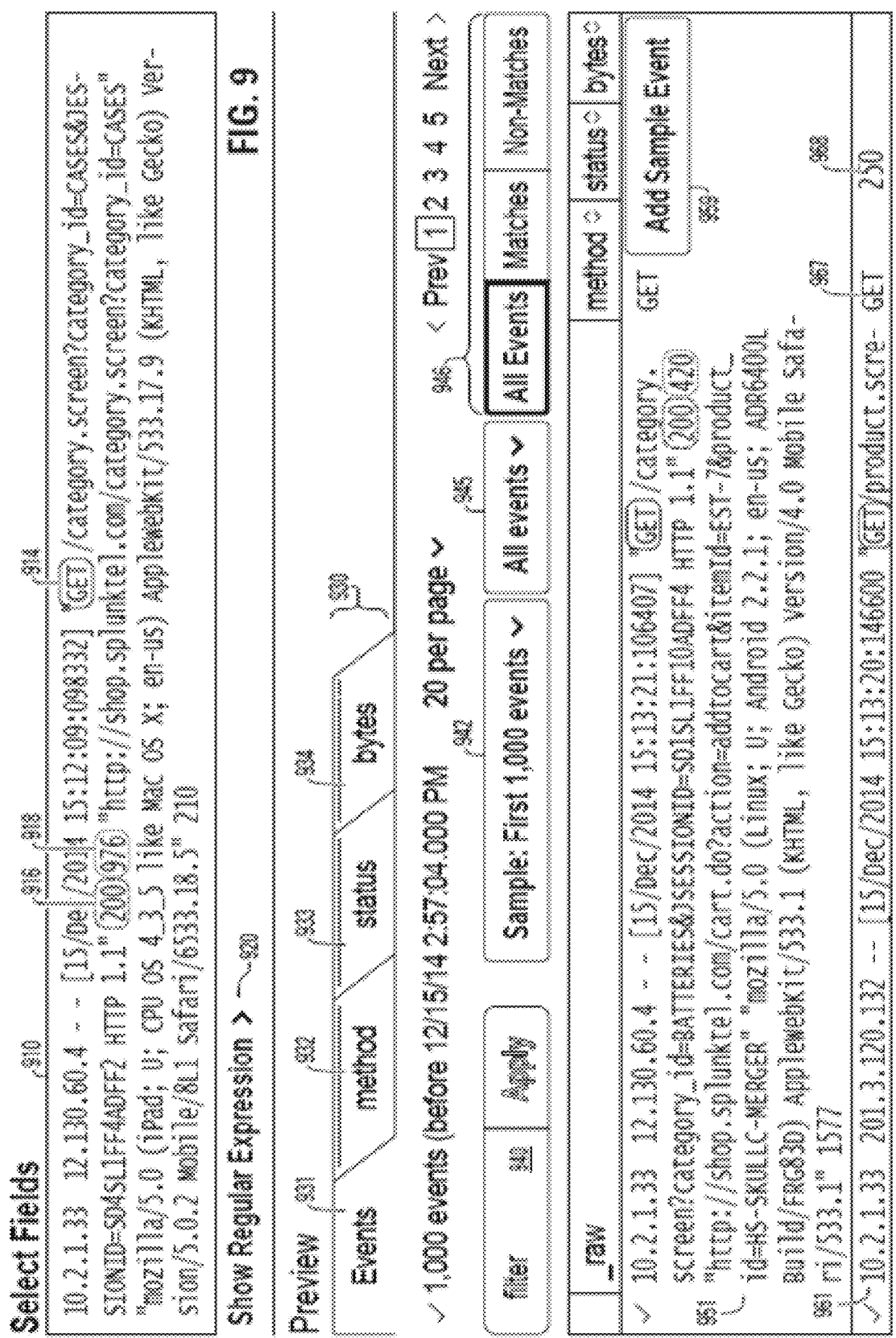
FIG. 9 illustrates a portion of a GUI that features one example event that has been marked up to indicate fields to extract and a preview of results of applying an extraction rule.

FIG. 9 illustrates a portion of a GUI that features one example event that has been marked up to indicate fields to extract and preview results of applying an extraction rule. This GUI implements the select fields 805 step in the structured sequence.

In area 910, an example event for markup has been selected. This example appears to be a log entry related to an HTTP GET command. In this context, so-called markup can be as simple as selecting one or more tokens to be extracted together. Highlighting by drag and release, touching, gesturing, clicking, double-click or spoken selection can be applied to one or more tokens. For this example event, three tokens already have been selected and given field names. The token "GET" 914 has been selected and given the field name "method" 932. The highlighting of the selected token can be color-coded or matched by another visual cue between the token 914, the named tab 932, instances of extracted method tokens in displayed events 951, 961, and the extracted token column 967 for the method field. Not all of these GUI elements need to be used in a particular implementation and any subset of them can be visual cue-coordinated. The token "200" 916 has been selected and named "status" 933. Similarly, "376" 918 has is the token for field "bytes" as in the size of the GET command or command response referenced by the log.

Control 920 allows a user to view the field extraction rule directly. User editing of the field extraction rule can be supported by the GUI, allowing the user to write an extraction rule in place of the automatically generated rule or to modify the automatically generated rule. In some implementations, a separate manual mode is supported for extraction rule development. The sampling and analysis tools support a manual development mode and can be combined with rule editing tools.

Events tab 931, when selected, can provide further controls and listing of events as shown in the figure. Among adjoining tabs 930, the field-associated tabs 932, 933, 934 each provide access to analysis of values extracted for a field, as illustrated in FIG. 10. In this illustration, the fields are named method 932, status 933, and bytes 934. The events tab 931 is directed to events, instead of fields. Two sample events 951, 961 appear in the figure. In each of the sample events, the extracted values for the three fields are highlighted. For event 951, the values "GET", "200" and "420" are highlighted. These values can be color coded to match tabs 932, 933, 934 and to further match values in the marked up example event 914, 916, 918. When a cursor or other selection tool focuses on event 951, an add example control 959 appears to add the example event as a secondary example. One or more additional example events can be added, as shown in FIG. 13A. The add example control 959 could also be implemented as a tool tip or a column of checkboxes. In this illustration, extracted values for the listed events are also displayed in columns for ease of scanning. This makes the extracted values visible both in context and in a column list. Various implementations can include just the display in context, in the body of the events, or just the columns 967, 968. The appearance can be user controllable and defaults can be set by sourcetype/sub type. Different appearances may be useful depending on the size and readability of an event record. In addition to event listing, the events tab can include controls for sampling and display of events.

The field-associated tabs 932, 933, 934 are further discussed in the context of FIG. 10.

Sampling controls 942, 946 determine the events analyzed and available for display. The time range sampling control 942 gives a user control over which subset of a larger event universe will be used for extraction rule development. One set of choices is illustrated in FIG. 12A using a pull-down list. Slider or direct entry controls also could be used to choose a time range. The choices 1215, 1225 specify a time range indirectly by number of events 1215 or directly by time 1225. In this example, the first or last (most recent) 1,000 or 10,000 events might be selected. More directly, the last 5 minutes, 24 hours or 7 days can be selected. A slider control could be calibrated to time and date, number of events or both. As in a video editing tool, the scale of a slider control could be adjustable to allow coarse selection in an available range and fine selection once focused on part of the available data. Direct entry controls could identify starting and stopping times or just one time and a number events before, after or centered on the specified time.

In some implementations, text is supplied that reminds the user of the current filters and/or data subset that are being used. In FIG. 8, text appears below tabs 930. The text illustrated confirms the time range selection applied. Similar text could be supplied to describe application of other controls.

For events that have a different primary organization than time, such as geo-located events, other controls for selecting a primary sampling range could be substituted for or added to the illustrated time range sampling controls. A geo-located control could use a location selection and circle or rectangle centered on a selected location. Or, a geo-located control could select one or more predefined regions, such as a political subdivision, an SMSA, a zip code or similar territory. A geo-located control could be combined with a time range control of sampling.

Sampling strategy control 945 further determines how the events analyzed are selected. Three options of all events 1235, diverse events 1245 and rare events 1255 are illustrated in a pull down control in FIG. 12B. In one implementation, these controls refer to whether a sample is clustered before sample events to display are selected. There are many ways to cluster a sample. Some ways to form clusters are described in the incorporated by reference application Ser. Nos. 14/168,888 and 13/747,153, parts of which are reproduced below. In general, clustering or cluster analysis approaches can be adapted from many sources. There are on the order of 100 published cluster algorithms, many of which are adaptable to event sampling. Cluster Analysis. Wikipedia. [retrieved 2015-01-11]. Retrieved from the Internet <URL: http://en.wikipedia.org/wiki/Cluster_analysis>. The sampling strategy control 945 determines whether clustering is applied 1245, 1255 or not 1235. Two sampling strategies from clusters are offered in the illustrated. Selection of diverse events 1245 favors a sample of events from large clusters. Selection from large clusters covers a large and diverse proportion of the sampled events. To accomplish diversity, one sampling strategy is to sample from larger clusters and pick a predetermined number of samples, e.g., one, two, three, five, ten or in that range of samples from each of the larger clusters. The number of samples selected can automatically adjust to the number of clusters defined. The number of clusters defined can be responsive to a user selectable similarity threshold for forming a cluster or a user selectable control over the number of clusters formed (as used in statistical factor analysis.)

A similarly threshold control can determine a number of similarity parameters, including how special tokens, such as IP addresses or URLs/URNs/URIs, are handled. For instance, the similarity threshold can determine how many of the four octal groups in an IP address need to match for two IP address tokens to be considered matching.

When there are a small number of clusters, such as 20-100 clusters, the clusters can be rank ordered in size and the largest clusters used for sampling. When the number of clusters is larger, exceeding a predetermined number of samples to display to a user, or when a different approach is desired, selection among the larger clusters may follow a different pattern. For instance, the top quartile clusters of or the clusters that hold at least one half percent of the event population could be identified. From the identified clusters, a further random or periodic selection could be applied. The result of selecting the diverse events control 1245 is that the system picks a handful of sample events from each of the identified larger clusters. Any example events being used for highlighting can be considered part of the sample. The data transmitted for display to the user reveals diverse patterns of event data that are from larger, more common clusters of events.

The rare events control 1255 also involves clustering, but favors samples from small clusters. Either smallest clusters or clusters within the lower quartile or other cluster size band can be identified. A minimum cluster size can be applied to avoid devoting too much user attention to unique or nearly unique events in a large event population. The result of selecting the rare events control 1255 is that the system picks a handful of sample events from each of the identified smaller clusters. The data transmitted for display to the user reveals rare instances of event data, which can be useful in refining an extraction rule or in deciding how many extraction rules are needed to extract data from a sourcetype that has multiple distinct formats and that requires multiple extraction rules to handle the distinct formats. A combination of controls, including the time range and sampling strategy controls, can be applied before or after an example event is selected and marked up for field extraction.

After selection of fields within the example event, a match or not control 946 can be applied. Match or not refers to whether the current version of the extraction rule succeeds in extracting all specified fields or not from a particular event. Either because the sample events have distinct formats that are not all handled by a single extraction rule or because the rule under development needs refinement, there can be some or many sample events that the current extraction rule does not match or fails when applied. Three values of match or not are illustrated as alternative buttons, like radio buttons but without the dots. The match or not selections illustrated 946 are all events, matches and non-matches. These controls could be presented as a pull down menu or other type of control. Selection of all events, clears this filter. Selection of the matches option, filters sample events to just those events that the current extraction rule succeeds in matching or in extracting values from. Selection of the non-matches option filters sample events to ones that the current extraction rule fails to match or cannot extract values from. The match choice of control 946 can be used to identify negative examples. The non-match choice of control 946 can be used to identify additional example events and provide additional positive examples, as illustrated in FIGS. 13A-13B. Controls transmitted to a user for display can Filter 940 can accept keyword or key-value filters. A key-value filter specifies both a field name and a field value. The field name can either be a system extracted field name or a field name specified with an extraction rule. A value can include a wild card character. Or the value can simply be matches or exists. When a filter 940 is specified, only events that match the filter are transmitted for displayed. This filtering behavior also can be incorporated in extraction rules, as described for FIG. 16, below.

The controls in FIG. 9, as a group, support selection of fields, automatic generation of field extraction rules and direct entry or editing of rules.

FIG. 10 illustrates a portion of a GUI that details extraction results for a particular field named "bytes." The preview panel in FIG. 10 includes many of the same controls as FIG. 9. However, the match or not controls 946 are not included because this tab analyzes matches. The figure shows each value extracted on a separate row, with four columns. The presentation can be arranged in other ways, such as columns or a pie chart. Values extracted 1002 of the illustrated table are shown in the left-hand column. Some of the values extracted from the sample events are "327", "205", and "643". Another column 1005 gives a count for the number of times each value in column 1002 was extracted. The text just below the events tab 931, indicates that the sample includes 1000 events. Thus, a count of seven extractions of the "327" bytes corresponds to 0.7% of the rows in the sample. This percentage appears in column 1008. This fraction can be graphically illustrated in an additional column 1009 as a bar graph or other visual cue. The rows can further implement row controls, for instance by a hyperlink from a value in column 1002, that populate the filter control 940 with the selected value. As shown in FIG. 11, selection of a row control reverts the GUI to the events tab 931 with a key-value filter set in the filter control 940. The user can scroll through rows of this field-value analysis tab and find values are out of place. For instance, extraction of the text string for the number of bytes would be an apparent error. A user could select the row control for the character string appearing in the values column 1002 and use tools to select or validate fields to refine the extraction rule so that character strings would not be selected for the number of bytes field. Extracted values that look wrong, such as characters in a numeric column, and values that are unique, such as in a status column, are more easily spotted by a user in this analysis GUI than in an events list GUI. This can also provide an experience of 'coverage' or 'confidence rating' within a sourcetype. 'Coverage' is the percentage of tokens within events of a sourcetype that have extracted values. For example, if all words of all events within a sourcetype have associated extractions, the sourcetype would be considered to have 100% coverage. 'Confidence rating' is a form of analysis of existing extractions that make up the coverage, providing insight into the estimated success of the extractions, rating individual extractions based on the typical, token type, format, or language. For example, if BYTES is comprised of 99%+ integer values, and a word like "penguin' or a special character such as '&' is encountered, a flag can be raised and the confidence rating of the sourcetype's 'coverage' can be impacted.

FIG. 11 illustrates a portion of a GUI with a key-value filter applied to events and sample events that satisfy the filter. The user could reach this GUI either by selecting a row in the status tab for extracted status "503" or by entering the key-value pair "status=503" in the filter control window 940. Following entry of the key-value pair shown, the events transmitted for display 1151, 1161, 1171 all have the value "503" in the status field. This value is highlighted in each of the rows and also displayed in the status column 968. From the other extracted value columns for method 967 and bytes 969, one can see that the status is not tied to either the method or the number of bytes, as the values in those extracted columns vary among events with status "503". Use of the filter window 940 does not change the available tabs 930 or the controls for sampling and display 942, 943, 946.

Figure 12B:
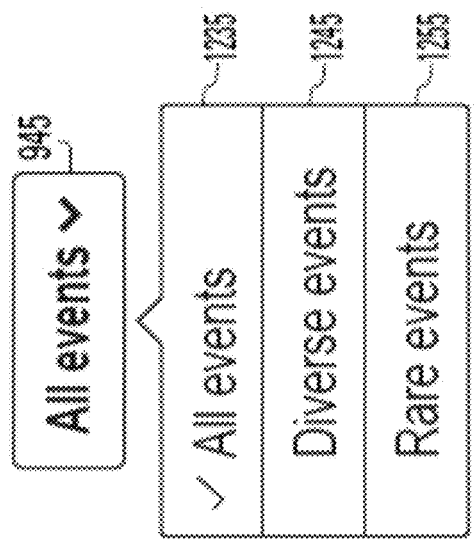
FIG. 12A and FIG. 12B illustrate pull down menu implementations that select among sampling strategies to determine events to analyze.
Figure 12A:
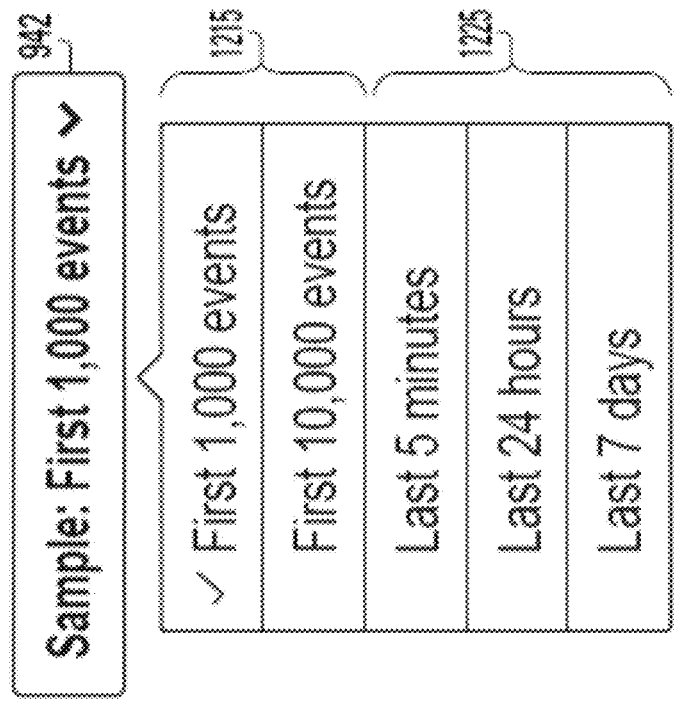

FIGS. 12A-12B illustrate pull down menu implementations that select among sampling strategies to select sample events. In FIG. 12A, choices in the first pull down menu 942 allow selection of events occurring in the beginning of the data source 1215, and for selection of events occurring at the end of the data source 1225. The first pull down menu 942 has a label that equals the word "Sample:" with the selection made from the first pull down menu appended. In this example, the label of the first pull down menu 942 is "Sample: First 1,000 events". This label changes to match whatever selection is made from the first pull down menu 942. The first pull down menu 942 can contain any number of time filters, and their presentation for selection is not limited to the method presented in FIG. 12A.

In FIG. 12B, the second pull down menu 945 allows for selection of all events 1235, diverse events 1245, or rare events 1255. "All events" 1235 would remove this as a filter for the extraction. "Diverse events" 1245 and "Rare events" 1255 are examples of cluster types defined above. In this example, as "All events" 1235, "Diverse events" 1245, or "Rare events" 1255 are selected from the second pull down menu 945, the label for object 945 is changed to match that of the selection.

FIGS. 13A and 13B illustrate portions of a GUI that presents secondary examples of events to mark up to generate a more-inclusive extraction rule. In FIG. 13A, only event 1315 and not events 1325, 1335, 1345, 1355, have had fields identified for extraction by the initial extraction rule, which was based on just one example event. This is indicated by lack of marking of fields in events 1325, 1335, 1345, 1355. Selection as secondary example events is indicated by the indentation, the circle-x control to the left of events 1325, 1335, 1345, 1355, and the position below primary example 1315. These secondary example events were selected, for example, using control 959 in FIG. 9. In this figure, the primary example 1315 already has been marked up and the secondary examples are available to mark up.

The initial markup of primary example 1315 selected fields named "IP" 1312, "thing" 1313 and "thing2" 1314. The "thing" field 1313 in event 1315 contains the string "STP-W-PORTSTATUS". Using just this example, the first extraction rule was so tailored to the string "STP-W-PORT-STATUS" that none of the secondary events 1325-1355 matched the extraction rule. Closer analysis of the secondary events reveals why.

The secondary example events are not quite ALL CAPS. Some of the secondary events, e.g. 1325, have the string "LINK-I-Up" which is MIXED-Case. The user could select "LINK-I-Up" in event 1325 as a positive example of a value to be extracted. The user also could select "LINK-W-Down" in event 1355 as a positive example. With one or both of these additional positive examples, the system generates an updated the field extraction rule. The updated field extraction rule cannot require capitalized letters in the "thing" field; it might not require capital letters or not require capital letters after one or two hyphens "-". The updated field extraction rule would then match events 1325, 1335, 1345, and 1355, in addition to event 1315, which matched the initial field extraction rule.

Marking up a secondary example can further include linking marked up text to an previously created field, as a second example of what to extract for that field. In FIG. 13B, a pop-up window 1327 is illustrated for selecting a field name among the fields that appear in the primary example. The user selects the field name for the marked up text in the secondary example event. In this figure, an IP address 1324 has been selected from event 1325. The field name pop up 1327 displays the names of three previously created fields that appear in event 1315. The marked up IP address 1324 in event 1325 is assigned the field name "IP" 1329.

FIG. 14 illustrates a portion of a GUI that previews results of applying an extraction rule formulated using multiple example events and positive examples of values to select. This figure shows that introducing the second example event 1325 causes the system to update the whole extraction rule, not just the part of the extraction rule that captures the highlighted secondary positive example 1324. A valid secondary example event 1325 contains the same fields to extract as the primary example event 1315. This secondary example event is valid because the final string in the primary event, "STP status Forwarding" has not been highlighted for extraction. The system automatically finds all the fields highlighted in the primary example event 1315 somewhere within the secondary example event 1325 and updates the extraction rule accordingly. Because the secondary example event includes the mixed case text "LINK-I-Up", a new extraction rule is generated that coincidentally matches events 1445, 1447, in addition to events 1441, 1444 that have the same "thing" field value as event 1325. The checkmarks in column 1440 reinforce the highlighting in the events, indicating that all the events 1441-1447 in this display match the extraction rule.

FIGS. 15A and 15B illustrate how one selected field can anchor selection of an additional field. This sequence of figures illustrate how so-called anchoring of a difficult to extract field 1517 to a nearby easily extracted field 1516 can aid in the generation of an effective extraction rule 1545, 1546. Not shown is failure of the system to generate an extraction rule with these primary and secondary example events, when the only field highlighted is the token string 1517 "STP status forwarding"—there is no separate figure illustrating a failure message. An automatic field extraction process, in some instances, might initially fail to formulate a rule that would extract the text in field 1517, due to secondary example 1525. This might be because the primary example event has one more field than the secondary example event. The extraction rule for two of the fields in common between the primary and secondary example events is illustrated 1545. In FIG. 15B, field 1517 has been highlighted and a new extraction rule generated. The new extraction rule succeeds because it selects zero or more characters after the anchoring field 1516. An astute programmer in the regular expression language might recognize that an optional extraction field is available they could be used in the extraction rule as an alternative to zero or more characters. Either way, specification of another field to extract is necessary before a trailing field of zero or more characters can be extracted.

Figure 16:
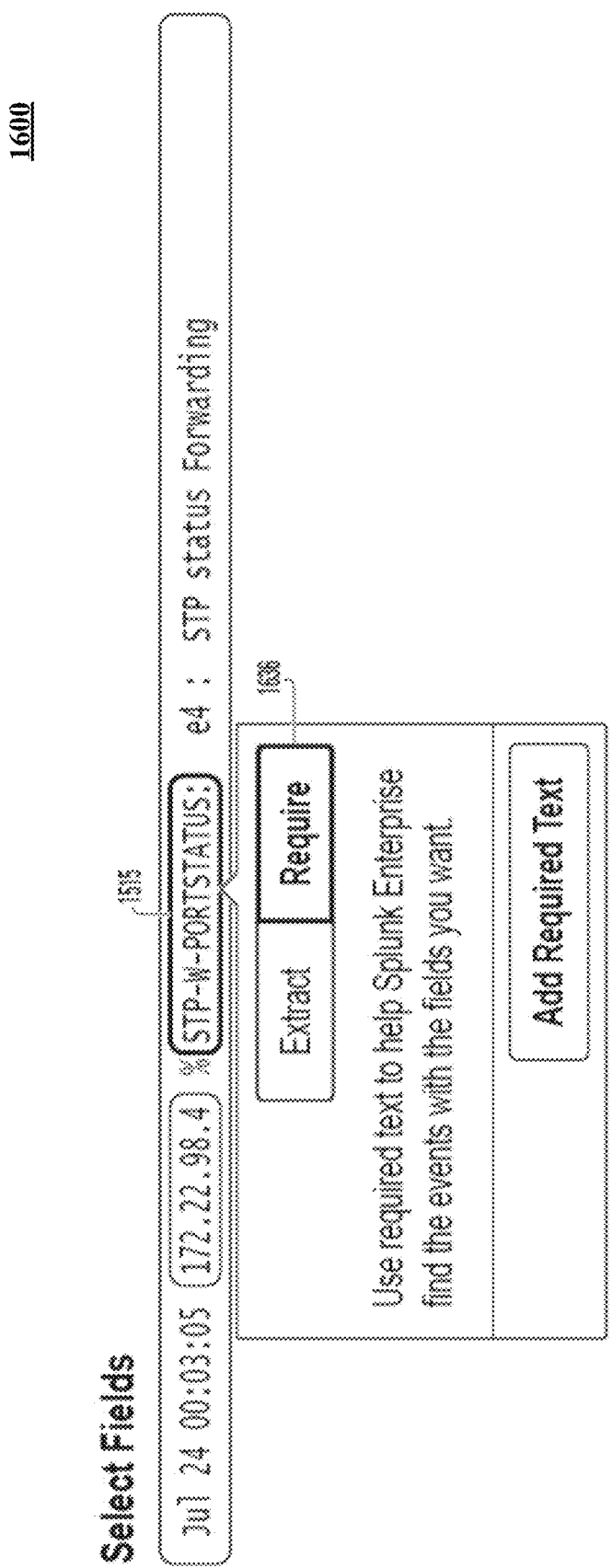
FIG. 16 illustrates a portion of a GUI used to require that a particular value be found in an event for an extraction rule to apply to an event. This can be particularly useful when the events appear in multiple distinct formats that require multiple extraction rules to correlate data among the formats.

FIG. 16 illustrates requiring that a so-called required value be found in every event selected. This can be particularly useful when the events appear in multiple distinct formats that require multiple extraction rules to correlate data among the formats. This figure shows another way to deal with the diversity in number of fields for events with the token "STP-W-PORTSTATUS" 1315, as opposed to the link up and link down events 1325-1355. The sample event type 1315, as illustrated in FIGS. 13-15 has one more field 1517 then the other event types. Going back to the example above, use of a required value can be used to create multiple extraction rules covering diverse format. In the example above, one extraction rule optionally extracted zero or more characters following the third field. Using one or more required field values, separate extraction rules can be specified for events with different numbers of fields, events in two distinct formats. FIG. 16 illustrates a pop-up control used to require 1636 presence of the token "STP-W-PORTSTATUS" 1315 in order for the extraction rule to succeed. In one implementation, a token can either be extracted or required to be present, but not both. In other implementations, the same token could be required and extracted.

Figure 17:
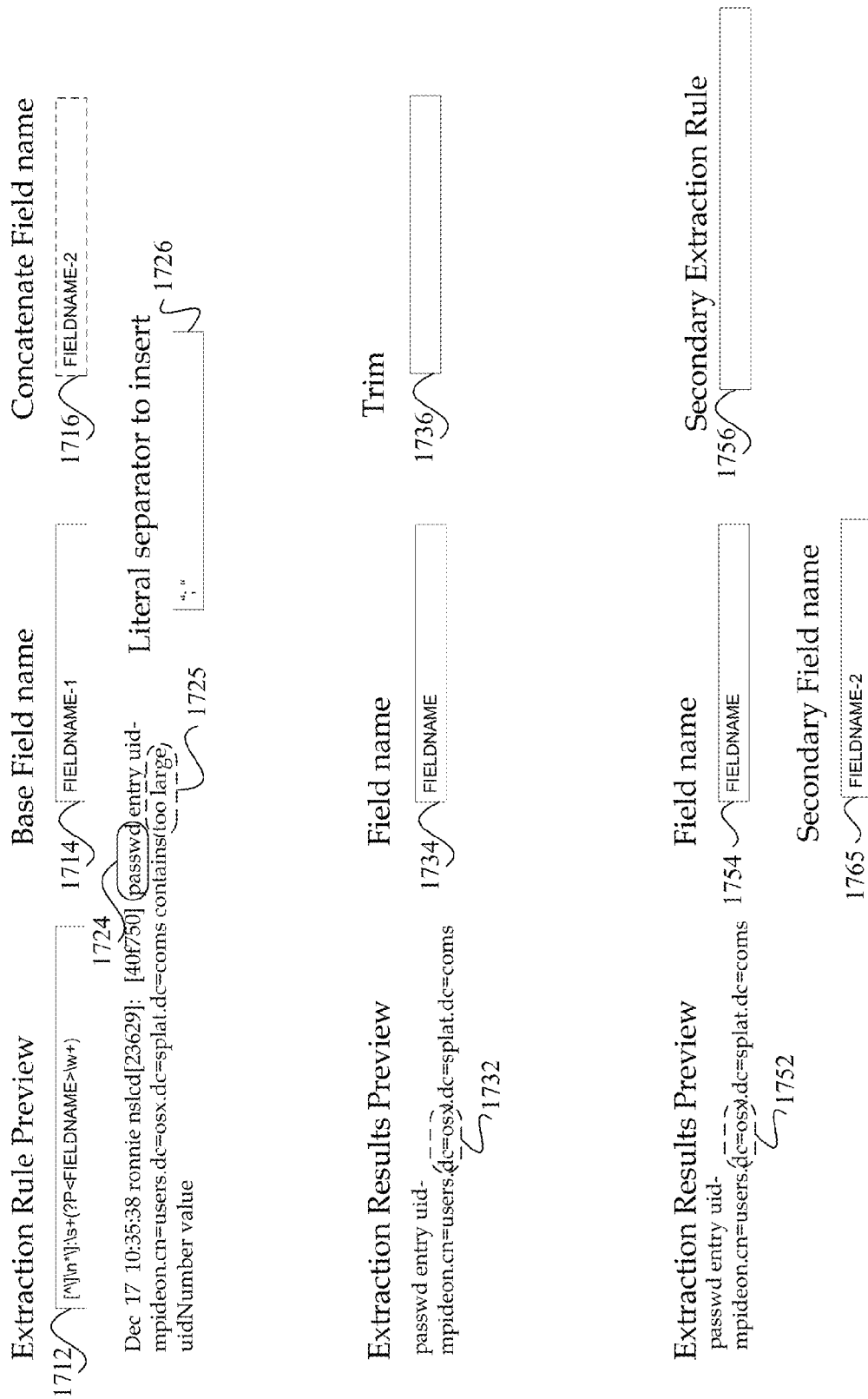
FIG. 17 illustrates three extensions of field extraction rules: concatenate, trim and extract-from-extraction.

FIG. 17 illustrates three extensions of field extraction rules: concatenate, trim and extract-from-extraction. In the context of a late-binding schema, complex definition of fields is problematic, because the fields are repeatedly extracted at query time, rather than being extracted and transformed once, for loading into structured fields (ETL—extract, transform and load). Nonetheless, some extensions are proposed. The examples in FIG. 17 do not correspond to the examples described below. Instead, they are intended to indicate an example interface that could be used with the data examples that follow.

Field extraction rules are extended by allowing concatenation of two extractions 1714, 1716 for one field with an optional literal 1726 separating the extractions. During selection of values to extract, a control is selected that concatenates non-adjoining two token regions 1724, 1725. This control gives allows a user the option of specifying literal text 1726 to insert between two extracted substrings. Both of the concatenated extractions are part of the same extraction rule.

For example, a user can select two or more objects where an object is either an existing field, or a selection of text within an existing field (a selection of text within an existing field is essentially a secondary extraction) with the intention of creating a new field. Or the user can select one object with the addition of manual text input. The method of creating the concatenated field is through the use of Splunk's "Eval" command, like so:
Search:
month_field=*day_field=*year_field=*|eval full_date=month_field+"/"+day_field+"/"+year_field Applied to one event from the data store, when the extracted value of month_field is "11", of day_field is "30", and of year_field is "1982", the concatenated full_date field contains the value "11/30/1982".

Extraction rules for fields 1734 also are extended by allowing trimming of extracted values. In some instances, an extraction rule will return useful text with a repeated or unhelpful prefix or suffix. For instance, a string with parameters might be extracted, but only one of the parameters 1732 is of interest. Trimming 1736 can be used to delete characters before and after the parameter of interest.

Two methods of implementing trim are described, which could be alternatively applied, depending on which succeeds. In these methods, trim is like a secondary extraction.

In the first method, the desired secondary extraction can be indicated by the user through highlighting a desired value. If the user selects "mpideon" from "mpideon-admin", the method can generate an extraction rule that effectively trims "-admin" or more generally trims "-<user_type>".

In the second method, the desired secondary extraction can be indicated through an explicit trim definition. User would select the original field and input either a number of characters, a specific character pattern, or a combination of the two, as well as the position (beginning or end). The system could automatically generate a RegEx as a new extraction rule. The new extraction rule could contain the explicit character pattern or the number of characters and position as part of the RegEx.

It is possible that both method 1 and method 2 for a given set of data would generate identical extraction rules. However, in cases where method 1 fails, a user or system could apply method 2.

Alternatively, a secondary extraction rule 1756 can be applied to an extracted value could to find a parameter 1752 within a string of a primary field 1754. A first extraction rule extracts a string that includes, for instance, parameters, regardless of whether or not they include a particular substring of interest. One or more secondary extraction rules could be applied to the extracted string to find the parameter string of interest and generate a secondary field 1765. One secondary extraction rule could extract the parameter of interest. Another secondary extraction rule could extract another feature.

To illustrate, in the context of event: "Passwd entry uid=mpideon-admin cn=users dc=osx dc=splat dc=com" The field name associated with the value "mpideon-admin" is "uid".

Extracting the value "admin" as a field name "user_type" from the event may be too difficult for an automatic extraction rule generator. However, suppose the user is able to extract the value "mpideon-admin" using any of:

1. a regular expression (perhaps because it was easier for the algorithm to determine)
2. an auto-key=value extraction rule (always extract key=value information)
3. a delimiter/header definition (delimiter is "space", columns are "col1,col2,uid,col4,col5,col6,col7" where "uid=mpideon-admin" is uid), Then, automatic extraction rule generation can more easily extract user_type ("admin" value) because the pattern matching domain is limited toe field values such as mpideon-admin or, more generally, xxx-yyy, rather than the entire event text.

The implementation could look something like: Extraction rule for UID: "uid\=(?<uid>\S+)\s+" FROM_raw Note: "FROM_raw" is implicit—this is typically not included in the extraction rule, because if there is no "FROM xxx" the system assumes the domain of the extraction is the raw event.

Secondary extraction rule for user_type: "[^\-]+ (?<user_type>.*)" FROM uid

The same secondary extraction rule could be used regardless of how the primary extraction of "uid" was performed, such as regex, automatic extraction of key=value pairs, or delimiter based.

FIG. 18A illustrates a portion of a validation GUI. Using this GUI, a user can identify negative examples of matched data values; that is, values that should not be matched by the extraction rule. This GUI implements the validate fields 806 step in the structured sequence.

The structured sequence collects positive examples in the select fields step 805, before accepting negative examples in the validate fields step 806. The sample events (e.g., 1442, 1443) can be selected using any of the filters, analysis tools or sampling strategies described throughout this disclosure.

The GUI 1800 allows for validation of value extractions and removal of values that are incorrectly highlighted as positive examples in the events tab 931. The GUI provides the reclassification from positive to negative any values that have been highlighted 1515, 1516, 1517 by selecting an "x" control (e.g., 1835). This control generates data to reclassify a value, such as "STP-W-PORTSTATUS" 1515, from a positive example to a negative example. This registers the value as a negative example for extraction rule creation and reruns the extraction rule, resulting in removal of the highlighting of previously positive values elsewhere among sample events, such as 1516 and 1517. Similarly, the value "e4" 1516 can be changed from a positive to a negative example by selecting control 1836. Providing a negative example causes the system to update and reapply the extraction rule.

Figure 18B:
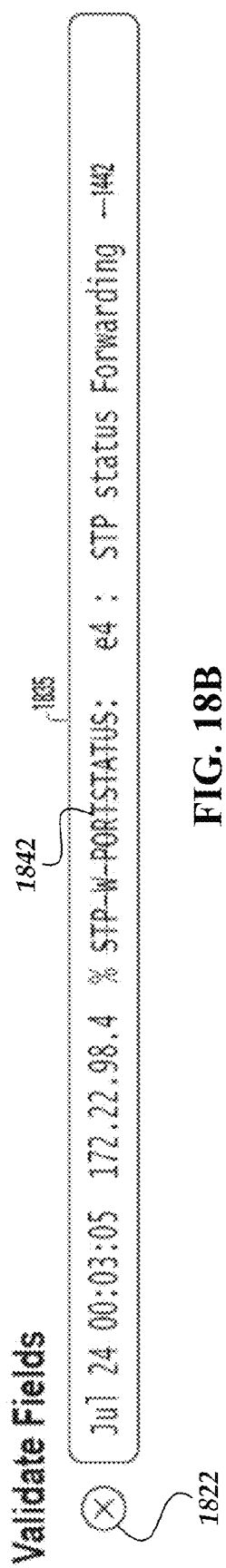
FIG. 18B illustrates formatting an example event to indicate that a token in the example event has been registered as a negative example.

FIG. 18B illustrates formatting an example event to indicate that a token in the example event has been registered as a negative example. In the example event window 1835, the value 1515 is marked with a strike-through font. Other visual cues such as a red typeface could be used. In the list of sample events, the values extracted are emphasized and have an "x" control. Any of the values extracted can be registered as a negative example. A negative event selection can be undone using a control such as 1822.

Figure 19:
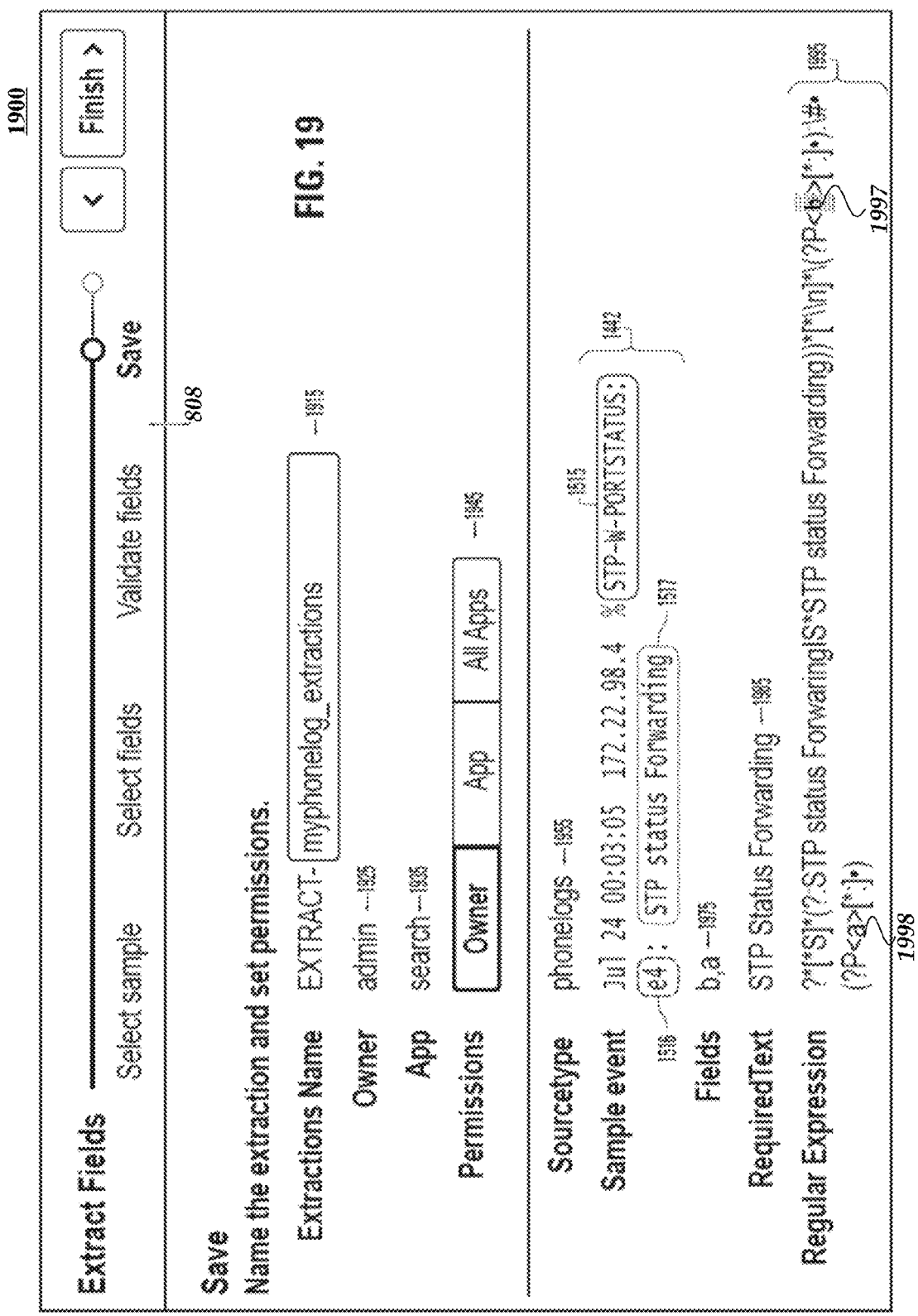
FIG. 19 illustrates saving an extraction rule for subsequent application.

FIG. 19 illustrates saving an extraction rule for subsequent application. A GUI 1900 implements the save step 808 in the structured sequence.

The GUI 1900 can allow for the naming of the extraction rule and a review of pertinent information about the extraction rule, among other things. In this example, the extraction rule is saved in a file named props.conf. In other implementations the extraction rules can be saved to a database, a registry, or other data store. A name 1915 is given to the extraction rule. The name of the extraction can be a list of the field names 1975 or any other text preferred. Other pertinent information about the extraction rule, such as the owner 1925 and application 1935, can be entered. The GUI 1900 can also allow for the definition of permissions 1945 for the extraction rule. In this example, permissions regarding how the extraction rule will execute for the owner, the search application 1935, and in all other applications can be set.

The sourcetype 1955, selected at the beginning of extraction rule development process, is also displayed.

A sample event 1442 is displayed showing three field extractions 1515, 1516, and 1517 that were chosen as positive examples for the extraction rule. The required text attribute 1985 indicates that "STP status Forwarding" is required text, which is evident in the regular expression 1995. The field names 1975 of 'b' and 'a' (1997, 1998) also appear the regular expression 1995.

The extraction rule can be saved as part of a data model that represents sets, subsets of events, and model-related field extraction rules. In the data model, the extraction rules are part of a late binding schema. A hierarchical data model can be used to simplify data for user analysis and reporting. In the data model, objects that reference the subsets can be arranged in a hierarchical manner, so that child subsets of events are proper subsets of their parents. Fields available in parent sets of data are inherited by child subsets of data.

Disclosure Copied from Priority Applications

Figure 20:
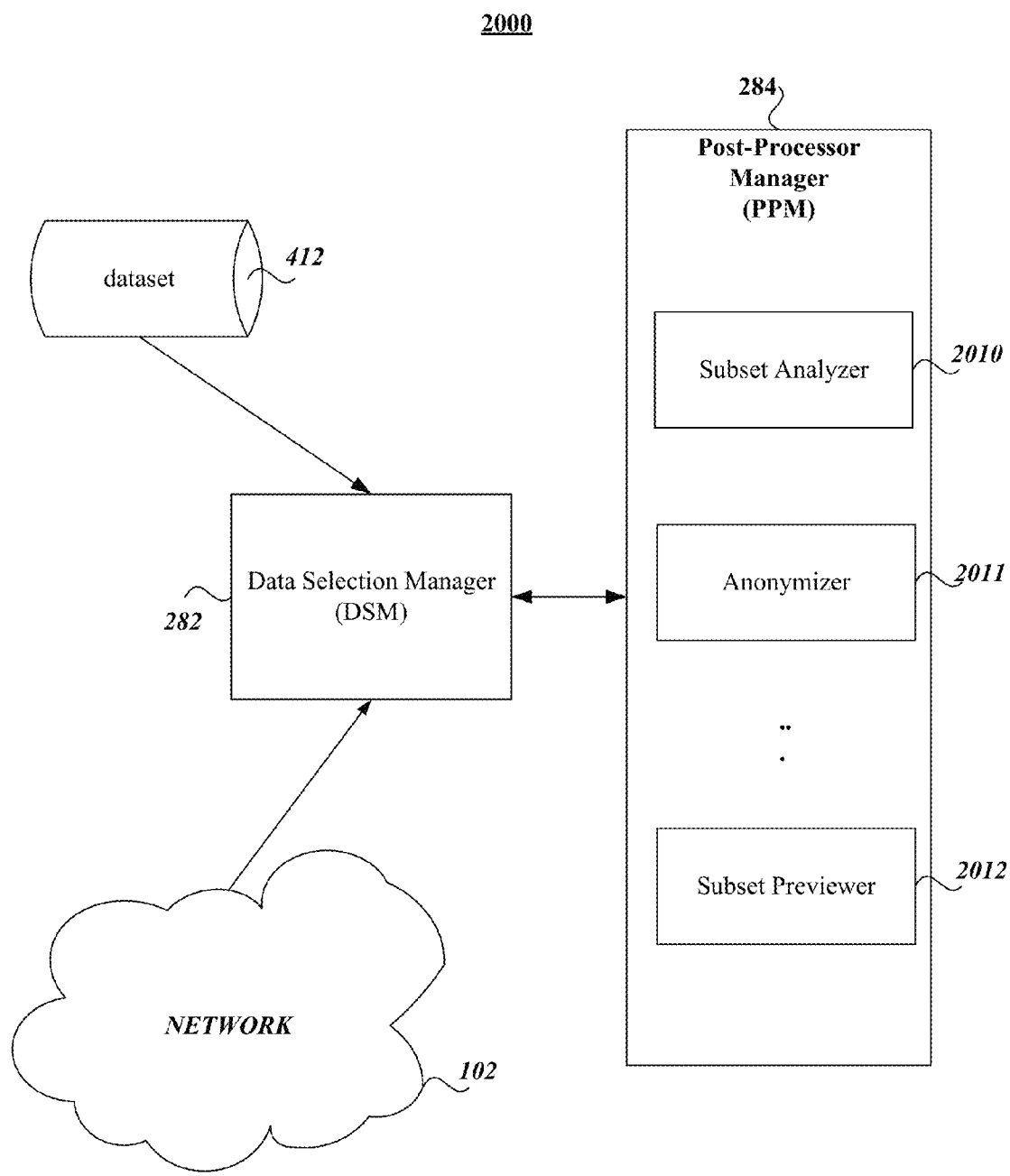
FIG. 20 illustrates one embodiment of an architecture for use in managing variable data selection of a representative data subset from a larger dataset

The operation of certain aspects of various embodiments will now be described with respect to FIGS. 20-22. FIG. 20 illustrates one embodiment of an architecture for use in managing variable data selection of a representative data subset from a larger dataset. Architecture 2000 includes components within network device 400 usable to manage variable data selection and post-processing. Not all of the components shown in FIG. 20 may be required to practice the subject innovations, and variations in the arrangement and type of the components also may be made. As shown, architecture 2000 includes dataset 412, DSM 282, PPM 284, and network 102.

As discussed above, DSM 282 is configured to identify a variable representative sampling of data as a resultant subset of data from the larger dataset 412 that includes unstructured data. It is noted that larger dataset 412 may also include structured as well as unstructured data. DSM 282 provides a GUI, which is described in more detail below. Briefly, however, the GUI enables a user to provide various data selection parameters and/or criteria to DSM 282 for use in identifying/selecting records from dataset 412 as the resultant subset. The user may, for example, indicate various types of processing to be performed on at least some of the data within dataset 412 to generate different types of resultant subsets. For example, the user may input parameters/criteria, using the GUI, usable to identify a subset that is based on one or more latest records, earliest records, diverse records, outlier records, random records, and/or combinations thereof. DSM 282, however, is not constrained to these subset types, or combinations thereof, and others may also be included, DSM 282 may employ a process such as described in more detail below in conjunction with FIG. 22 to perform at least some of its actions based in part on the provided input dataset(s) and parameters/criteria.

It should be noted that while a graphical user interface is disclosed herein, other embodiments may employ other mechanisms for enabling a user to perform actions, including, for example, a command line interface (CLI), or the like. Thus, in some embodiments, a CLI might be employed to request a subset to be generated. One non-limiting, non-exhaustive example of such might include a command such as "% makesubset mybigdata.csv>subset.csv." Clearly, other mechanisms may also be used.

Further, the resultant data from DSM 282 may be provided to PPM 284 for use in further processing. It should be noted, however, the PPM 284 need not be constrained to merely operating on resultant data from DSM 282. For example, PPM 284 may, in some embodiments, operate on data obtained from any of a variety of sources, including directly from dataset, data received directly from one or more client devices, manually entered data, or the like.

PPM 284 includes various post-processing components, including subset analyzer 2010, anonymizer 2011, and subset previewer 2012. As indicated by the dashes within PPM 284, other post-processing components may also be included, and thus, subject innovations are not constrained to those shown. For example, a sharing component may be included that enables users to post-process and share at least some of the resultant data with one or more other network devices, data stores, or the like. Another component may include a saving component that is configured to save the received data, as well as various extraction rules, data types, column values, filters, parameters, or any combination thereof, to permanent storage for later application of the data.

Subset analyzer 2010 is configured to enable a user to perform various post analysis on the subset of data, including, for example, analysis for generation of extraction rules, sorting rules, reporting rules, or even storage rules. For example, using subset analyzer 2010, a user might generate an extraction rule for the subset of data that is generated based on the clustering algorithm (e.g., for the outlier and/or diverse subtypes). Subset analyzer 2010 may then provide feedback about a percentage of events/records within some or all of the clusters from which data might be extracted using the extraction rule. Other post analysis actions may also be performed, and therefore, subject innovations are not limited by the provided non-limiting, non-exhaustive examples of post analysis.

Anonymizer 2011 is configured to enable a user to perform various actions that are directed towards depersonalizing the data. Information within the data that may be construed as Personally Identifiable Information (PII), or otherwise private, confidential, or otherwise for limited viewing, may be modified by anonymizer 2011 to remove such data. In some embodiments, because some of the data within the subset is unstructured data, anonymizer 2011 may be used to identify the location, type, and filter rules, for anonymizing the data. It should be noted. that while anonymizer 2011 may operate on the subset data, anonymizer 2011 is not so limited. For example, anonymizer 2011 may analyze the subset data in order to create anonymizer filters/rules that may then be applied to at least some data within or obtained further from the larger dataset, such as dataset 412.

Subset previewer 2012 is configured to employ various extraction rules that may be generated based on an analysis of the received resultant data. The extraction rules may then be used to further extract data from the resultant data subset, or from dataset 412.

Figure 21:
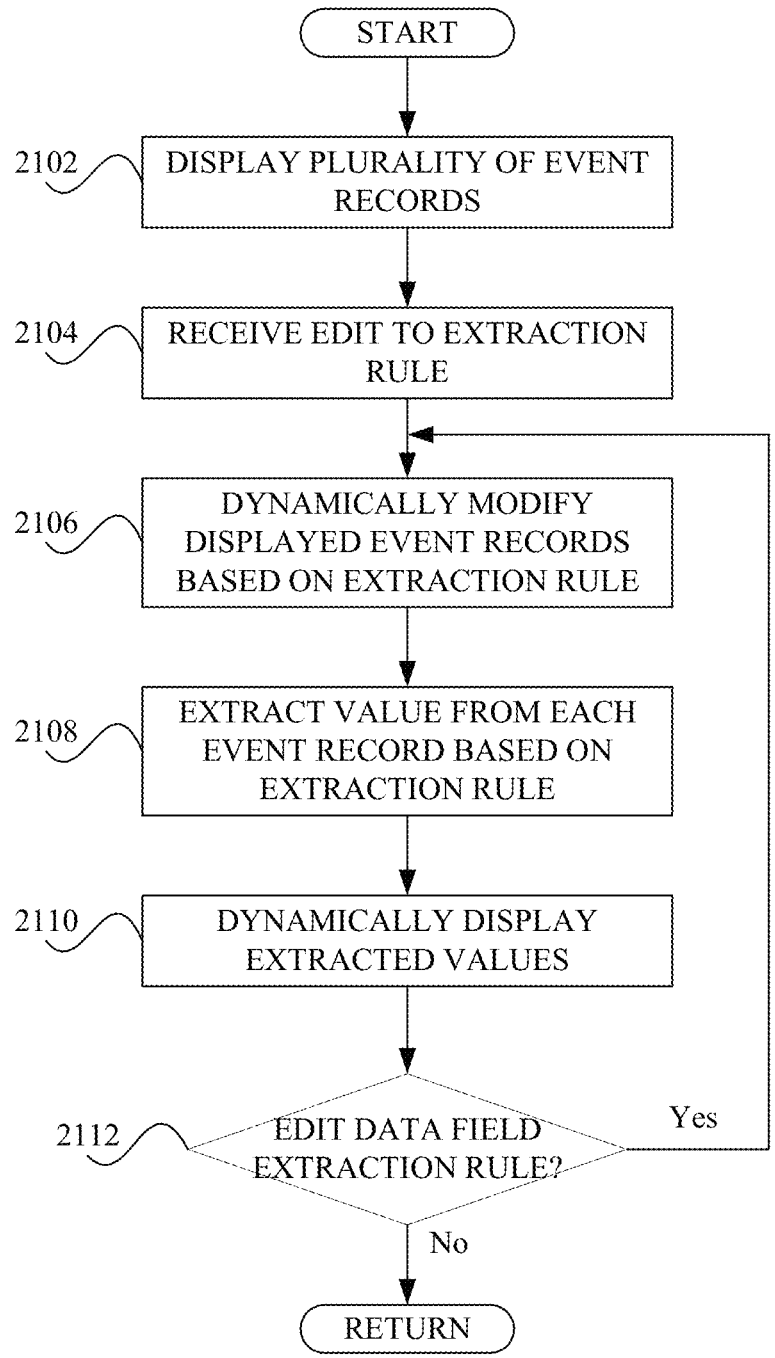
FIG. 21 illustrates a logical flow diagram generally showing one embodiment of a process for enabling real time display of event records and extracted values based on manual editing of a data field extraction rule.

FIG. 21 illustrates a logical flow diagram generally showing one embodiment of a process for enabling real time display of event records and extracted values based on manual editing of a data field extraction rule. In some embodiments, process 2100 of FIG. 21 may be implemented by and/or executed on a single network device. In other embodiments, process 2100 or portions of process 2100 of FIG. 21 may be implemented by and/or executed on a plurality of network devices. In yet other embodiments, process 2100 or portions of process 2100 of FIG. 21 may be implemented by and/or executed on one or more blade servers. However, embodiments are not so limited and various combinations of network devices, blade servers, or the like may be utilized.

Process 2100 begins, after a start block, at block 2102, where a plurality of event records may be displayed. In some embodiments, a plurality of received event records may be displayed as a list of records, such as is shown in FIG. 30A. In at least one of various embodiments, block 2102 may employ embodiments to receive the plurality of event records for display.

Process 2100 proceeds to block 2104, where an input from a user that edits an extraction rule may be received. In at least one embodiment, a GUI may be employed to enable the user to edit an extraction rule. In one non-limiting, non-exhaustive example, an extraction rule (e.g., a previously generated or a newly generated extraction rule) may be displayed to the user in an editable text box. The user may then make edits to the extraction rule by typing in the text box. However, embodiments are not so limited and other graphical interface objects may be employed to enable a user to manually edit the extraction rule. In at least one of various embodiments, block 2104 may employ embodiments to provide an extraction rule, which may be edited by the user. In other embodiments, the user may manually enter an extraction rule starting from scratch. In some embodiments, the extraction rule may be displayed to the user as source code, which the user may modify to edit the extraction rule.

Process 2100 continues next at block 2106, where the displayed event records may be dynamically modified based on the edited extraction rule. In at least one embodiment, as the user edits the extraction rule, an emphasis of the field defined by the edited extraction rule for each event record may be modified in real time. For example, a highlighting of text in the event record (i.e., the extracted value) may be modified as the extraction rule is being edited that reflects the edited extraction rule. In at least one of various embodiments, block 2106 may employ embodiments to enable real time display of event records.

Process 2100 proceeds next to block 2108, where at least one value may be extracted from each of the plurality of event records based on the extraction rule. In at least one of various embodiments, block 2108 may employ embodiments to extract values from each of the plurality of event records.

Process 2100 continues at block 2110, where the GUI may be employed to dynamically display the extracted values in real time. In at least one embodiment, as the user is editing the extraction rule, the extracted values may change and those changes (e.g., the extracted values based on the edited extraction rule) may be displayed in real time. In some embodiments, a list of unique extracted values may be displayed. In at least one of various embodiments, block 2110 may employ embodiments to display unique extracted values. In some embodiments, statistics that correspond to the extracted values may also be displayed in real time.

In any event, process 2100 proceeds next to decision block 2112, where a determination may be made whether an edit to the data field extraction rule was received. In at least one embodiment, this determination may be based on input from a user into the GUI, such as editing the extraction rule in an editable text box (e.g., as described at block 2104). If the extraction rule was edited, changed, and/or otherwise modified by the user, then process 2100 may loop to block 2106; otherwise, process 2100 may return to a calling process to perform other actions.

Figure 22:
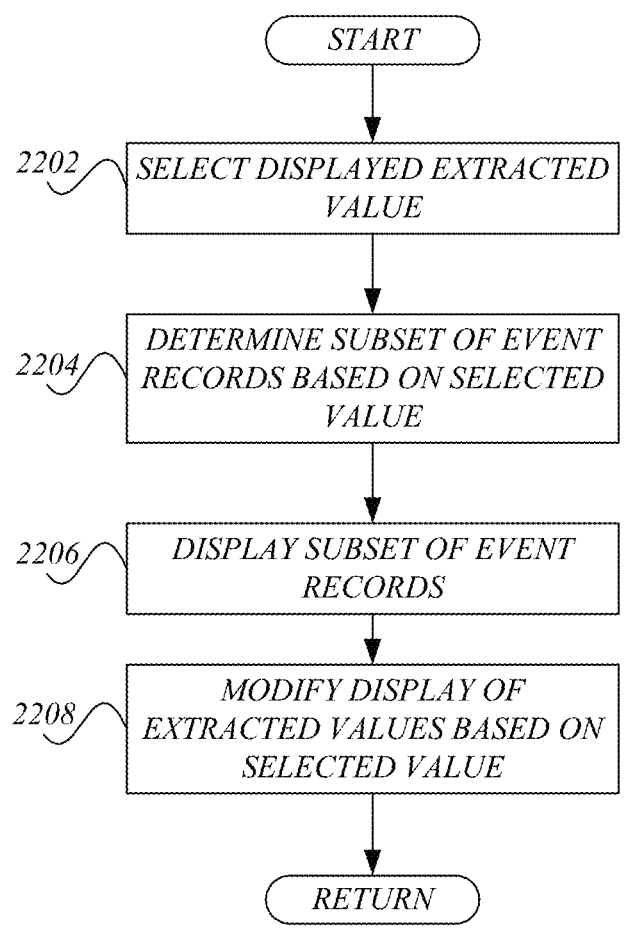
FIG. 22 illustrates a logical flow diagram generally showing one embodiment of a process for enabling the filtering of event records based on a selected extracted value.

FIG. 22 illustrates a logical flow diagram generally showing one embodiment of a process for enabling the filtering of event records based on a selected extracted value. In some embodiments, process 2200 of FIG. 22 may be implemented by and/or executed on a single network device. In other embodiments, process 2200 or portions of process 2200 of FIG. 22 may be implemented by and/or executed on a plurality of network devices. In yet other embodiments, process 2200 or portions of process 2200 of FIG. 22 may be implemented by and/or executed on one or more blade servers. However, embodiments are not so limited and various combinations of network devices, blade servers, or the like may be utilized.

In some embodiments, process 2200 may be employed after process 2000 or 2100 is employed. For example, in at least one embodiment, process 2000 may be employed to provide real time display of event records along with unique extracted values and their corresponding statistics. As described in more detail below, in some embodiments, process 2200 may enable a user to filter the display of the event records based on a selection of a unique extracted value.

Process 2200 begins, after a start block, at block 2202, where an extracted value may be selected from a plurality of displayed extracted values. In some embodiments, the selection may be of a unique extracted value, such as displayed at block 2012 of FIG. 20 and/or 2110 of FIG. 21. In at least one of various embodiments, the selection of the extracted value may be received through a GUI. The GUI may be employed to enable a user to select the extracted value. In at least one embodiment, the user may utilize a mouse or other pointing device to click on and select an extracted value. In some other embodiments, a user may select the extracted value by clicking on an identified value in an event record. However, embodiments are not so limited, and other mechanisms may be employed to enable a user to select an extracted value.

Process 2200 proceeds next to block 2204, where a subset of the plurality of event records may be determined based on the selected value. In at least one embodiment, the subset of event records may include those event records with a value (as extracted by the extraction rule) that is equal to and/or matches the selected value.

Process 2200 continues at block 2206, where the subset of event records may be displayed. In at least one embodiment, block 2206 may employ embodiments of block 2010 of FIG. 20 to display the filtered events based on the extraction rule. For example, assume that 100 event records are displayed to a user (e.g., at block 2010 of FIG. 20), where a value extracted from each event record is highlighted in the event record. If a user selects extracted value "A", then of the 100 event records, those event records with an extracted value of "A" may be displayed to a user, such that any remaining event records may be hidden and/or otherwise distinguished from the event records with the extracted value of "A". In at least one embodiment, those event records that do not include an extracted value that matches the selected value may be hidden from view.

Process 2200 proceeds next at block 2208, where a display of the extracted values may be modified based the selected value. In some embodiments, the selected value may be emphasized (e.g., by highlighting, underlining, and/or otherwise identifying the selected value. In other embodiments, other extracted values (i.e., the non-selected value) may be hidden, dimmed, or the like, to indicate that they were not selected to determine the subset of event records.

After block 2208, process 2200 may return to a calling process to perform other actions. In some embodiments, a user may be enabled to select another extracted value, in which case, process 2200 may process the newly selected extracted value. In other embodiments, the user may de-select the selected value, which may re-display the extracted values from the plurality of event records.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Figure 26:
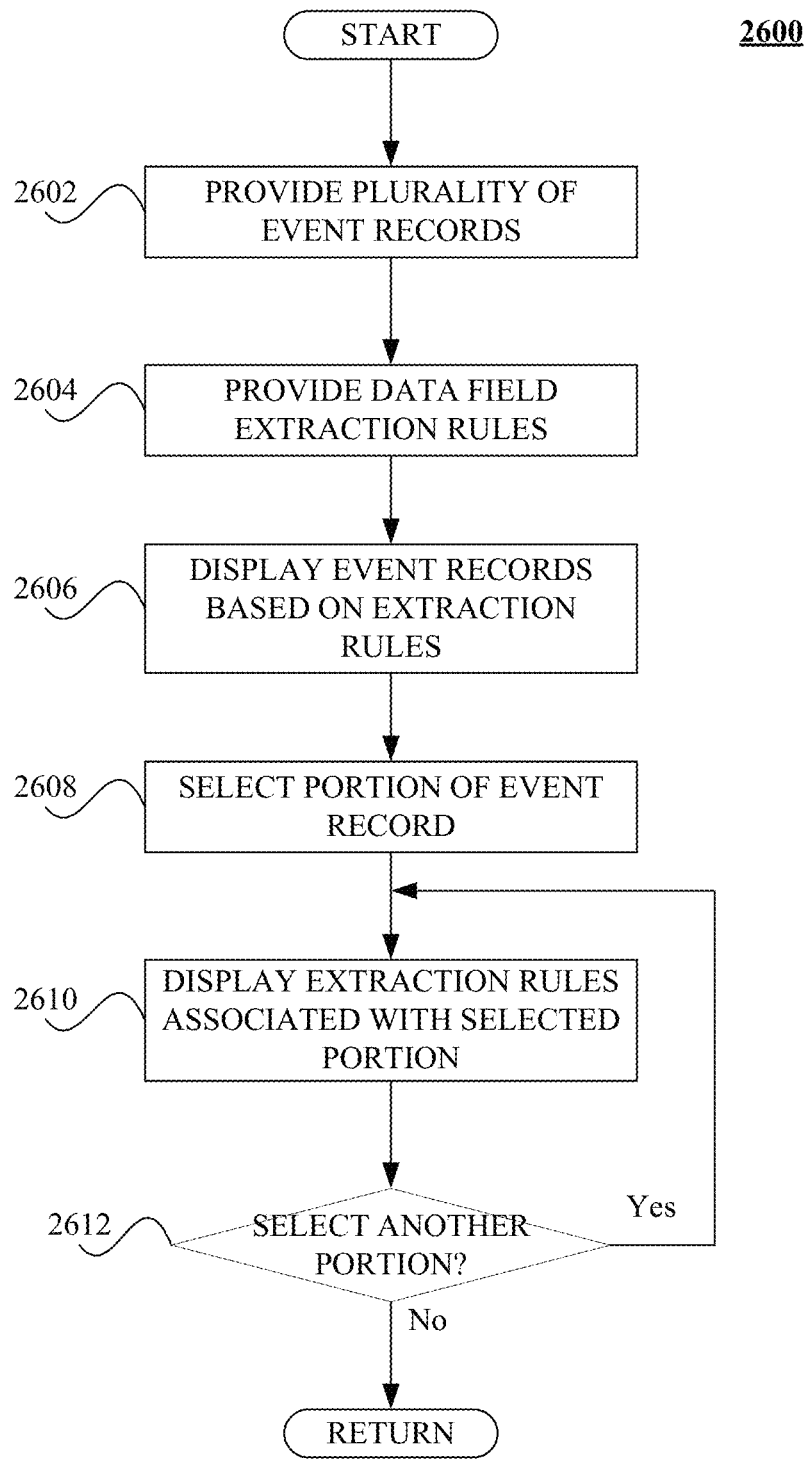
FIG. 26 illustrates one non-limiting, non-exhaustive example embodiment of a graphical user interface (GUI) usable to manage selection of a representative data subset from a larger dataset.

FIG. 26 illustrates one non-limiting, non-exhaustive example embodiment of a graphical user interface (GUI) usable to manage selection of a representative data subset from a larger dataset. GUI 2300 of FIG. 23 may include many more or less components than those shown in FIG. 23. However, the components shown are sufficient to disclose an illustrative embodiment for practicing the subject innovations. Moreover, variations in the arrangement and type of the components may be made without departing from the spirit or scope of the subject innovations.

GUI 2300 may be configured to be displayed by any of a variety of display device components, including within a screen display device usable by various computing devices, including the client devices and/or network devices described above. Further, GUI 2300 is not constrained by any particular software language, scripting tool, or the like, for generating the display of GUI 2300. Moreover, GUI 2300 is not constrained to drop down, fill-ins, buttons, or the like, and virtually any other mechanism usable to receive and/or display user parameter/criteria selections may be employed, GUI 2300 also may employ any of a variety of input selection mechanism, including, but not limited to touch screens, voice recognition, mouse, keyboard, stylus, or the like.

Figure 23:
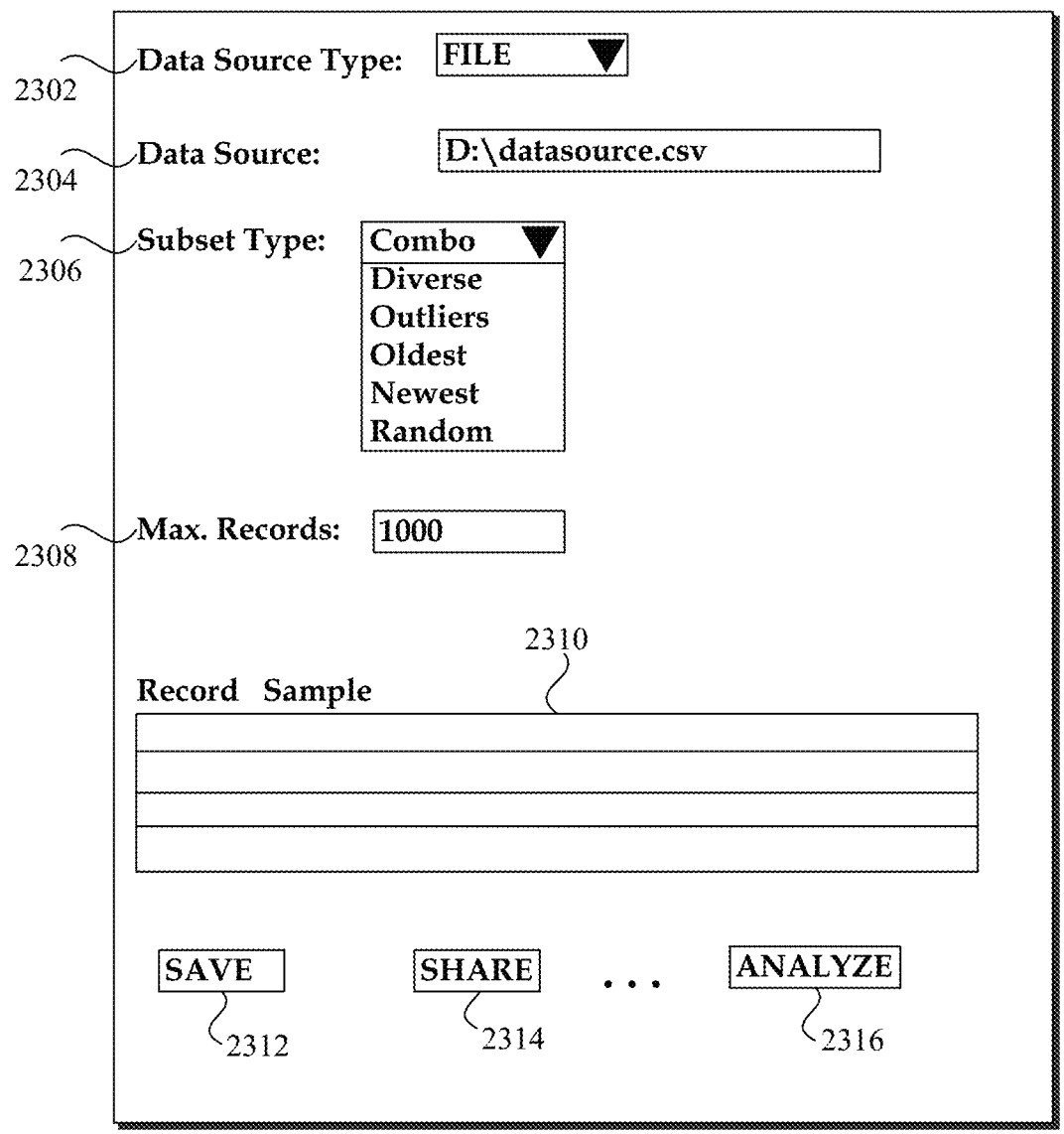
FIG. 23 can include parameter/criteria selections including data source type, data source, subset type, maximum records, record sample, as well as selections that enable post-processing, such as save selection, share selection, and analyze selection.

In any event, as shown in FIG. 23, GUI 2300 may include parameter/criteria selections including data source type 2302, data source 2304, subset type 2306, maximum records 2308, record sample 2310, as well as selections that enable post-processing, such as save selection 2312, share selection 2314, and analyze selection 2316. Data source type 2302 allows a user to specify a data source type that may be from a data store, an index of records, a structured file (such as, for example, CSV, XML, JSON files, or the like), from structured network data, or the like. Data source 2304 is configured to allow a user to specify a source of the data, which may include, a type of data source (such as from a file, a source of data from that type (such as /var/log/data.csv, or the like), as well as an index name when the source is from an index, database parameters such as connection information, tables, columns, or the like; a network address and/or port when the source is from a network source; a file or directory name when the source is from a file or directory; or the like. Subset type 2306 is configured to allow a user to input the desired selected subset types obtained from the data. As such the user may select one or more of diverse subset, outlier subset, oldest record subset, newest record subset, and/or random record subset type. As discussed above, other subtypes may also be provided. Further, as illustrated in FIG. 23, a combination subset type may also be selected. In some embodiments, a default for the combination subset type includes representative subsets from each of the other subset types. However, in other embodiments, a user might highlight or otherwise select combinations of two or more of the other subset types to generate other combinations. Maximum records 2308 is directed towards allowing a user to set a limit on a number of records to retrieve, at least initially, from the specified data source. In some embodiments, a user might also be allowed to input a limit on a number of records to display within record sample 2310. In some embodiments, record sample 2310 might be configured to display samples of records that are obtained from within the resultant subset sampling. However, in other embodiments, record sample 2310 might also allow a user to select for display at least some of the records that are used to generate the resultant subset sampling. In other embodiments, there may be an input that enables a user to define other selection criteria that might be usable for example in a filtering query. The input might include keywords, phrases, Boolean, expressions, wildcards, or the like. Such selection criteria might then be usable in selecting record samples for display, in selecting records for further processing, or the like.

Post-processing may also be performed using various selectors, including using save selection 2312 to save the resultant subset, share selection 2314 to share the resultant subset with other devices, and analyze selection 616 to commence further analysis upon the resultant. subset, or other data. While these post-processor selectors are illustrated within GUI 2300, it should be understood, that they may also be provided through a differently structured GUI. Thus, GUI 2300 is not to be construed as limiting the subject innovations.

Figure 24:
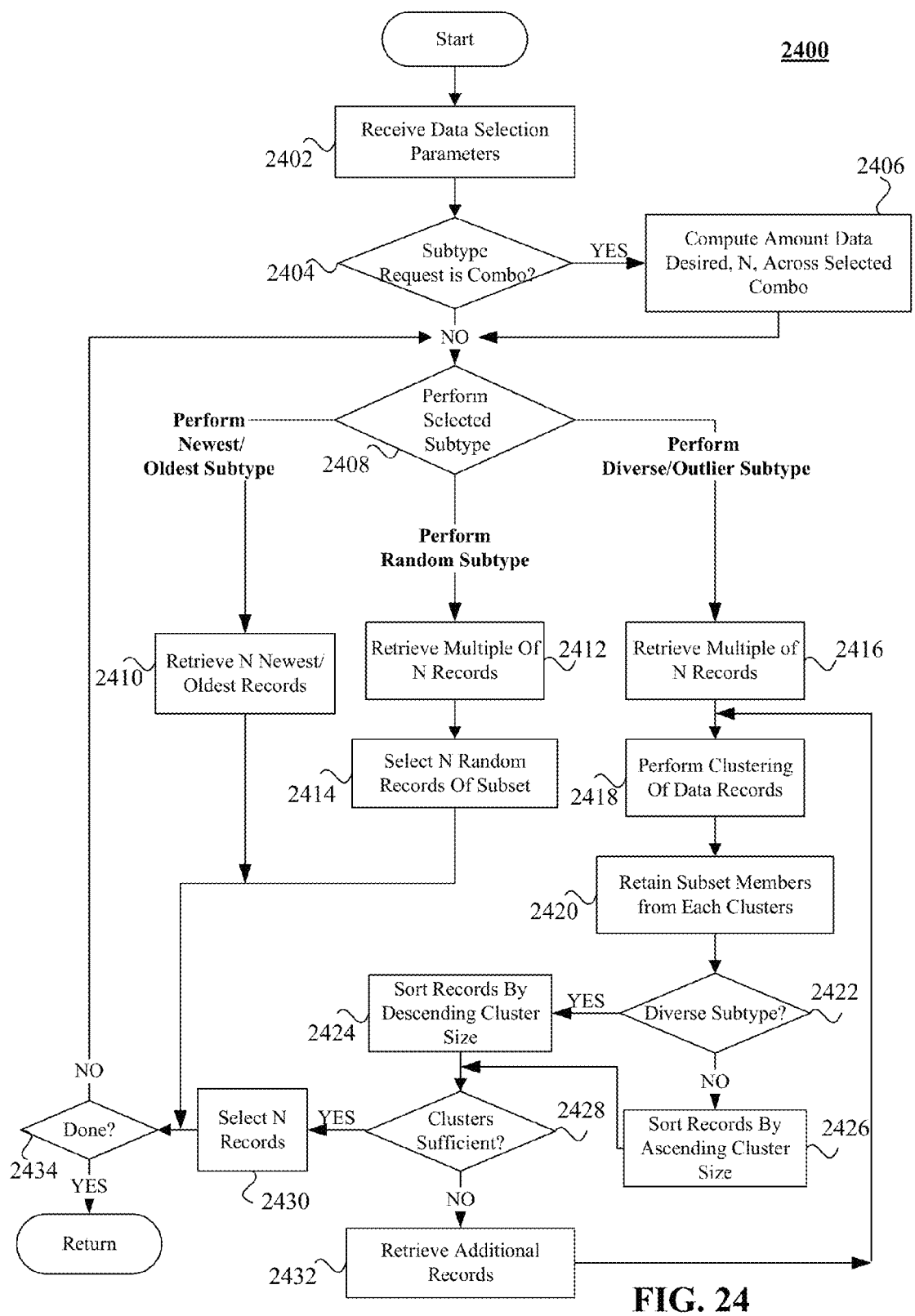
FIG. 24 shows a flow chart of one embodiment of a process usable to manage variable representative sampling of data as a subset from a larger dataset that includes unstructured data.

FIG. 24 shows a flow chart of one embodiment of a process usable to manage variable representative sampling of data as a subset from a larger dataset that includes unstructured data. Process 2400 of FIG. 24 may be executed by one or more processors, and/or through actions performed in part by a client device, or the like.

Process 2400 begins, after a start block, at block 2402 where data selection parameters/criteria is received. In some embodiments, the data selection parameters/criteria may be received from a user that might employ a GUI, such as described above in conjunction with FIG. 6. However, process 2400 is not so limited, and such data selection parameters/criteria may be received using any of variety of other mechanisms.

In way event, the data selection parameters/criteria may include information about a data source, any query constraints, a type of subset desired, and an amount of data desired (N). In some embodiments, the data source might indicate that the input records are to be obtained from dataset 412 of FIG. 4. However, process 2400 is not constrained to operating on merely dataset 412, and any of a variety of other datasets may also be employed as input to process 2400.

Process 2400 moves next to decision block 2404, where a determination is made whether the subset type to be used to obtain the resultant subset is a combination subset. As an aside, in some embodiments, a default desired subtype might also be used, when the user elects not to provide a selection. In one embodiment, the default desired subtype might be a combination subset type that includes records from each of the available subset types. In any event, if the subtype process to be performed is a combination subtype, then processing flows to block 2406; otherwise, processing flows to decision block 2408.

At block 2406, the number of records obtained within the resultant subset is computed as a split of the input N, such that records are obtained from each of the subtype processes identified in the combination. For example, if the combination is to be obtained by performing each of the five different processes (newest, oldest, random, diverse, and outliers), then N is, in one embodiment, recomputed as N=N/5. That is, a same number of records are obtained from each of the five subtype processes. However, in other embodiments, other ratios might be used, including obtaining more records from one or more of the subtypes than obtained from at least one other subtype in the combination of subtypes. Processing then flows to decision block 2408.

At decision block 2408 a determination is made which one or more subtype processes to perform. As noted, more than one of the subtype processes may be performed. For example, all of the identified subtype processes might be performed. Thus, in that instance, processing flows to blocks 2410, 2412, and 2416. Such processing might be performed concurrently. However, in other embodiments, at least some of the selected subtype process might be performed serially.

In any event, when one or more of newest or oldest subtype processes are to be performed, processing flows to block 2410. When the random subtype process is to be performed, processing flows to block 2412; and when one or more of diverse or outlier subtype processes are to be performed, processing flows to block 2416.

At block 2410, for newest subtypes, N most recent or current records are retrieved or otherwise extracted from the input set of records. That is, a query might be performed on the data source for the N newest records. For oldest subtype processing, a query of the data source may be performed to retrieve a subset of records that contains N oldest records. Such queries may be performed by searching the data input for a field indicating a time in which the data was received by from a client device for storage. Such field might be added during receipt from the client device, or might be a known location within a record. Where both newest and oldest subtypes are to be obtained, such actions may be concurrently performed within block 2410, or performed serially. In either event, processing then flows to decision block 2434.

At block 2412, a random subtype subset sampling is to be obtained. It should be understood that any of a variety of criteria may be employed to define randomness, including, but not limited to generating a sampling record selection based on a pseudo-number generator, a value obtained from a purely random source, or the like.

In at least one embodiment, for example, records may be retrieved from within the data source a multiple (e.g., 50) of N, the desired returned subset to retrieve. That is ~50*N records might be retrieved from the data source. Then, a random subset N records might be extracted from the 50*N records to generate the random subset. Thus, as illustrated, at block 2412, a multiple of N records is obtained. As an aside, it should be clear to one of ordinary skill in the art that any multiple of N might be selected, and therefore, 50 is merely a non-limiting example. Processing then flows to block 2414, where N random records are obtained from this extracted subset to generate a random subtype sampling. Processing then flows to decision block 2434.

At block 2416, for diverse and/or outlier subtypes, a multiple of N records is retrieved from the data source. Again, the multiple may be virtually any non-negative value greater than zero that is directed towards retrieving a whole number of records. Processing then flows to block 2418.

At block 2418, any of a variety of clustering techniques may be applied to the retrieved records. In some embodiments, the clustering technique used might be an unsupervised clustering technique, where the task is to develop classification and sorting of the records without regard to a predefined number of groups or clusters to be generated. Such unsupervised clustering techniques seek to identify similarities between portions of the data within the records in order to determine whether the records can be characterized as forming a group. Such groups are typically also known as clusters. As noted, any of a variety of unsupervised clustering techniques may be employed, including but not limited to k-means, kx-trees, density estimation, self-organizing map modeling (SOM), adaptive resonance theory models (ART), as well as other feature extraction techniques. Further, the similarity may be based on any one or more fields or portions of data within the records. In some embodiments, the portions used might be predefined. However, in other embodiments, additional analysis might be performed to select which portion or portions of the records to use in creating the clusters. Further, clustering may be based on one or more column values, terms and/or phrases with a value or event independent of a given column, punctuation within column values, or the like. For example, the records may be machine data that is generated by code that generates records with similar punctuations but having different terms. For example, the following three records have different text:

00:02:35, 181 INFO [Processor10] Clickthruy 10.0.0.5-ApplicationID is CA7
00:02:35, 181 DEBUG [Processeor111] Subscription 10.0.2.1 Subscribe-678/749/139-
00:02:39, 033 INFO [Processor24]Message 10.0.1.1 MessageOpened-4928/12664-

However, each has similar punctuation:
::,[ ] . . . -
::,[ ] . . . -//-
::,[ ] . . . -/-

While unsupervised clustering techniques are typically directed towards generating one or more clusters from the records, absent knowing a priori a predefined number of clusters to be created, other clustering techniques may also be used. Thus, supervised clustering techniques may also be used, where the number of clusters or groupings might be predefined. In using supervised clustering techniques, in some embodiments, the number, k, of the resulting clusters might be iterated upon, until some threshold criteria are satisfied. For example, a degree of dissimilarity across each cluster is above a threshold, might be used to determine when to stop iterating. The outcome of such iterations might then provide a value for k.

In any event, as noted, block 2418 results in the generation of one or more clusters of the retrieved records. At block 2418, a number of records in each cluster may vary, thus, at block 2418, each cluster may be assigned some identifier, where the identifier is usable to indicate which cluster a record belongs. A cluster size for each cluster and their identifier may be saved. Continuing to block 2420, a subset of the records from each cluster may be selected, based on any of a variety of criteria. For example, each record selected from a cluster may be based on a most similar criteria, or most representative of the cluster, or any of a variety of other criteria. Any number of records from the clusters may be selected. For example, three records may be returned. However, it should be noted that block 2420 may, in some embodiments, be optional, and all records for each cluster might be selected and retained for later analysis.

Process flow then continues to decision block 2422, where a determination is made whether the desired subtype is the diverse subtype (or the outlier subtype). When the desired subtype is the diverse subtype, processing flow to block 2424; otherwise, processing flows to block 2426. For combination subtypes that include both outlier and diverse subtypes, processing might flow to both blocks 2424 and 2426.

At block 2424, the clusters are sorted by cluster size in descending cluster size order. At block 2426, the clusters are sorted by ascending cluster size order. The result is that the records are sorted based on the cluster size, in most common cluster first for the diverse subtype, and least common records for the outlier subtype. The following provides one non-limiting, non-exhaustive example implementation of such sorting using a search processing language (SPL):

sourcetype=car reports
|head25000
|cluster    t=0.7    showcount=true    labelonly=true field=MYCOLUMN
|dedup 3 cluster_label
|sort 500-cluster_count
|sort_time Other implementations may also be employed. Therefore, the above example should not be construed as limiting the subject innovations. In any event, the above example search would retrieve the 25000 most recent records, clusters the records by MYCOLUMN, keeps up to three records per cluster, keeps 500 records from the most common clusters (diverse subtype), and then optionally resorts the records into time order.

Process for both blocks 2424 and 2426 then flow to decision block 2428, where a cluster iteration analysis is performed to determine whether the number of clusters are greater than a defined threshold number for the diverse subtype. When the subtype is the outlier subtype, one embodiment might include an 'or' evaluation, of whether the least popular clusters are more common than another threshold. Should the cluster iteration analysis indicate that the number of cluster is not greater than a threshold, or (at least for outlier evaluations) that the least popular clusters are not more common than another threshold, processing flows to block 2432, where additional records are retrieved from the data source. In some embodiments, for example, if the initial. subset retrieved 100K records, then the process might retrieve an additional 100K records. In some embodiments, if not enough clusters are retrieved, indicating that everything might be fairly homogeneous, then more events can be retrieved until a threshold is met, and there is determined to be sufficient diversity. Processing then branches back to block 2418 to continue cluster performance until the cluster iteration analysis is satisfied.

When the cluster iteration analysis is satisfied, at decision block 2428, processing then flows to block 2430, where a first N set of records are retained. Processing then flows to decision block 2434, where a determination is made whether subtype processing is completed. Where the desired subtype processing is the combination subtype, processing might then branch back to decision block 2408, until each of the subtypes with the combination subtype has generated a respective N number of records (or weighted number of records), which may then be combined to generate the resultant sampling subset of records. Processing would then be completed, and would return to another process.

As seen above for the diverse subtype, the resulting records may include a few (e.g., three) instances of the most common clusters, and given N records, many diverse types of records may be in the subset, covering a large portion of the types of records likely in the full dataset. For example, given a database of car ownership records in the United States, it may be desired to generate a subset of 500 records that represent the most common cars. By retrieving 100K records, clustering the 500 records by car model (or MPG, weight, cost, or any of a variety of other criteria), keeping three instances of the most common models, the 500 records in the resultant subset would that a majority of the types of cars in the dataset would be represented.

As discussed above, for the outlier subtype, the subset is made up of records from the least common types of records. By keeping the records from the rarest cluster, the resulting records are intended to represent the outlier records. While the goal of the diverse subtype is to represent the most common records (e.g., 95%), the goal of the outlier subtype is to represent the rare (e.g., 5%) or unusual records. To use the same example as above, given a dataset of all car ownership records in the United States, a desire is to generate a subset of 500 records that represent the most obscure cars. By retrieving 100K records, clustering by car model (or other criteria), keeping three instances of the least common models, the 500 records would have uncommon cars. With keeping just about 500 records, most of the most obscure cars are expected to be represented. While this might not find all of the most obscure cars in the full dataset, as this would require processing over the full dataset, it is anticipated to provide a reasonable representative sampling of the outliers.

However, other mechanisms may also be used to obtain outliers, or diverse subtypes. For example, statistical methods may be applied to retain those outlier/diverse records based on a statistical confidence level desired. For example, using various statistical methods, the initial number N of records retrieved might be determined based on a confidence level. Techniques may also be used that include keeping records that have column values outside of a norm in a statistical distribution, such as more than two standard deviations from the mean, or in commonality (e.g., more rate than other values), or the like.

Figure 25:
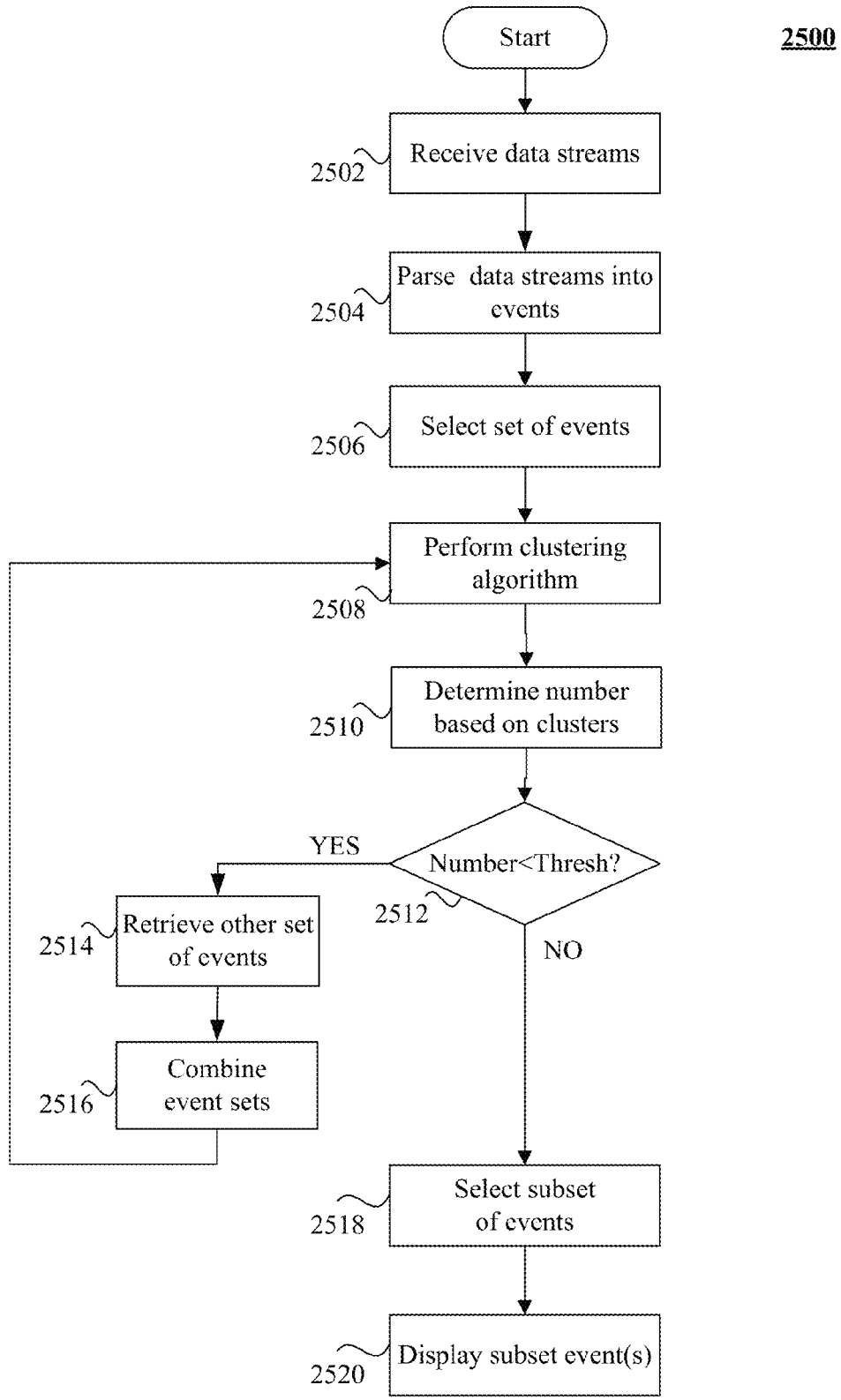
FIG. 25 shows a flow chart of one embodiment of a process for analyzing data.

FIG. 25 shows a flow chart of one embodiment of a process for analyzing data. Process 2500 begins, after a start block, at block 2502 where one or more data streams are received. At block 2504, the one or more data streams are parsed into a plurality of events. At block 2506, a set of the plurality of events are selected. At block 2508, a clustering algorithm is performed on the set of events to generate a plurality of clusters. At block 2510, a number is determined based on the clusters. At decision block 2512, it is determined whether the number is less than a threshold number. If so, process 2500 continues to block 2514, where another set of events is retrieved from the plurality of events. At block 2516, the set of events and the other set of events are combined to produce a combined set of events. Process 2500 then returns to block 2508. When the number is determined not to be less than the threshold number, process 2500 continues to block 2518, where a subset of events are selected from the plurality or second plurality of clusters. At block 2520, one or more of the events in the subset are displayed.

As seen above, using the combination subtype would result in obtaining subsets from two or more of the above discussed subtype processes. The number of records in results from each subtype would then total to the desired number of records (e.g. 500). Use of the combination subtype is directed towards enabling a user to test various hypotheses, such as whether there are anomalies in the earliest or latest data, in important common types of records, or in obscure types of records. A combination of subtypes that include random records might assist in making a subset that might be usable for automated tasks, such as validating that patterns match records in the data (e.g., such as might be used for generating extraction rules, anonymizing rules, or the like); that expected records occur, or that expected records do not occur; that the latest data is similar, or not, to the oldest data; or any of a variety of other post-processing analysis.

The operation of certain aspects of the technology disclosed will now be described with respect to FIGS. 26-28. FIG. 26 illustrates a logical flow diagram generally showing one embodiment of an overview process for enabling real time display of fields based on previously provided extraction rules. In some embodiments, process 2600 of FIG. 26 may be implemented by and/or executed on a single network device. In other embodiments, process 2600 or portions of process 2600 of FIG. 26 may be implemented by and/or executed on a plurality of network devices. In yet other embodiments, process 2600 or portions of process 2600 of FIG. 26 may be implemented by and/or executed on one or more blade servers. However, embodiments are not so limited and various combinations of network devices, blade servers, or the like may be utilized.

Process 2600 begins, after a start block, at block 2602, where a plurality of event records may be provided. In some embodiments, the event records may be provided by a plurality of different computing devices, such as client devices. In at least one embodiment, the plurality of event records may be a sample subset of a larger dataset of event records dataset. In some embodiments, the larger dataset of event records may be associated with one or more users and/or clients. As described above, the event records may be structured data or unstructured data. Additionally, the event records may include machine data.

Process 2600 proceeds next to block 2604, where data field extraction rules may be provided. In some embodiments, a plurality of extraction rules may be provided. The provided extraction rules may define a field within the plurality of event records from which to extract data (e.g., a field value). Accordingly, in some embodiments, the extraction rule may define a field within the event records independent of a predetermined and/or predefined structure of the event records. Extraction rules may be provided independent of one another. In at least one of various embodiments, two or more extraction rules may define fields that may be distinct and/or separate fields. In other embodiments, two or more extraction rules may define fields that partially or completely overlap each other.

In some embodiments, where fields overlap, an extraction rule may define a subfield of another field. In at least one embodiment, the other field may be defined by another extraction rule and/or may be a structured and/or predefined field. For example, Extraction Rule A may define a field as "Server_ID", which may include a name of a server and an address of the server. Additionally, Extraction Rule B may define a field as "Server_name", which may include the name of the server, but not the address of the server. In this example, Extraction Rule B may define a subfield of the field defined by Extraction Rule A; or Extraction Rule B may be referred to as a sub-rule to Extraction Rule A.

In various embodiments, one or more extraction rules may be provided. Extraction rules may be automatically generated, manually entered by a user, previously provided/created, provided by another system, or the like, or any combination thereof. In at least one embodiment, automatic generation of an extraction rule may be based on a value selected from an event record. In some embodiments, a graphical user interface (GUI) may be employed to enable a user to select desired text of an event record. From the selected text, pattern recognition algorithms may be employed to automatically generate the extraction rule. In at least one embodiment, the extraction rule may be a regular expression.

In another embodiment, the GUI may be employed to enable the user to manually input the extraction rule. In at least one embodiment, the user may enter a regular expression or other extraction rule into an editable input text box in the GUI to define a field within the event records from which to extract data.

In yet other embodiments, the user may utilize the GUI to manually edit extraction rules (either previously automatically generated extraction rules or previous user-entered extraction rules) and receive a real time display of newly extracted values, statistics that correspond to the extracted values, changes to a display of the event records, or the like or any combination thereof. Real time display of field values based on manual editing of extraction rules is described in more detail below in conjunction with FIG. 6.

In some embodiments, the GUI may be employed to enable a user to provide a field name for the extraction rule (e.g., the field defined by the extraction rule). In other embodiments, the system may automatically determine a field name for the extraction rule. In at least one such embodiment, the system may employ the extraction rule to extract a value from one or more event records. The field name may be determined based on this value, such as, for example, a datatype of the extracted value (e.g., an integer), a format of the extracted value (e.g., a phone number, URL, time/date format), or the like. In various embodiments, the extraction rule may be automatically generated, manually input by a user, or the like, or any combination thereof.

In any event, process 2600 continues next at block 2606, where the GUI may be employed to display the event records based on the provided extraction rules in real time. In at least one embodiment, the plurality of event records may be displayed to the user in virtually any order, such as, most recent, latest, or the like.

An embodiment of a process for displaying event records based on previously provided extraction rules is described in more detail below in conjunction with FIG. 6. Briefly, however, in at least one embodiment, displaying an event record based on an extraction rule may include emphasizing the fields defined by the extraction rules (e.g., the extracted value) in the event record. examples of such emphasizing may include, but are not limited to, dimming, highlighting, underlining, bolding, striking through, italicizing, displaying different font, displaying different font size, displaying different color, displaying different transparency, including parenthesis around the text, and the like. FIGS. 30B and 30C illustrate embodiments of real time display of event records where values associated with one or more fields defined by one or more extraction rules are emphasized.

In some other embodiments, fields defined by different extraction rules may be emphasized in a same way or different ways. For example, in one embodiment, text of each defined field may be emphasized by displaying the text in a single font color. However, such emphasizing may make it difficult for a user to distinguish between fields or to determine if multiple fields overlap. In some other embodiments, each field may be emphasized differently. For example, in one embodiment, text of one defined field may be emphasized by displaying the text in one font, and text of a different defined field may be emphasized by displaying this text in a different font. However, embodiments are not so limited and other types of display emphasizing may be employed.

In some embodiments, real time display of the event records may include displaying the event records based on the provided extraction rules as the extraction rules are being provided, entered, and/or edited by a user. Accordingly, the GUI may update a display of each event record and an indication of each extracted value in near real time as an extraction rule is edited or generated. It should be understood that real time or near real time display of data, as used herein, may include a delay created by some processing of the data, such as, but not limited to, a time to obtain an extraction rule, a time to determine text to emphasize based on the extraction rules, or the like.

Process 2600 proceeds next at block 2608, where a portion of at least one event record may be selected. The portion of the event record may include a subset, part, and/or area of a displayed event record. For example, in at least one of various embodiments, the portion may be a string of one or more characters, numbers, letters, symbols, white spaces, or the like. However, the selected portion is not limited to a subset of the displayed event record, but in another embodiment, the portion may include the entire displayed event record. In some other embodiments, the portion may span multiple event records.

In some embodiments, the portion may include one or more fields defined by one or more extraction rules. In at least one such embodiment, the portion may be an emphasized area of the event record, such as fields that are emphasized in each event record (e.g., as described at block 2606). For example, text of an event record may be emphasized because that text is associated with at least one field defined by at least one extraction rule. In this example, the portion selected by the user may be the emphasized text. FIG. 30C illustrates an embodiment of emphasized portions of an event record based on previously provided extraction rules.

In at least one of various embodiments, a GUI may be employed to enable a user to select the portion of the event record. The user may select the portion of the event record by clicking on the portion of the event record, highlighting text of an event record, rolling over or mousing-over an area of the event record, or the like. For example, in at least one embodiment, a user may click on an emphasized portion of an event record to select it. In another embodiment, the user may roll a pointer over the emphasized portion of the event record to select it. In yet other embodiments, the user may utilize a text selection mechanism to highlight and select text of the event record to be the selected portion of the event record. These embodiments are non-limiting and non-exhaustive and other mechanisms may be employed to enable a user to select a portion of at least one event record.

Process 2600 continues at block 2610, where extraction rules associated with the selected portion may be displayed, which is described in more detail below. Briefly, however, in at least one of various embodiments, a window or pop-up box may open to display the associated extraction rules. In some embodiments, a name of the associated extraction rules may be displayed. In at least one such embodiment, this name may be a name of the field defined by the extraction rule. In other embodiments, a value of each field defined by the extraction rule may be displayed. In at least one such embodiment, these values may be values extracted from the event record (from which the portion was selected to determine the associated extraction rules) using the associated extraction rules.

In any event, process 2600 proceeds to decision block 2612, where a determination may be made whether another portion of an event record is selected. In at least one embodiment, a user may select another portion of a same or different event record. Embodiments of block 2608 may be employed to receive a selection of another portion of an event record. If another portion is selected, then process 2600 may loop to block 2610 to display extraction rules associated with the other selected portion; otherwise, process 2600 may return to a calling process to perform other actions.

Figure 27:
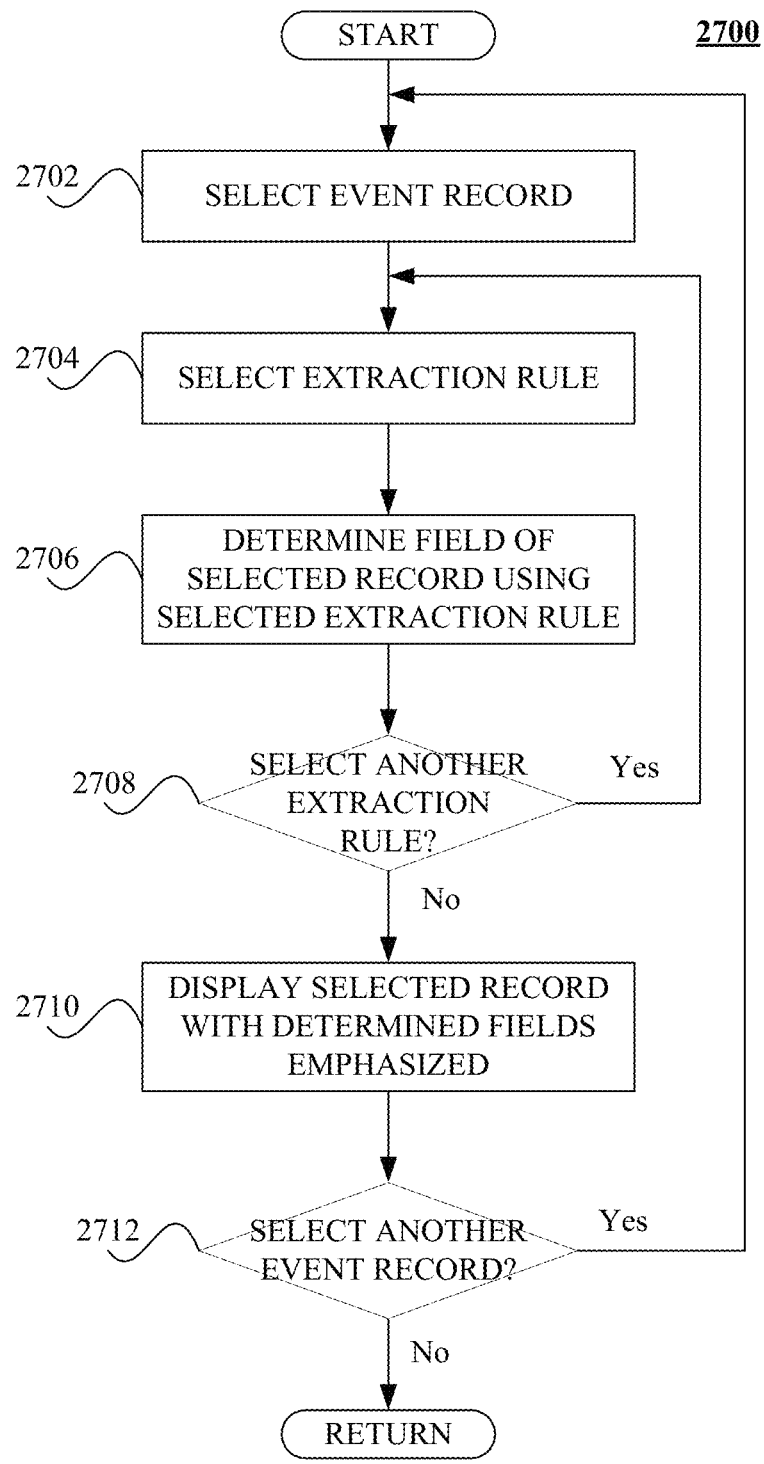
FIG. 27 illustrates a logical flow diagram generally showing one embodiment of a process for displaying event records that emphasizes fields based on previously provided extraction rules.

FIG. 27 illustrates a logical flow diagram generally showing one embodiment of a process for displaying event records that emphasizes fields based on previously provided extraction rules. In some embodiments, process 2700 of FIG. 27 may be implemented by and/or executed on a single network device. In other embodiments, process 2700 or portions of process 2700 of FIG. 27 may be implemented by and/or executed on a plurality of network devices. In yet other embodiments, process 2700 or portions of process 2700 of FIG. 27 may be implemented by and/or executed on one or more blade servers. However, embodiments are not so limited and various combinations of network devices, blade servers, or the like may be utilized.

Some markup languages, such as HTML or XML, do not allow overlapping tag pairs. This type of limitation can make it difficult to display individual fields that overlap one another, where each field may be defined by a tag pair that may overlap another tag pair. Process 2700 describes embodiments for displaying overlapping and/or sub-containing sections of text (e.g., overlapping fields and/or sub-fields) within an overlapping tag-pair-limited mark-up language, such as, but not limited to HTML or XML. Process 2700 further describes embodiments that enable the display of overlapping fields while preserving individual information segments (e.g., field values) contained within each field or tag pair.

Process 2700 begins, after a start block, at block 2702, where an event record may be selected. In at least one embodiment, event records may be randomly selected from a plurality of event records (e.g., the plurality of event records provided at block 502 of FIG. 5). In another embodiment, event records may be selected in a predetermined order, such as chronologically (e.g., based on a timestamp), reverse chronologically, alphabetically, or the like. In yet other embodiments, a field, such as a field defined by an extraction rule, may be utilized to determine an order of selecting event records. For example, a field may define a server identifier and event records may be selected based on the server identifier. However, other mechanisms and/or algorithms may be employed for determining which event record to select.

Process 2700 proceeds at block 2704, where an extraction rule may be selected. In at least one embodiment, the extraction rule may be selected from a plurality of extraction rules that were previously provided (e.g., created, stored, or the like). The plurality of extraction rules may have been automatically generated, manually created, or the like, such as is described at block 504 of FIG. 5.

Process 2700 continues at block 2706, where a field defined by the selected extraction rule may be determined. In at least one embodiment, this determination may include using the selected extraction rule to determine and/or identify text and/or a value of the selected event record that corresponds to the field defined by the selected extraction rule. In some embodiments, this text and/or value (or a location and size of this text/value within the selected event record) may be at least temporarily maintained/stored and used to display the selected event record at block 2710.

In any event, process 2700 proceeds to decision block 2708, where a determination may be made whether another extraction rule may be selected. In some embodiments, another extraction rule may be selected from a plurality of extraction rules until each of the plurality of extraction rules is selected. If another extraction rule may be selected, then process 2700 may loop to block 2704 to select another extraction rule; otherwise, process 2700 may flow to block 2710.

At block 2710, the selected event record may be displayed with an emphasis of each determined field (e.g., as determined at block 2706). As described above, in at least one embodiment, a display of text of each determined field may be emphasized within the selected event record. In some embodiments, each determined field may be emphasized in the same way, such as, for example, all may be emphasized with a light blue highlight. In other embodiments, each determined field may be emphasized in a different way, such as, for example, each determined field may be enclosed in different colored parentheses. However, embodiments are not so limited, and other mechanisms for emphasizing the determined fields in the selected event record may be employed.

In some embodiments, two or more determined fields may overlap. In at least one such embodiment, the corresponding text/values may be combined and emphasized together as a super set field, such that each overlapping field may not be individually distinguished from one another. Accordingly, in some embodiments, the combined text may be employed to emphasize a plurality of fields in a super set field that is defined by a plurality of different extraction rules.

In at least one embodiment, a start and end character location of the determined fields within the selected event record may be utilized to determine if fields overlap. For example, assume in the selected event record, Field_A has a start character location of 5 and an end character location of 10 and Field_B has a start character location of 7 and an end character location of 15. In this example, a combined text from character location 5 to 15 may be emphasized.

In some other embodiments, the start and end character location of multiple determined fields may be compared to determine a super set or most inclusive field. For example, assume the above example is expanded to include Field_C that has a start character location of 5 and an end character location of 22. In this expanded example, the combined text that may be emphasized may be from character location 5 to 22. Additionally, in this expanded example, Field_A and Field_B may be sub-fields of Field_C (and may or may not be sub-fields of each other).

In any event, process 2700 continues next at decision block 2712, where a determination may be made whether another event record may be selected. In some embodiments, another event record may be selected from a plurality of event records until each of the plurality of event records is selected and displayed. If another event record may be selected, then process 2700 may loop to block 2702 to select another event record; otherwise, process 2700 may return to a calling process to perform other actions.

Figure 28:
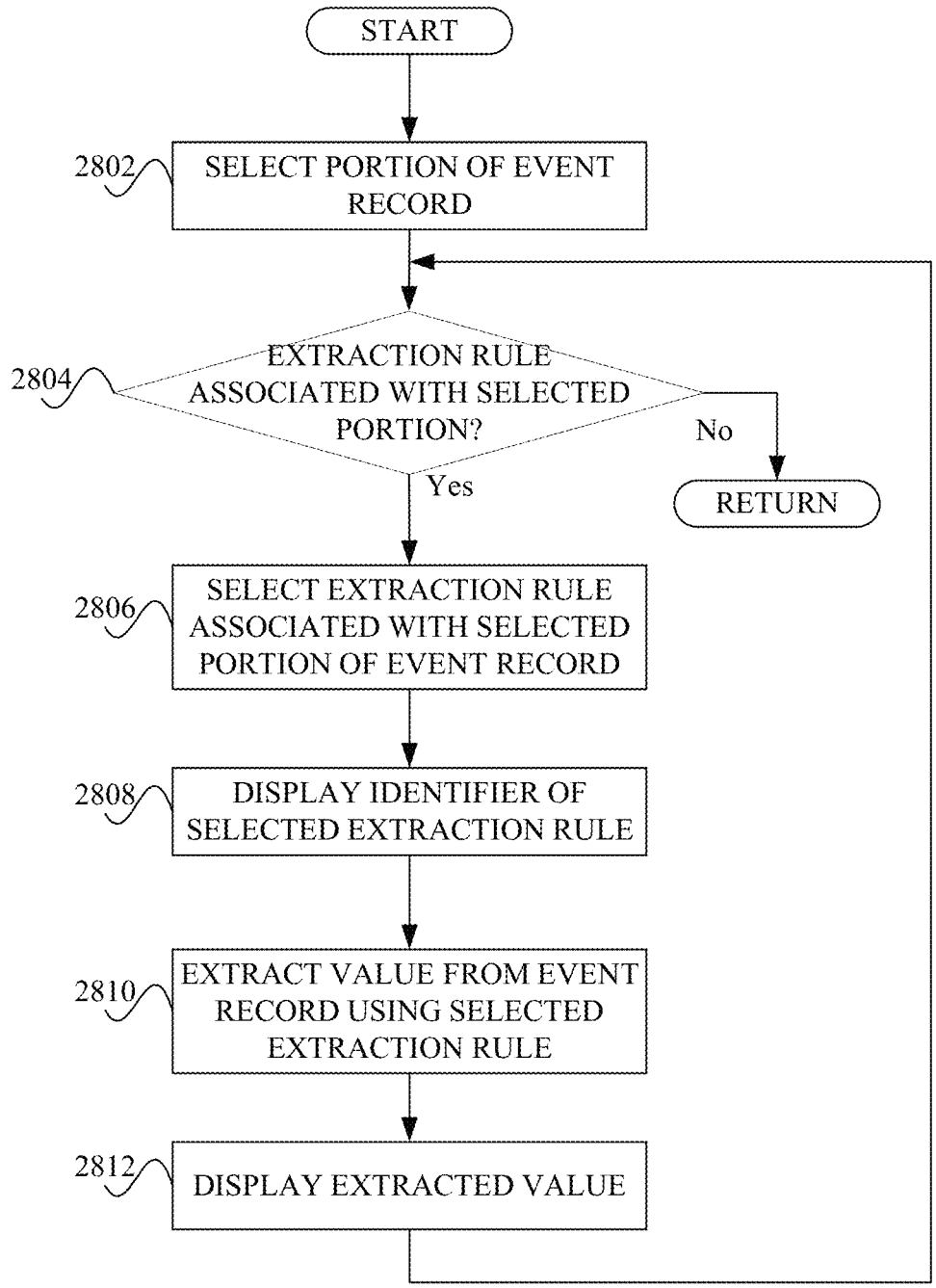
FIG. 28 illustrates a logical flow diagram generally showing one embodiment of a process for displaying previously provided extraction rules associated with a selected portion of an event record.

FIG. 28 illustrates a logical flow diagram generally showing one embodiment of a process for displaying previously provided extraction rules associated with a selected portion of an event record. In some embodiments, process 2800 of FIG. 28 may be implemented by and/or executed on a single network device. In other embodiments, process 2800 or portions of process 2800 of FIG. 28 may be implemented by and/or executed on a plurality of network devices. In yet other embodiments, process 2800 or portions of process 2800 of FIG. 28 may be implemented by and/or executed on one or more blade servers. However, embodiments are not so limited and various combinations of network devices, blade servers, or the like may be utilized.

Process 2800 begins, after a start block, at block 2802, where a portion of an event record may be selected. In at least one of various embodiments, block 2802 may employ embodiments of block 508 to select a portion of an event record.

Process 2800 proceeds to decision block 2804, where a determination may be made whether there is one or more extraction rules associated with the selected portion that was not previously selected at block 2806. In some embodiments, process 2800 may proceed through blocks 2806, 2808, 2810, and 2812 once for each extraction rule associated with the selected portion. If one or more extraction rules are associated with the selected portion, then process 2800 may flow to block 2806; otherwise, process 2800 may return to a calling process to perform other actions.

At block 2806, an extraction rule associated with selected portion may be selected. In at least one embodiment, the selection of an extraction rule may be random, in a predetermined order, or the like.

Process 2808 proceeds next to block 2808, where an identifier of the selected extraction rule may be displayed. In some embodiments, this identifier may include a name of the field defined by the selected extraction rule. In other embodiments, this identifier may be an extraction rule name. In yet other embodiments, the selected extraction rule itself may be displayed.

Process 2800 continues at block 2810, where the selected extraction rule may be used to extract a value from the event record from which the selected portion was selected. In at least one of various embodiments, the selected extraction rule may be applied to the event records to determine data to extract from the event record. The extracted data from the event record may be the particular value for the event record for the field defined by the selected extraction rule. For example, if the selected extraction rule defines a field as the characters between a first set of single brackets, then the value for the event record "Dec 17 10:35:38 ronnie nslcd [23629]: [40f750] passwd entry uid" may be "23629".

In any event, process 2800 proceeds at block 2812, where the extracted value may be displayed. In at least one embodiment, the extracted value may be displayed next to or in conjunction with the identifier of the selected extraction rule. An example of a GUI displaying an identifier of the selected extraction rule and a corresponding extracted value is illustrated in FIGS. 30A-30B.

After block 2812, process 2800 can loop to decision block 2804 to determine if there is another extraction rule associated with the selected portion that was not previously selected at block 2806.

Figure 29:
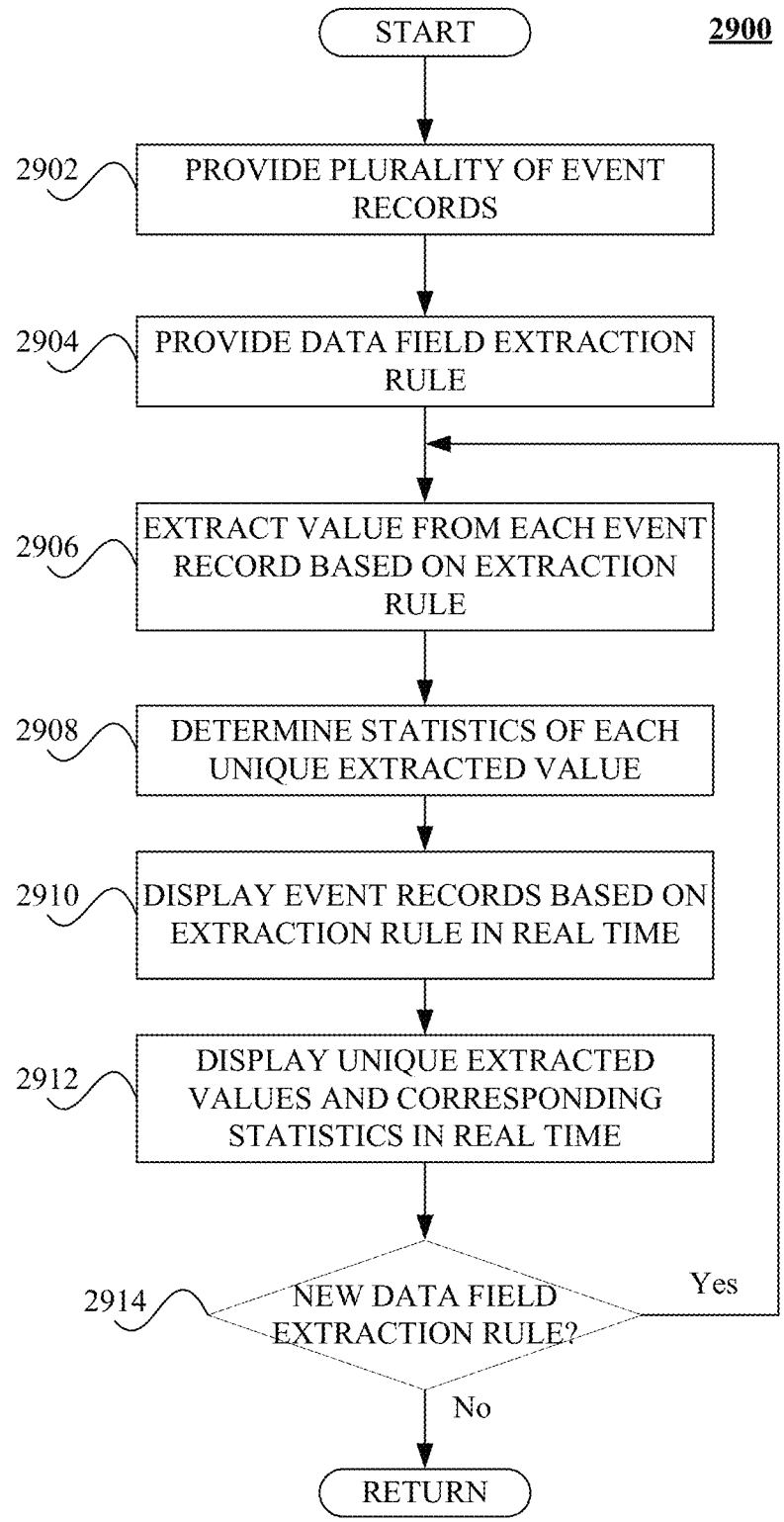
FIG. 29 illustrates a logical flow diagram generally showing one embodiment of a process for displaying statistics of extracted events based on an extraction rule.

In another enablement illustrated in FIG. 29, process 2900 begins, after a start block, at block 2902, where a plurality of event records may be provided. In some embodiments, the event records may be provided by a plurality of different computing devices, such as client devices. In at least one embodiment, the plurality of event records may be a sample subset of a larger dataset of event records dataset. In some embodiments, the larger dataset of event records may be associated with one or more users and/or clients. As described above, the event records may be structured data and/or unstructured data. Additionally, the event records may include machine data.

Process 2900 proceeds next to block 2904, where a data field extraction rule may be provided. In various embodiments, the extraction rule may be automatically generated, manually input by a user, previously provided/created, provided by another system, or the like, or any combination thereof. The extraction rule may define a field within the plurality of event records from which to extract data (e.g., a field value). Accordingly, in some embodiments, the extraction rule may define a field within the event records independent of a predetermined and/or predefined structure of the event records.

In at least one embodiment, automatic generation of an extraction rule may be based on a value selected from an event record. In some embodiments, a graphical user interface (GUI) may be employed to enable a user to select desired text of an event record. From the selected text, pattern recognition algorithms may be employed to automatically generate the extraction rule. In at least one embodiment, the extraction rule may be a regular expression.

In another embodiment, the GUI may be employed to enable the user to manually input the extraction rule. In at least one embodiment, the user may enter a regular expression or other extraction rule into an editable input text box in the GUI to define a field within the event records from which to extract data. In yet other embodiments, the user may utilize the GUI to manually edit extraction rules— either previously automatically generated extraction rules or previous user-entered extraction rules.

As extraction rules are being generated and/or edited, the GUI may display real time updates of newly extracted values, statistics that correspond to the extracted values, changes to a display of the event records, or the like, or any combination thereof. Various embodiments of real time display of field values based on manual editing of extraction rules is described in more detail below.

In some embodiments, the GUI may be employed to enable a user to provide a field name for the extraction rule (e.g., the field defined by the extraction rule). In other embodiments, the system may automatically determine a field name for the extraction rule. In at least one such embodiment, the system may employ the extraction rule to extract a value from one or more event records. The field name may be determined based on this value, such as, for example, a datatype of the extracted value (e.g., an integer), a format of the extracted value (e.g., a phone number, URL, time/date format, or the like), or the like. In various embodiments, the extraction rule may be automatically generated, manually input by a user, or the like, or any combination thereof.

In any event, process 2900 continues next at block 2906, where a value may be extracted from each of the plurality of event records based on the extraction rule. In at least one of various embodiments, the extraction rule may be applied to each of the plurality of event records to determine what data to extract from each event record. The extracted data from a given event record may be the particular value for that event record for the field defined by the extraction rule. For example, if an extraction rule defines a field as the characters between a first set of single brackets, then the value for the event record "December 17 10:35:38 ronnie nslcd[23629]: [401750] passwd entry uid" may be "23629".

Proceeding to block 2908, at least one statistic may be determined for each unique extracted value. In at least one embodiment, a unique extracted value may be an extracted value that is different than another extracted value, regardless and/or independent of a number of instances that a value is extracted from the plurality of event records. For example, assume the extracted values from a six event records includes ["Bob", "Bob", "Ralph", "Bob", "John", "Ralph"]. The unique extracted values may be "Bob", "Ralph", and "John".

Based on the extracted unique values, statistics may be determined. In at least one embodiment, a statistic for a unique value may be a total number of times the unique value occurs in the plurality of records. In another embodiment, a statistic for a unique value may be a percent of a number of times the unique value occurs compared to a number of records in the plurality of records. In yet another embodiment, a statistic for a unique value may be a percent of a number of times the unique value occurs compared to a number of extracted values. This number may be different than a number of records in the plurality of records if the extraction rule does not result in a value being extracted from at least one event record. For example, assume an extraction rule defines a field as the characters between a first set of single brackets. If an event record does not include single brackets, then no value may be extracted. However, embodiments are not limited to these types of statistics and other statistics and/or metrics may also be employed.

Process 2900 continues next at block 2910, where the GUI may be employed to display the event records based on the extraction rule in real time. In at least one embodiment, the plurality of event records may be displayed to the user in virtually any order, such as, most recent to latest or the like. In at least one embodiment, displaying an event record based on an extraction rule may include emphasizing the field defined by the extraction rule (e.g., the extracted value) in the event record. Examples of such emphasizing may include, but are not limited to, highlighting, underlining, and/or otherwise identifying the value extracted from the event record. FIG. 30B illustrates one embodiment of real time display of event records, where values extracted based on an extraction rule are highlighted. In some other embodiments, a plurality of extraction rules may be employed for the plurality of event records and each corresponding extracted value may be emphasized (in a similar or different manner). In at least one embodiment, the values extracted from multiple extractions rules may be distinct and/or separate, and/or may partially or completely overlap.

In some embodiments, real time display of the event records may include displaying the event records based on an extraction rule as the extraction rule is being provided, entered, and/or edited by a user. Accordingly, the GUI may update a display of each event record and an indication of each extracted value in near real time as an extraction rule is edited/generated.

Process 2900 proceeds next at block 2912, where the GUI may be employed to enable real time display of the unique extracted values and the at least one corresponding statistic. In some embodiments where multiple extraction rules are employed, a set of unique extracted values and corresponding statistics may be displayed for each distinct extraction rule.

In some embodiments, real time display of the unique extracted values and the at least one corresponding statistic may include displaying the unique extracted values and the at least one corresponding statistic as the extraction rule is being provided, entered, and/or edited by a user. Accordingly, the GUI may update a display of a list of unique extracted values and the at least one corresponding statistic in near real time as an extraction rule is edited/generated.

It should be understood that real time or near real time display of data, as used herein, may include a delay created by some processing of the data, such as, but not limited to, a time to generate an extraction rule, a time to apply the extraction rule to the plurality of event records, a time to calculate corresponding statistics, and/or the like.

Process 2900 may continue at decision block 2914, where a determination may be made whether a new data field extraction rule has been provided. In at least one embodiment, a new data field extraction rule may be automatically provided. In another embodiment, a user may edit a previously provided extraction rule. If a new extraction rule is provided, process 2900 may loop to block 2906; otherwise, process 2900 may return to a calling process to perform other actions.

FIGS. 30A-30C illustrate non-exhaustive examples of a use case of embodiments of a graphical user interface that may be employed to enable a user to create extraction rule and to obtain real time display of extracted values.

FIG. 30A illustrates a non-exhaustive example of a use case of an embodiment of graphical user interface that may be employed to enable a user to create extraction rule and to obtain real time display of extracted values. Graphical user interface (GUI) 3000A may include multiple viewing windows and/or sections that each display information to a user. For example, GUI 3000A may include input 3002, input 3006, extraction rule preview 3004, records 3008, and extracted values 3010.

Records 3008 may display each event record that is determined based on inputs 3002 and 3006. Input 3002 may enable a user to input a data source (e.g., a specific database) and/or a data type (e.g., system log data). As illustrated, input 3002 may include one or more pull down menus of available options of the data source and/or data type. However, other menus, lists, windows, or interfaces may also be employed. Input 3006 may enable the user to define a specific filter to apply the event records (e.g., the user may filter the event records to display those event records that were recorded on a particular day). In other embodiments, input 3006 may enable a user to select how the event records are selected for display. In at least one embodiment, event records 3008 may include a subset and/or sampling of a lager data set. For example, input 3006 may be used to select that event records 3008 includes a predetermined number (e.g., 100) of the latest event records. However, other result types may be used, such as oldest, most popular, least popular, or the like, or any combination thereof.

Extraction rule preview 3004 may display instructions to a user for creating an extraction rule. For example, the user may highlight and/or select text in an event record in records 3008 to have an extraction rule automatically created. In another example, the user may manually enter an extraction rule (e.g., by clicking on the "Create extraction rule" button, an editable text box may open or become visible where the user can manually input an extraction rule). Extraction rule preview 3004 may display the extraction rule after it is created, such as is shown in FIG. 30B. Additionally, the user may be enabled to save the extraction rule for additional processing of event records and extracted values.

Extracted values 3010 may show unique values that are extracted from event records 3008 based on an extraction rule provided by extraction rule preview 3004. As illustrated, extracted values 3010 may be empty because no extraction rule has been provided.

FIG. 30B illustrates a non-exhaustive example of a use case of an embodiment of a graphical user interface where an extraction rule has been provided. GUI 3000B may be an embodiment of GUI 3000A from FIG. 30A.

Extraction rule preview 3004 may display the provided extraction rule. In at least one embodiment, GUI 3000B may include editable text box 3014 to enable the user to provide a field name of the field defined by the extraction rule. As described above, the extraction rule may have been automatically generated based on user selected text from an event record in the event records 3008. In other embodiments, a user may have manually entered the extraction rule. As illustrated, the extraction rule may be displayed in editable text box 3012. Editable text box 3012 may enable a user to manually edit the extraction rule. As the user is manually editing the extraction rule, records 3008 may be automatically and dynamically updated in real time to show new values extracted from each event record in records 3008. For example, the extracted values from each event record may be highlighted or otherwise emphasized, as shown by highlight 3024. Additionally, extracted values 3010 may be automatically and dynamically updated in real time as the user edits the extraction rule.

In other embodiments, the extraction rule may be manipulated by indicating an incorrect extracted value (e.g., a counter-example). In at least one embodiment, a counter-example may be a value extracted from an event record based on an extraction rule that does not match a desired field of the user. For example, assume an extraction rule is created to define a field for a server name. However, assume the extraction rule extracts other data from at least one of the event records. The user may indicate this other data as a counter-example, and the system may automatically re-generate the extraction rule taking this counter-example into account. In at least one of various embodiments, a user may indicate a counter-example by clicking on a counter-example button, such as button 3022. By clicking button 3022, the system may automatically re-generate the extraction rule based on the counter example and the other extracted values.

Extracted values 3010 may include one or more unique values extracted from records 3008 based on the extraction rule. In at least one embodiment, statistics that correspond to each unique extracted value may be displayed. For example, data 3016 shows a percentage of the number of times each particular unique value is extracted from records 3008. As illustrated, each of these percentages may also be illustrated as a percentage bar (e.g., percentage bar 3018) for each unique extracted value.

FIG. 30C illustrates a non-exhaustive example of a use case of an embodiment of graphical user interface that may be employed to enable a user to select an extracted value to filter the event records. GUI 3000C may be an embodiment of GUI 3000A of FIG. 30A.

In at least one embodiment, a user may click on one or more values within extracted values 3010, such as value 3020 to filter records 3008. Records 3008 may display those event records that include an extracted value that matches selected value 3020. As illustrated, the display of extracted values 3010 may be modified to indicate which value was selected by the user, such as by emphasizing the selected value and/or de-emphasizing the non-selected values.

Figure 31:
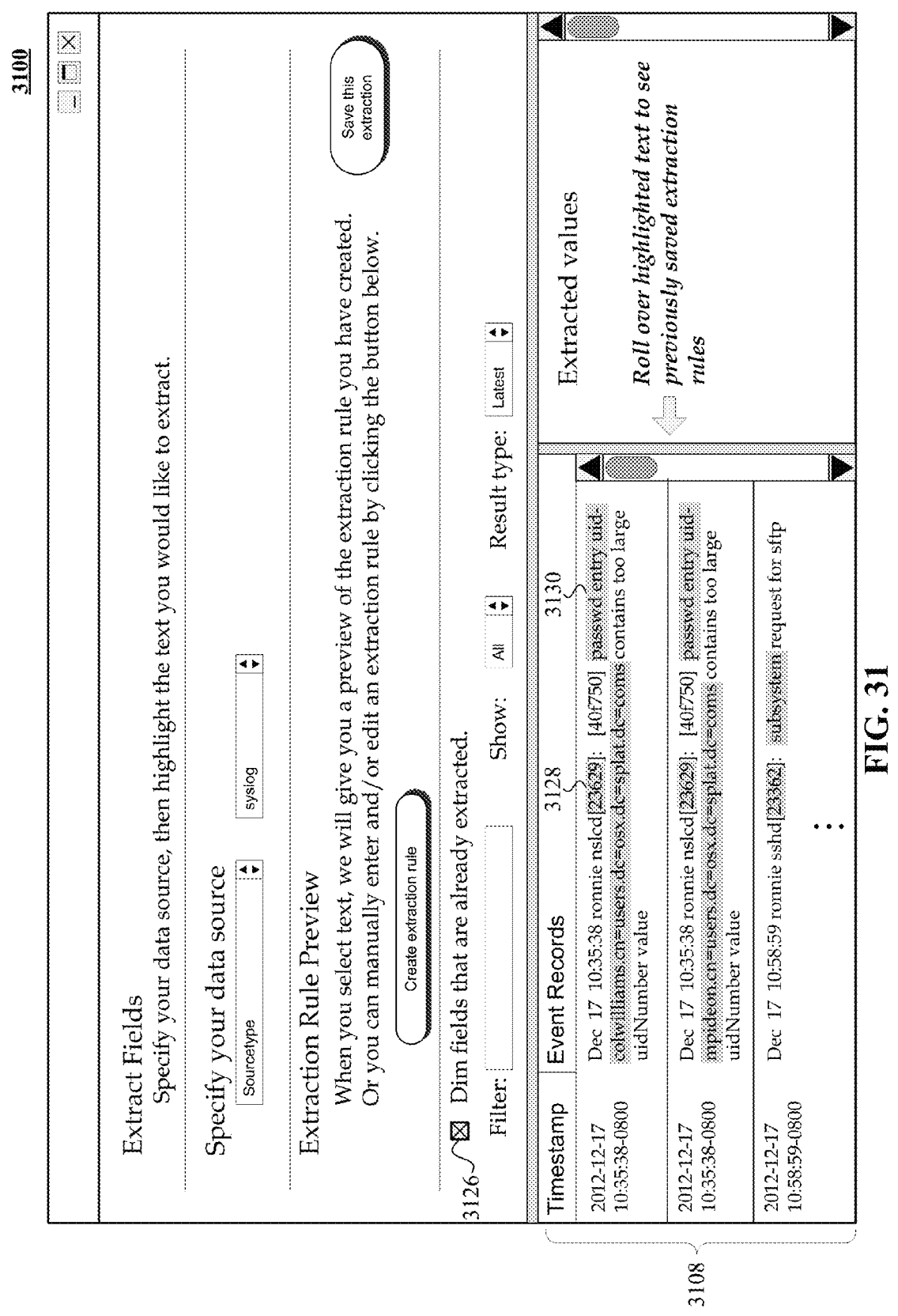

FIG. 31 illustrates a non-exhaustive example of a use case of an embodiment of graphical user interface that may be employed to display event records with an emphasis of fields defined by previously provided extraction rules. GUI 3100 may be an embodiment of GUI 3000A of FIG. 30A.

GUI 3100 may include input 3126. Input 3126 may be a check box or other mechanism that may be selected by a user. In at least one embodiment, a selection of input 3126 may display records 3108 with emphasized fields defined by previous extraction rules. As illustrated, each event record in records 3108 may include one or more emphasized sections of text, such as sections 3128 and 3130. In some embodiments, an emphasized section, such as section 3130, may include a plurality of at least partially overlapping fields. As shown, these overlapping fields may not be distinguished from one another. However, in other embodiments (not shown), these overlapping fields may be distinguished from one another using different types of emphasis.

FIGS. 32A-32B illustrate non-exhaustive examples of a use case of embodiments of a graphical user interface, such as depicted in FIGS. 30A-30C, to display extraction rules and/or fields associated with a selected portion of an event record.

GUI 3200A may be an embodiment of GUI 3000C. As illustrated, a user may move a cursor or other pointer over section 3204 to select section 3204. By selecting section 3204, GUI 3200A may display extraction rules associated with that portion of event record 3220. 32By employing embodiments described above, a box 3206 may pop-up and/or open to display an extraction rule that is associated with section 3204 of event record 3220. In this example, box 3206 may include a fieldname of a field defined by the associated extraction rule ("Server ID") and a value extracted from event record 3220 using the associated extraction rule ("23629"). In this illustration section 3204 may be associated with a single extraction rule.

GUI 3200B may be an embodiment of GUI 3200A. As illustrated, a user may move a cursor or other pointer over section 3210 to select section 3210. By selecting section 3210, GUI 3200B may display extraction rules associated with that portion of event record 3220. In at least one embodiment, section 3210 may be an embodiment of section 830 of FIG. 30C. By employing embodiments described above, box 3212 may pop-up and/or open to display extraction rules that are associated with section 3210 of event record 3220. In some embodiments, box 3212 may be an embodiment of box 3206 of FIG. 32A. In this example, box 3212 may include a fieldname of a field defined by each associated extraction rule and corresponding value extracted from event record 3220 using the associated extraction rules. In this example illustration, section 3210 may have three different extraction rules associated with it, and an identifier of each extraction rule may be displayed in box 3212 (e.g., "Error", "Error type", and "User ID"). Additionally, each associated extraction rule may be used to extract a corresponding value from event record 3220, which may also be displayed in box 3212.

Moreover, some fields may be sub-fields of other fields. In this example, fieldnames "Error type" and "User ID" may be sub-fields of fieldname "Error" because fieldname "Error" overlaps both fieldname "Error type" and "User ID".

Figure 33A:
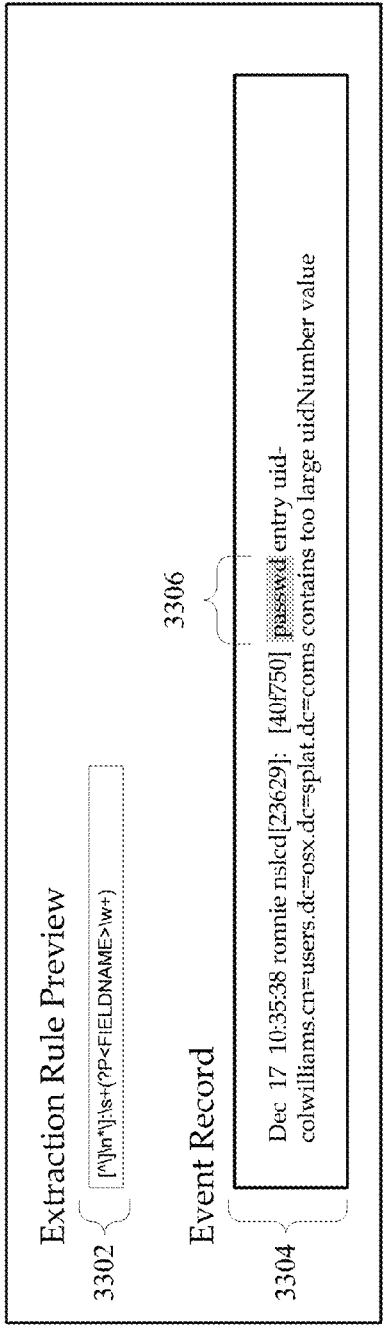
FIGS. 33A and 33B illustrate a use case example of a real time display of an event record based on manual editing of an extraction rule.
Figure 33B:
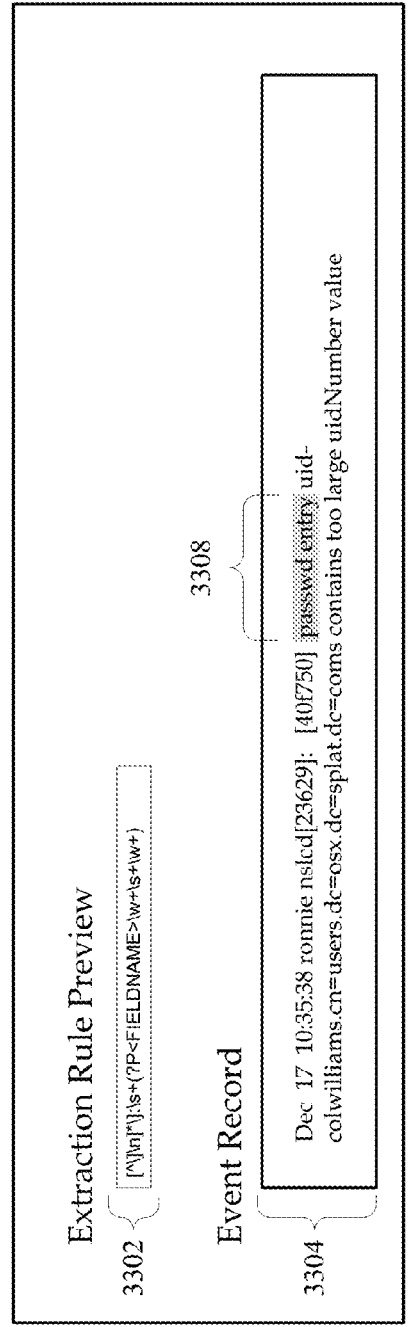

FIGS. 33A-33B illustrate a use case example of a real time display of an event record based on manual editing of an extraction rule. Example 3300A illustrates extraction rule 3302 and event record 3304. Value 3306 may be highlighted, or otherwise emphasized, as a value extracted from event record 3304 based on extraction rule 3302. Example 3300B also illustrates extraction rule 3302 and event record 3304. However, as illustrated, extraction rule 3302 may be manually edited by a user. Based on this edited extraction rule, value 3308 may be highlighted as a new value extracted from event record 3304 based on extraction rule 3302.

Figure 34:
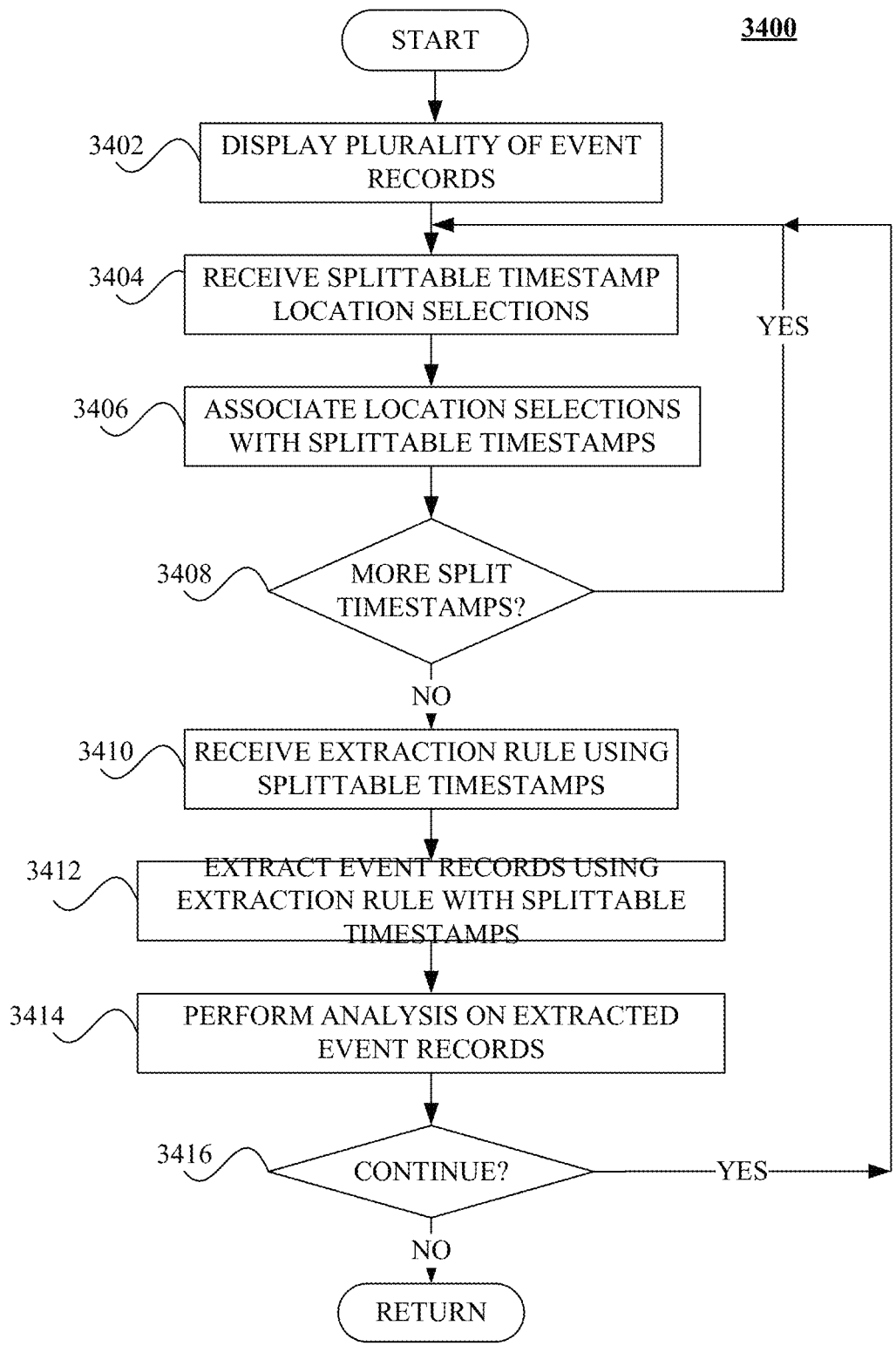
FIG. 34 illustrates a logical flow diagram generally showing one embodiment of an overview process for identifying one or more locations within an event record with splitable timestamp information.

The operation of certain aspects of the technology disclosed will now be described with respect to FIG. 34. FIG. 34 illustrates a logical flow diagram generally showing one embodiment of an overview process for identifying one or more locations within an event record with splitable timestamp information. Process 3400 of FIG. 34 may be implemented within one or more client devices, blade server, and/or network device.

Process 3400 begins, after a start block, at block 3402, where a plurality of event records are received, and one or more of the event records are displayed using a graphical user interface (GUI). The GUI may be implemented using any of a variety of mechanisms, and is not constrained to any particular mechanism for displaying the one or more event records. In some embodiments, the GUI may be displayed to a user of a client device. However, the GUI may also be configured to be displayed using any of a variety of other devices as well. Moreover, the display of the one or more event records may use any of a variety of formats and/or arrangements. For example, event records may be displayed in a table format having rows and columns. In such a display, each event record displayed might be a displayed row, while fields or locations within the event record are columns. In other embodiments, each event record displayed might be a column, while fields or locations within the event records are rows. As discussed further below, other arrangements may also be used.

Process 3400 then flows to block 3404, where the GUI also displays a splitable timestamp selector. The splitable timestamp selector might be represented as a pull down menu structure, a push button, a drag/drop selector, or any of a variety of other selector mechanisms, including a combination of one or more selector mechanisms. The splitable timestamp selector is configured to allow the user to identify locations within a displayed event record having portions of time information for which the user may select. For example, one location of the event record might include month/day/year information, while another location within the event record might include day of the week information, time of day information, or so forth. Clearly, an event record might include locations that include combinations of such time information, and/or other types of time information. Therefore, subject innovations are not limited to a particular structure, type, or combination of time information. Virtually any time information may be included for which a user might select.

In one non-limiting example, a user might identify locations within an event record having time information that is distributed across different fields or locations within an event record. For example, one field or location within an event record might include time of day information in the form of time that is local to a source of the event record, and another location that includes universal time of day information.

Another location of the event record might include, however, month/day/year information. Thus, time information might be distributed across different locations within an event record. Some of these locations within the event record however might not include a label, tag, header, or other type of indication that the content includes time information. The user might therefore wish to identify such locations as having a particular type of time information. Using the splitable timestamp selector within the GUI, the user may drag, slide, or otherwise identify and select locations within the event record as having time information, and what type of time information. The splitable timestamp selector allows the user to split timestamp information across different locations within the event record.

Process 3400 then moves to block 3406 whereas the user selects locations with split timestamp information, the splitable timestamp information is associated with the selected locations. This association may be accomplished using a variety of mechanisms. For example, a new field, header, tag, label, or the like might be automatically inserted in the event records, event record headers, or the like, that include the split timestamp information. However, in other embodiments, information about the selected locations might be inserted into a table, list, index structure, or the like, along with the associated split timestamp information. For example, the location within the event records might be identified as characters 26-31 and as having time information to be associated with the split timestamp of Month (2 characters), Day (2 characters), and Year (2 characters). Such information may be included in a table, list, index structure, or the like, that might be maintained separately, within another event record, or using any of a variety of other mechanisms.

Process 3400 flows next to decision block 3408 where a determination is made whether more splitable timestamp information is to be selected and associated with locations within the event records. If so, processing flows back to block 3404 to continue until no more selections are performed. Processing then continues to optional block 3410.

At block 3410, a user may create an extraction rule that includes splitable timestamps within the rule. For example, the user might select event records where the MM/DD/YY time information, identified using the splitable timestamp, is greater than some value. As noted, any of a variety of other extraction criteria may be employed. As such, the subject innovations are not limited by this example. Proceeding to block 3412, the extraction rule having splitable timestamp information is then used to extract event records that satisfy the extraction rule. Continuing to block 3414, any of a variety of analyses might then be performed on the extracted event records.

Process 3400 then flows to decision block 3416, where a determination is made whether to continue identifying and selecting locations within event records with splitable timestamp information. If so, processing branches back to block 3404; otherwise, processing may return to a calling process.

Figure 35A:
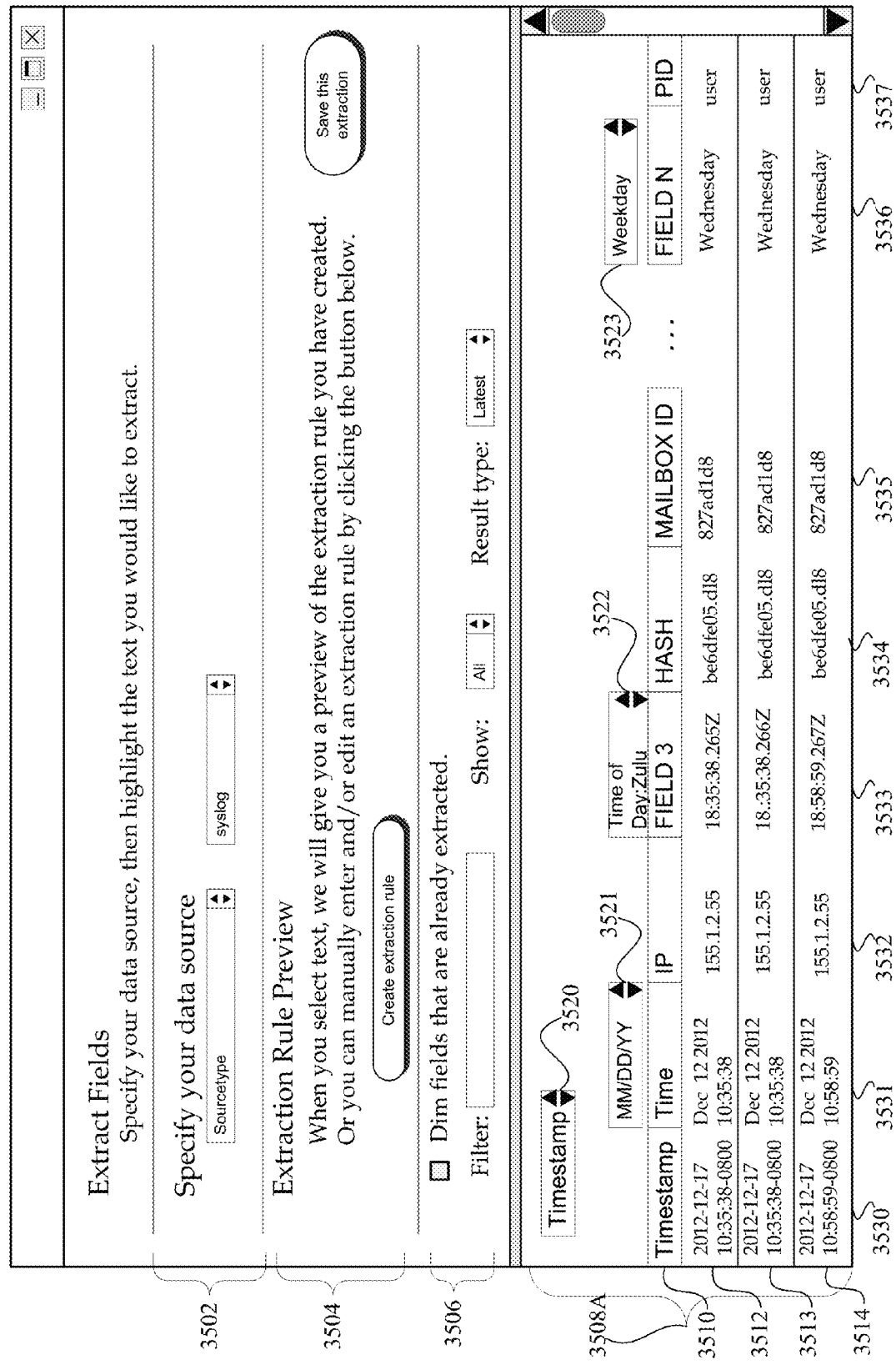

FIGS. 35A-C illustrate various non-limiting, non-exhaustive graphical user interfaces usable for identifying/selecting one or more locations within event records with splitable timestamp information.

GUIs 3500A-C of FIGS. 35A-C are directed towards providing examples of GUIs that may be used to display one or more event records and to select locations within the event records as having time information. The GUIs further display a splitable timestamp selector that may be used to select locations within the event records as having time information. The splitable timestamp selector may be used to identify the type of time information within the selected location. This splitable timestamp information may then be associated with the selected locations as discussed above.

GUI 3500A of FIG. 35A illustrates event records 3512-3514, within section 3508A. Other sections within GUI 3500A may also be displayed, including, data source 3502, which indicates a source of the event records; extraction rule preview 3504, which may be used to create an extraction rule, and input 3506 usable to enable the user to define a specific filter to apply to the event records (e.g., the user may filter the event records to display those event records that were recorded on a particular day). In other embodiments, input 3506 may also enable a user to select how the event records are displayed.

As is further shown in FIG. 35A, event records 3512-3514 are displayed in a 'by row' format, where each row represents one event record. Also, shown as columns are locations 3530-3537 for each of event records 3512-3514. Where tags, labels, or field headers are available, they are further illustrated in row 3510.

Splittable timestamp selector 3520 is shown in FIG. 35A, having selection arrows that may be employed to select split time information. Splittable timestamp selector 3520 may be clicked on, dragged, or otherwise moved, relocated over one or more columns/locations of the displayed event records 3512-3514 to select a location having time information. The selection arrows may be used to select a split time for the selected location. In one non-limiting, non-exhaustive example, a user might drag splitable timestamp selector 3520 over location 3531 and employ the selection arrows to identify that location 3531 has month/day/year (MM/DD/YY) time information. A result of such actions is shown as splitable timestamp selection 3521. Similar actions may be repeated, resulting in splitable timestamp selection 3522 showing location 3533 having time of day, in Zulu time; and splitable timestamp selection 3523 showing location 3536 having weekday time information. Thus, using GUI 3500A, the user may employ splitable timestamp selector 3520 multiple times, to select multiple locations within the displayed event records as having split time information. However, in other embodiments, splitable timestamp selection 3521 might be dragged to another location to enable splitting of, for example, the MM/DD/YY time information. Thus, in some embodiments, a user might split the MM/DD/YY time information across two or more locations, such as MM for one location, DD for another location, and YY for still another location. Similarly, splitable timestamp selection 3522 might also be further split. Thus, in some embodiments, the splitable timestamp selection 3522 might be dragged over multiple locations, with selections made using splitable timestamp selection 3522 as sort of an extension of splitable timestamp selector 3520. Thus, in this manner, designating splits of time across locations within event records may be performed in a variety of ways.

It should be clear that any of a variety of other locations, and/or split time information may be selected. For example, in one embodiment, splitable timestamp selector 3520 might allow a user to select to enter a definition of split time for locations. That is, in some embodiments, the user might define a unique splitting of time, or even a previously undefined timestamp designation. Moreover, in some embodiments, when a location within the displayed event records is selected, an association is made between the split time information and the selected location to indicate that the selection location has time information as indicated by the selected identifier (e.g., MM/DD/YY, time of day: Zulu, or weekday). Moreover, it should be understood that such association between the split time information and the location might be applied over a plurality of event records, including those event records that are displayed, or alternatively, over a subset of event records, such as event records extracted from the plurality of event records based on an extraction rule, or the like. In any event, the splitable timestamp/location associations may then be used to perform any of a variety of operations upon the event records.

As noted above, subject innovations are not limited by how an event record, event record locations, and splitable timestamp information is displayed, Thus, while FIG. 35A illustrates event records 3512-3514 in rows, and columns as locations/fields within the event records, other arrangements may be used. For example, in some embodiments, event records might be displayed in columns, while locations/fields with the event records might be displayed in rows. Splitable timestamp information may then be displayed in a column, and aligned with respectively selected locations/rows within the event records.

For example, some data might have event records with too many extracted fields to readily display as columns. Therefore, in some embodiments, the fields of each event record might be displayed with one field per row for each event record, and then displaying event records one under another. A similar concept might include moving the splitable timestamp information between fields to indicate the one from which a timestamp might be extracted, or otherwise selected; however, in this instance the timestamp (or portions thereof) might move up or down between the fields rather than across columns.

FIG. 35B shows still another non-limiting, non-exhaustive arrangement of event records, locations/fields within event records, and how splitable timestamp information might be displayed. In this example, GUI 3500B shows portions of event records 3512-3513. The event records are shown in a single column, one event record below another event record. Shown for event record 3512 are locations 3531A and 3533A, while at least location 3531B of event record 3513 is displayed. A scrolling tool is shown next to each event record, allowing scrolling within each event record, to display respective locations/fields within an event record. Moreover a global scrolling tool is shown that allows for scrolling over the event records. Splitable timestamp selector 3520 may again be used to select locations within the displayed event records as having time information, as discussed above. Thus, as shown, FIG. 35B shows results of a selection of field/location 3531A as having split time information of MMDDYY, as shown by splitable timestamp selection 3521A. In some embodiments, such selection in one event record may be automatically reflected within other event records. Thus, in some embodiments, splitable timestamp selection 3521B might automatically be displayed to reflect selections of a similar field/location within another event record based one selection. Also shown is splitable timestamp selection 3522A for location 3533A of event record 3512. While not displayed, a similar automatic selection might occur for event record 3513, and/or other event records.

FIG. 35C illustrates still another non-limiting, non-exhaustive arrangement of event records, locations/fields within event records, and how splitable timestamp information might be displayed. In this example, GUI 3500C, event records are again displayed in row format, as in 3512A, 3513A, and so forth. However, a separate row is also shown for fields/locations selected as having time information. Thus, as shown row 3541 illustrates that field 1 (location 3531) of the event records 3512-3513 (as displayed by event records 3512A and 3513A) has time information as shown by splitable timestamp selection 3521. Similarly, row 3541 also shows that field 3 (location 3533) of the event records 3512-3513 (and displayed as event records 3512B and 3513B) has time information as shown by splitable timestamp selection 3522. In this example, then, GUI 3500C might display multiple instances of an event record, as rows, with other rows indicating which field/location within the event records are selected using the splitable timestamp selector 3520.

Other arrangements or structures, formats, or the like, may be used to display within a GUI event records and locations within the event records such that a user might select locations having time information using a splitable timestamp selector. Thus, embodiments should not be construed as being limited by any particular arrangement of event records, type of splitable timestamp selectors, or mechanisms used to select locations within event records.

Particular Embodiments

In one implementation, a method is described that accessing in memory a set of events each event identified by an associated time stamp. Each event in the set of events includes a portion of raw data from machine data. The method further includes causing display of or transmitting for display a first user interface including a plurality of events and receiving data indicating selection of a first event from among the plurality of events. The method also includes transmitting for display a second user interface presenting the first event to be used to define field extraction and receiving data indicating a selection of one or more portions of text within the first event to be extracted as one or more fields. It also includes automatically determining a field extraction rule that extracts as one or more values of the one or more fields the respective selections of the portions of text within the events when the extraction rule is applied to the events. The method can include transmitting for display a third user interface including an annotated version of the plurality of events, wherein the annotated version indicates the portions of text within the plurality of events extracted by the field extraction rule and presenting second event to be used to refine field extraction and receiving further data indicating a selection of at least one portion of text within the second event to be extracted as into at least one of the fields by an updated field extraction rule.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with other sets of base features.

The method can include transmitting in the second user interface one or more tools that implement user selection of the one or more portions of text within the first event and naming of the one or more fields.

It can include the second user interface providing tools that implement user selection of a sampling strategy to determine the events in the display, receiving further data indicating a selection of the sampling strategy; and resampling and updating the events to be displayed. Two examples of sampling strategies are a diverse events sample and a rare events sample. Diverse resampling include clustering a set of events into multiple clusters, calculating a size of each cluster, and selecting one or more events from each cluster in a set of larger size clusters. Rare sampling can include selecting the events from smaller size clusters. This method also can include updating the events to be displayed.

Another sampling strategy involves time range sampling, retrieving at least a sample of events in the selected time range. The method also can include updating the events to be displayed.

The method can include the third user interface providing tools to select the one or more portions of text within the second event for use in updating a field extraction rule. The selected text in the second example event can be linked to fields already created.

The third user interface also can provide tools that implement user selection of either events that match the field extraction rule or events that are non-matches to the field extraction rule. The method can include receiving further data indicating a selection of a match or non-match subset of events and resampling according to the match or non-match selection. It can include updating the events to be displayed.

The method can, before transmitting the first user interface, include receiving a search specification that identifies events to be selected, transmitting for display a search response interface in which the events are responsive to the search specification. The search response interface then includes a user option to initiate formulation of a text extraction rule.

The method can include automatically determining an updated field extraction rule that extracts as one or more values of the one or more fields from both the first event and the second event. This can be followed by transmitting for display a fourth user interface including an annotated version of the plurality of events Annotations can indicate the portions of text extracted by the updated field extraction rule from the events.

The method can proceed to validation of the extraction rule, including transmitting for display a fourth user interface including an annotated version of the plurality of events, that indicates the portions of text within the events that are extracted by the field extraction rule. The fourth user interface can provides one or more user controls that implement user selection of indicated portions of the text as examples of text that should not be extracted. The method can include receiving further data indicating a selection of one or more examples of text that should not be extracted. The method also can include automatically determining an updated field extraction rule that does not extract the text that should not be extracted.

Another feature the method can include the second user interface providing tools that implement user selection of among the fields, receiving further data indicating a selection of a selected field, and transmitting data for a frequency display of values of the selected field extracted from a sample of the events, wherein the frequency display includes a list of values extracted and for each value in the list a frequency and an active filter control, wherein the active filter control filters events to be displayed based on a selected value.

The second user interface can provide tools that implement user selection of a particular field among fields for which extraction rules have been created, receiving further data indicating a selection of a selected field, and transmitting data for a frequency display of values of the selected field extracted from a sample of the events, wherein the frequency display includes a list of values extracted and for each value in the list, frequency information and at least one filter control. The method also includes receiving further data indicating a selection of a selected value from the list of values extracted and activation of the filter control, and transmitting data for a filtered display of values of the selected field extracted from an event sample filtered by the selected value.

The method can include receiving further data indicating a selection to save the extraction rule and field names for later use in processing events. This method can further include incorporating the saved extraction rule and field names in a data model, in a late binding schema of extraction rules applied at search time.

Another feature the method can include the second user interface providing one or more tools that implement user entry of a filter value to determine the events in the display. The filter value can be keyword or a key-value pair. This feature further includes receiving indicating entry the keyword or key-value pair to use in the filter and resampling according to the value entered. The method also can include updating the events to be displayed.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, another method is described of accessing in memory a set of events, each event identified by an associated time stamp. Each event in the set of events includes a portion of raw data from machine data. The method further includes receiving data indicating selection of a first event from among a first plurality of events and data indicating a selection of one or more portions of text within the raw data of the first event to be extracted as one or more fields and automatically determining an initial extraction rule that extracts the selected portions of text within the first event. The method also includes transmitting for display a first interface providing tools that implement user modification of the extraction rule. These tools include one or more of selecting one or more non-adjoining strings to concatenate with a selected field, selecting a portion of the selected field to be trimmed from the beginning or end of the selected field, or selecting sub-portions of text to extract from within the selected field.

As described above, any of the method features described in this disclosure are candidates to be combined with this method, especially the following features. All of the combinations described by this disclosure are not enumerated, in the interest of conciseness. The method can positively implement the first, second or third tool option described above. It can implement the first and second, first and third, or second and third tool options. Or, it can implement all three.

Among its features, the method can include receiving further data indicating selection of the one or more non-adjoining strings to concatenate into a concatenated field and updating the field extraction rule to combine the non-adjoining strings into the concatenated field.

Similarly, the method can include receiving further data indicating one or more trim commands to apply to the selected field and updating the field extraction rule to include the trim commands.

Also, the method can include receiving further data indicating selection of sub-portions of text to extract from within the selected field, automatically determining a secondary extraction rule to extract the sub-portions of text from within the selected field and updating the field extraction rule to include the secondary extraction rule.

As with the earlier implementation, another feature can include causing display of or transmitting for display a second user interface providing tools that implement user selection of a sampling strategy to determine the events in a display, receiving further data indicating a selection of the sampling strategy, sampling the events to be displayed, and transmitting for display a third user interface including an annotated version of the plurality of events, wherein the annotated version indicates the portions of text within the plurality of events extracted by the initial extraction rule. Any of the sampling strategies described in the context of the prior implementation can be combined with this implementation.

The method can further include receiving further data indicating a selection to validate the extraction rule and transmitting for display a second user interface including an annotated version of the plurality of events, wherein the annotated version indicates the portions of text within the plurality of events extracted by the field extraction rule and provides one or more user controls that implement user selection of indicated portions of the text as examples of text that should not be extracted. Responsive to the second user interface, the method can include receiving further data indicating a selection of one or more examples of text that should not be extracted and automatically determining an updated field extraction rule that does not extract the text that should not be extracted.

Another feature can include transmitting for display a second user interface providing tools that implements user selection among the fields, receiving further data indicating a selection of a selected field, and transmitting data for a frequency display of values of the selected field extracted from a sample of the events, wherein the frequency display includes a list of values extracted and for each value in the list a frequency and an active filter control, wherein the active filter control filters events to be displayed based on a selected value.

A further feature can include receiving further data indicating a selection to save the extraction rule and field names for later use in processing events and incorporating the saved extraction rule and field names in a data model that includes a late binding schema of extraction rules applied at search time.

The method can be extended by transmitting for display a second user interface providing one or more tools that implement user entry of a filter value to determine the events in the display, receiving further data indicating entry of a keyword value to apply as a filter, resampling according to the keyword value, and updating the events to be displayed.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

The above specification, examples, and data provide a complete description of the composition, manufacture, and use of the technology disclosed. Since many embodiments of the technology disclosed can be made without departing from the spirit and scope of the technology disclosed, the technology disclosed resides in the claims hereinafter appended.

The invenyion claimed is:

1. A computer-implemented method comprising:
 accessing in memory a set of events, each event identified by an associated time stamp;
 wherein each event in the set of events includes a portion of raw data;
 receiving data indicating selection of a first event from among a first plurality of events and data indicating a selection of one or more portions of text within the raw data of the first event to be extracted as one or more fields;
 automatically determining an initial extraction rule that extracts the selected portions of text within the first event;
 causing display of a first interface providing tools that implement user modification of the extraction rule, including selecting a field from the one or more fields and:
  selecting one or more non-adjoining strings to concatenate with the selected field;
  selecting a portion of the selected field to be trimmed from the beginning or end of the selected field; or
  selecting sub-portions of text to extract from within the selected field.

2. The method of claim 1, further including:
 receiving further data indicating selection of the one or more non-adjoining strings to concatenate into a concatenated field; and
 updating the field extraction rule to combine the non-adjoining strings into the concatenated field.

3. The method of claim 1, further including:
 receiving further data indicating one or more trim commands to apply to the selected field; and
 updating the field extraction rule to include the trim commands.

4. The method of claim 1, further including:
 receiving further data indicating selection of sub-portions of text to extract from within the selected field;
 automatically determining a secondary extraction rule to extract the sub-portions of text from within the selected field; and
 updating the field extraction rule to include the secondary extraction rule.

5. The method of claim 1, further including:
 transmitting for display a second user interface providing tools that implement user selection of a sampling strategy to determine the events in a display;
 receiving further data indicating a selection of the sampling strategy;
 sampling the events to be displayed; and
 transmitting for display a third user interface including an annotated version of the plurality of events, wherein the annotated version indicates the portions of text within the plurality of events extracted by the initial extraction rule.

6. The method of claim 1, further including:
 causing display of a second user interface providing tools that implement user selection of only events that match the field extraction rule the field extraction rule;
 receiving further data indicating a selection of only the events that match; and
 sampling according to the match selection; and
 causing display of a third user interface including the plurality of events according to the match selection, wherein the annotated version indicates the portions of text within the plurality of events extracted by the initial extraction rule.

7. The method of claim 1, further including:
 receiving further data indicating a selection to validate the extraction rule;
 causing display of a second user interface including an annotated version of the plurality of events, wherein the annotated version indicates the portions of text within the plurality of events extracted by the field extraction rule and provides one or more user controls that implement user selection of indicated portions of the text as examples of text that should not be extracted;
 receiving further data indicating a selection of one or more examples of text that should not be extracted; and
 automatically determining an updated field extraction rule that does not extract the text that should not be extracted.

8. The method of claim 1, further including:
 causing display of a second user interface providing tools that implements user selection among the fields;
 receiving further data indicating a selection of a selected field; and
 causing display of a frequency table of values of the selected field extracted from a sample of the events, wherein the frequency table includes a list of values extracted and for each value in the list a frequency and an active filter control, wherein the active filter control filters events to be displayed based on a selected value.

9. The method of claim 1, further including:
 receiving further data indicating a selection to save the extraction rule and field names for later use in processing events; and
 incorporating the saved extraction rule and field names in a data model that includes a late binding schema of extraction rules applied at search time.

10. The method of claim 1, further including:
 causing display of a second user interface providing one or more tools that implement user entry of a filter value to determine the events in the display;
 receiving further data indicating entry of a keyword value to apply as a filter;
 resampling according to the keyword value; and
 updating the events to be displayed.

11. A computer-implemented system comprising:
a processor, memory coupled to the processor, and instructions stored in the memory that implement the actions of:
accessing in memory a set of events, each event identified by an associated time stamp;
wherein each event in the set of events includes a portion of raw data from machine data;
receiving data indicating selection of a first event from among a first plurality of events and data indicating a selection of one or more portions of text within the raw data of the first event to be extracted as one or more fields;
automatically determining an initial extraction rule that extracts the selected portions of text within the first event;
causing display of a first interface providing tools that implement user modification of the extraction rule, including selecting a field from the one or more fields and:
selecting one or more non-adjoining strings to concatenate with the selected field;
selecting a portion of the selected field to be trimmed from the beginning or end of the selected field; or
selecting sub-portions of text to extract from within the selected field.

12. The computer-implemented system of claim 11, further including:
receiving further data indicating selection of the one or more non-adjoining strings to concatenate into a concatenated field; and
updating the field extraction rule to combine the non-adjoining strings into the concatenated field.

13. The computer-implemented system of claim 11, further including:
receiving further data indicating one or more trim commands to apply to the selected field; and
updating the field extraction rule to include the trim commands.

14. The computer-implemented system of claim 11, further including:
receiving further data indicating selection of sub-portions of text to extract from within the selected field;
automatically determining a secondary extraction rule to extract the sub-portions of text from within the selected field; and
updating the field extraction rule to include the secondary extraction rule.

15. The computer-implemented system of claim 11, further including:
causing display of a second user interface providing tools that implement user selection of a sampling strategy to determine the events in a display;
receiving further data indicating a selection of the sampling strategy;
sampling the events to be displayed; and
causing display of a third user interface including an annotated version of the plurality of events, wherein the annotated version indicates the portions of text within the plurality of events extracted by the initial extraction rule.

16. The computer-implemented system of claim 11, further including:
causing display of a second user interface providing tools that implement user selection of only events that match the field extraction rule the field extraction rule;
receiving further data indicating a selection of only the events that match; and
sampling according to the match selection; and
causing display of a third user interface including the plurality of events according to the match selection, wherein the annotated version indicates the portions of text within the plurality of events extracted by the initial extraction rule.

17. The computer-implemented system of claim 11, further including:
receiving further data indicating a selection to validate the extraction rule;
causing display of a second user interface including an annotated version of the plurality of events, wherein the annotated version indicates the portions of text within the plurality of events extracted by the field extraction rule and provides one or more user controls that implement user selection of indicated portions of the text as examples of text that should not be extracted;
receiving further data indicating a selection of one or more examples of text that should not be extracted; and
automatically determining an updated field extraction rule that does not extract the text that should not be extracted.

18. The computer-implemented system of claim 11, further including:
causing display of a second user interface providing tools that implement user selection among the fields;
receiving further data indicating a selection of a selected field; and
causing display of a frequency table of values of the selected field extracted from a sample of the events, wherein the frequency table includes a list of values extracted and for each value in the list a frequency and an active filter control, wherein the active filter control filters events to be displayed based on a selected value.

19. The computer-implemented system of claim 11, further including:
receiving further data indicating a selection to save the extraction rule and field names for later use in processing events; and
incorporating the saved extraction rule and field names in a data model that includes a late binding schema of extraction rules applied at search time.

20. The computer-implemented system of claim 11, further including:
causing display of a second user interface providing one or more tools that implement user entry of a filter value to determine the events in the display;
receiving further data indicating entry of a keyword value to apply as a filter; and
resampling according to the keyword value; and
updating the events to be displayed.

21. A tangible computer-readable memory having instructions stored in the memory that implement the actions including:
accessing in memory a set of events, each event identified by an associated time stamp;
wherein each event in the set of events includes a portion of raw data from machine data;
receiving data indicating selection of a first event from among a first plurality of events and data indicating a selection of one or more portions of text within the raw data of the first event to be extracted as one or more fields;

automatically determining an initial extraction rule that extracts the selected portions of text within the first event;

causing display of a first interface providing tools that implement user modification of the extraction rule, including selecting a field from the one or more fields and:

selecting one or more non-adjoining strings to concatenate with the selected field;

selecting a portion of the selected field to be trimmed from the beginning or end of the selected field; or selecting sub-portions of text to extract from within the selected field.

22. The tangible computer-readable memory of claim 21, further including:

receiving further data indicating selection of the one or more non-adjoining strings to concatenate into a concatenated field; and updating the field extraction rule to combine the non-adjoining strings into the concatenated field.

23. The tangible computer-readable memory of claim 21, further including:

receiving further data indicating one or more trim commands to apply to the selected field; and updating the field extraction rule to include the trim commands.

24. The tangible computer-readable memory of claim 21, further including:

receiving further data indicating selection of sub-portions of text to extract from within the selected field;

automatically determining a secondary extraction rule to extract the sub-portions of text from within the selected field; and updating the field extraction rule to include the secondary extraction rule.

25. The tangible computer-readable memory of claim 21, further including:

causing display of a second user interface providing tools that implement user selection of a sampling strategy to determine the events in a display;

receiving further data indicating a selection of the sampling strategy;

sampling the events to be displayed; and causing display of a third user interface including an annotated version of the plurality of events, wherein the annotated version indicates the portions of text within the plurality of events extracted by the initial extraction rule.

26. The tangible computer-readable memory of claim 21, further including:

causing display of a second user interface providing tools that implement user selection of only events that match the field extraction rule the field extraction rule;

receiving further data indicating a selection of only the events that match; and sampling according to the match selection; and causing display of a third user interface including the plurality of events according to the match selection, wherein the annotated version indicates the portions of text within the plurality of events extracted by the initial extraction rule.

27. The tangible computer-readable memory of claim 21, further including:

receiving further data indicating a selection to validate the extraction rule;

causing display of a second user interface including an annotated version of the plurality of events, wherein the annotated version indicates the portions of text within the plurality of events extracted by the field extraction rule and provides one or more user controls that implement user selection of indicated portions of the text as examples of text that should not be extracted;

receiving further data indicating a selection of one or more examples of text that should not be extracted; and automatically determining an updated field extraction rule that does not extract the text that should not be extracted.

28. The tangible computer-readable memory of claim 21, further including:

causing display of a second user interface providing tools that implement user selection among the fields;

receiving further data indicating a selection of a selected field; and causing display of a frequency table of values of the selected field extracted from a sample of the events, wherein the frequency table includes a list of values extracted and for each value in the list a frequency and an active filter control, wherein the active filter control filters events to be displayed based on a selected value.

29. The tangible computer-readable memory of claim 21, further including:

receiving further data indicating a selection to save the extraction rule and field names for later use in processing events; and incorporating the saved extraction rule and field names in a data model that includes a late binding schema of extraction rules applied at search time.

* * * * *